US012150908B2

(12) United States Patent
Poulos et al.

(10) Patent No.: US 12,150,908 B2
(45) Date of Patent: *Nov. 26, 2024

(54) PATIENT SUPPORT WITH STAND-UP AND SIT FEATURES

(71) Applicant: Kreg Medical, Inc., Melrose Park, IL (US)

(72) Inventors: Craig Poulos, Chicago, IL (US); Carlos Portillo, Chicago, IL (US); Tho Thieu, Wood Dale, IL (US)

(73) Assignee: Kreg Medical, Inc., Melrose Park, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/105,124

(22) Filed: Feb. 2, 2023

(65) Prior Publication Data

US 2023/0181397 A1 Jun. 15, 2023

Related U.S. Application Data

(63) Continuation of application No. 16/576,578, filed on Sep. 19, 2019, now abandoned, which is a (Continued)

(51) Int. Cl.

*A61G 7/16* (2006.01)
*A61G 5/14* (2006.01)

(Continued)

(52) U.S. Cl.

CPC ................. *A61G 7/16* (2013.01); *A61G 5/14* (2013.01); *A61G 7/005* (2013.01); *A61G 7/015* (2013.01); *A61G 7/0506* (2013.01); *A61G 7/0513* (2016.11)

(58) Field of Classification Search

CPC .......... A61G 7/16; A61G 7/0513; A61G 5/14; A61G 7/0506; A61G 7/005; A61G 7/015; A61G 7/057; A61G 7/001; A61G 7/008

See application file for complete search history.

(56) References Cited

U.S. PATENT DOCUMENTS

| | | | |
|---|---|---|---|
| 53,041 | A | 3/1866 | Puffer |
| 358,466 | A | 3/1887 | Lueders |

(Continued)

FOREIGN PATENT DOCUMENTS

| | | |
|---|---|---|
| CA | 2580314 C | 3/2011 |
| CA | 2618630 C | 10/2011 |

(Continued)

OTHER PUBLICATIONS

Oct. 30, 2009—(WO) ISR—App. No. PCT/US09/03811.

(Continued)

*Primary Examiner* — Eric J Kurilla

(74) *Attorney, Agent, or Firm* — Leydig, Voit & Mayer Ltd.; John Augustyn

(57) ABSTRACT

A bed is provided having a base frame, a patient support assembly connected to the base frame, and a tilt frame connected between the base frame and the patient support assembly. The tilt frame is rotatable adjacent the foot end of the bed to place the patient support assembly, including the head section, seat section and foot section thereof, in a generally vertical position to allow a patient to exit the bed in a standing orientation. The bed also has a foot board assembly connected to the foot section, the foot board assembly having a foot board separately movable about a longitudinal axis of the bed toward the head end and the foot end of the bed.

15 Claims, 23 Drawing Sheets

Related U.S. Application Data continuation of application No. 16/244,960, filed on Jan. 10, 2019, now Pat. No. 11,141,335, which is a continuation of application No. 14/690,387, filed on Apr. 18, 2015, now Pat. No. 10,179,077, application No. 18/105,124, filed on Feb. 2, 2023 is a continuation of application No. 16/244,835, filed on Jan. 10, 2019, now abandoned, which is a continuation of application No. 14/690,387, filed on Apr. 18, 2015, now Pat. No. 10,179,077, application No. 18/105,124, filed on Feb. 2, 2023 is a continuation of application No. 17/496,525, filed on Oct. 7, 2021, which is a continuation of application No. 16/576,578, filed on Sep. 19, 2019, now abandoned, which is a continuation of application No. 16/244,960, filed on Jan. 10, 2019, now Pat. No. 11,141,335, which is a continuation of application No. 14/690,387, filed on Apr. 18, 2015, now Pat. No. 10,179,077, said application No. 17/496,525 is a continuation of application No. 16/244,835, filed on Jan. 10, 2019, now abandoned, which is a continuation of application No. 14/690,387, filed on Apr. 18, 2015, now Pat. No. 10,179,077, said application No. 17/496,525 is a continuation of application No. 16/244,960, filed on Jan. 10, 2019, now Pat. No. 11,141,335, which is a continuation of application No. 14/690,387, filed on Apr. 18, 2015, now Pat. No. 10,179,077.

(60) Provisional application No. 61/981,591, filed on Apr. 18, 2014.

(51) Int. Cl.

| | |
|---|---|
| ***A61G 7/005*** | (2006.01) |
| ***A61G 7/015*** | (2006.01) |
| ***A61G 7/05*** | (2006.01) |

(56) References Cited

U.S. PATENT DOCUMENTS

| | | | |
|---|---|---|---|
| 375,448 | A | 12/1887 | Hayward |
| 628,700 | A | 7/1899 | Dann |
| 1,133,798 | A | 3/1915 | Hall |
| 1,253,179 | A | 1/1918 | Irrgang |
| 1,398,203 | A | 11/1921 | Schmidt |
| 1,525,864 | A | 2/1925 | Hueseman |
| 1,636,325 | A | 7/1927 | Roe |
| 1,772,310 | A | 8/1930 | Hart |
| 1,999,106 | A | 4/1935 | Muller |
| 2,034,985 | A | 3/1936 | Lilley |
| 2,171,251 | A | 8/1939 | Capron |
| 2,262,288 | A | 11/1941 | Klipstein |
| 2,308,592 | A | 1/1943 | Drexler et al. |
| 2,472,675 | A | 6/1949 | Mueller |
| 2,514,655 | A | 7/1950 | Luketa |
| 2,562,339 | A | 7/1951 | Socol |
| 2,656,876 | A | 10/1953 | Larrick |
| 2,658,211 | A | 11/1953 | Bendersky |
| 2,675,285 | A | 4/1954 | Terry |
| 2,766,463 | A | 10/1956 | Bendersky |
| 2,783,055 | A | 2/1957 | Michaud |
| 2,817,855 | A | 12/1957 | Pratt |
| 2,830,304 | A | 4/1958 | Ericsson |
| 2,956,290 | A | 10/1960 | Scheinerman |
| 3,045,259 | A | 7/1962 | Mayer |
| 3,064,278 | A | 11/1962 | Broyles |
| 3,081,463 | A | 3/1963 | Williams et al. |
| 3,090,971 | A | 5/1963 | MacDonald |
| 3,093,839 | A | 6/1963 | Higgins |
| 3,094,713 | A | 6/1963 | Wise |
| 3,112,500 | A | 12/1963 | MacDonald |
| 3,149,349 | A | 9/1964 | Nelson |
| 3,174,161 | A | 3/1965 | Black |
| 3,210,779 | A | 10/1965 | Herbold |
| 3,220,022 | A | 11/1965 | Nelson |
| 3,234,570 | A | 2/1966 | Hutt |
| 3,237,212 | A | 3/1966 | Hillenbrand et al. |
| 3,239,853 | A | 3/1966 | MacDonald |
| 3,262,133 | A | 7/1966 | Beitzel |
| 3,281,141 | A | 10/1966 | Smiley et al. |
| 3,327,328 | A | 6/1967 | Slivoski |
| 3,394,415 | A | 7/1968 | Parker |
| 3,422,929 | A | 1/1969 | Ojacarlw |
| 3,477,071 | A | 11/1969 | Emerson |
| 3,485,240 | A | 12/1969 | Fountain |
| 3,486,176 | A | 12/1969 | Murcott |
| 3,495,869 | A | 2/1970 | Ingemansson |
| 3,506,989 | A | 4/1970 | Ross et al. |
| 3,585,660 | A | 6/1971 | Gottfried et al. |
| 3,593,350 | A | 7/1971 | Knight et al. |
| 3,605,145 | A | 9/1971 | Graebe |
| 3,640,520 | A | 2/1972 | Wieland |
| 3,646,621 | A | 3/1972 | Fragas |
| 3,695,701 | A | 10/1972 | Knabusch et al. |
| 3,701,173 | A | 10/1972 | Whitney |
| 3,717,885 | A | 2/1973 | De Mare |
| 3,781,060 | A | 12/1973 | Pentzien |
| 3,872,525 | A | 3/1975 | Lea et al. |
| 3,877,088 | A | 4/1975 | Bouman |
| 3,930,273 | A | 1/1976 | Stern |
| 3,932,903 | A | 1/1976 | Adams et al. |
| 3,971,083 | A | 7/1976 | Peterson |
| 3,974,530 | A | 8/1976 | Lusch et al. |
| 3,997,926 | A | 12/1976 | England |
| 4,017,118 | A | 4/1977 | Cawley |
| 4,042,988 | A | 8/1977 | Holliday |
| 4,084,274 | A | 4/1978 | Willis et al. |
| 4,103,376 | A | 8/1978 | Benoit et al. |
| 4,127,906 | A | 12/1978 | Zur |
| 4,139,917 | A | 2/1979 | Fenwick |
| 4,152,795 | A | 5/1979 | Rodosta et al. |
| 4,175,550 | A | 11/1979 | Leininger et al. |
| 4,183,109 | A | 1/1980 | Howell |
| 4,188,677 | A | 2/1980 | Zur |
| 4,224,706 | A | 9/1980 | Young et al. |
| 4,225,988 | A | 10/1980 | Cary et al. |
| 4,227,269 | A | 10/1980 | Johnston |
| 4,258,445 | A | 3/1981 | Zur |
| 4,270,233 | A | 6/1981 | Mulligan |
| 4,271,547 | A | 6/1981 | Grossutti |
| 4,277,858 | A | 7/1981 | Bohme |
| 4,346,487 | A | 8/1982 | Holdt |
| 4,370,765 | A | 2/1983 | Webber |
| 4,375,706 | A | 3/1983 | Finnhult |
| 4,376,317 | A | 3/1983 | Johnston |
| 4,391,009 | A | 7/1983 | Schild et al. |
| 4,409,695 | A | 10/1983 | Johnston et al. |
| 4,432,359 | A | 2/1984 | James |
| 4,449,261 | A | 5/1984 | Magnusson |
| 4,485,505 | A | 12/1984 | Paul |
| 4,494,259 | A | 1/1985 | Miller et al. |
| 4,507,814 | A | 4/1985 | Zyki, Jr. |
| 4,509,217 | A | 4/1985 | Therrien |
| 4,545,084 | A | 10/1985 | Peterson |
| 4,612,679 | A | 9/1986 | Mitchell |
| 4,613,182 | A | 9/1986 | Stone |
| 4,613,997 | A | 9/1986 | Langdale |
| 4,632,450 | A | 12/1986 | Holdt |
| 4,639,954 | A | 2/1987 | Speed |
| 4,653,129 | A | 3/1987 | Kuck et al. |
| 4,654,903 | A | 4/1987 | Chubb et al. |
| 4,658,450 | A | 4/1987 | Thompson |
| 4,669,136 | A | 6/1987 | Waters et al. |
| 4,672,698 | A | 6/1987 | Sands |
| 4,679,569 | A | 7/1987 | Lee |
| 4,686,725 | A | 8/1987 | Mitchell |
| 4,700,417 | A | 10/1987 | McGovern |
| 4,706,313 | A | 11/1987 | Murphy |
| 4,709,790 | A | 12/1987 | Freitag et al. |
| 4,724,554 | A | 2/1988 | Kowalski et al. |

(56) References Cited

U.S. PATENT DOCUMENTS

| | | | |
|---|---|---|---|
| 4,724,555 | A | 2/1988 | Poehner et al. |
| 4,787,104 | A | 11/1988 | Grantham |
| 4,821,351 | A | 4/1989 | Bergenwall |
| 4,829,616 | A | 5/1989 | Walker |
| 4,847,929 | A | 7/1989 | Pupovic |
| 4,852,195 | A | 8/1989 | Shulman |
| 4,862,529 | A | 9/1989 | Peck |
| 4,862,530 | A | 9/1989 | Chen |
| 4,862,538 | A | 9/1989 | Spann et al. |
| 4,864,671 | A | 9/1989 | Evans |
| 4,897,890 | A | 2/1990 | Walker |
| 4,899,404 | A | 2/1990 | Galumbeck |
| 4,901,387 | A | 2/1990 | Luke |
| 4,918,829 | A | 4/1990 | Harris |
| 4,941,221 | A | 7/1990 | Kanzler |
| 4,944,054 | A | 7/1990 | Bossert |
| 4,947,496 | A | 8/1990 | Connolly |
| 4,947,500 | A | 8/1990 | Seiler |
| 4,949,414 | A | 8/1990 | Thomas et al. |
| 4,953,243 | A | 9/1990 | Birkmann |
| 4,953,247 | A | 9/1990 | Hasty |
| 4,962,552 | A | 10/1990 | Hasty |
| 4,977,629 | A | 12/1990 | Jones |
| 4,985,946 | A | 1/1991 | Foster et al. |
| 4,986,738 | A | 1/1991 | Kawasaki et al. |
| 4,993,089 | A | 2/1991 | Solomon et al. |
| 4,997,200 | A | 3/1991 | Earls |
| 5,023,967 | A | 6/1991 | Ferrand |
| 5,025,519 | A | 6/1991 | Spann et al. |
| 5,031,261 | A | 7/1991 | Fenner, Sr. |
| 5,039,158 | A | 8/1991 | Maier |
| 5,040,253 | A | 8/1991 | Cheng |
| 5,050,899 | A | 9/1991 | Stensby |
| 5,070,560 | A | 12/1991 | Wilkinson |
| 5,072,463 | A | 12/1991 | Willis |
| 5,077,843 | A | 1/1992 | Foster et al. |
| 5,083,332 | A | 1/1992 | Foster et al. |
| 5,083,334 | A | 1/1992 | Huck et al. |
| 5,084,925 | A | 2/1992 | Cook |
| 5,092,007 | A | 3/1992 | Hasty |
| 5,095,561 | A | 3/1992 | Green et al. |
| 5,103,519 | A | 4/1992 | Hasty |
| 5,107,558 | A | 4/1992 | Lück |
| 5,109,560 | A | 5/1992 | Uetake |
| 5,117,521 | A | 6/1992 | Foster et al. |
| 5,121,513 | A | 6/1992 | Thomas et al. |
| 5,129,115 | A | 7/1992 | Higgins et al. |
| 5,129,116 | A | 7/1992 | Borders et al. |
| 5,129,117 | A | 7/1992 | Celestina et al. |
| 5,157,787 | A | 10/1992 | Donnellan et al. |
| 5,157,800 | A | 10/1992 | Borders |
| 5,163,196 | A | 11/1992 | Graebe et al. |
| 5,169,208 | A | 12/1992 | Re et al. |
| 5,179,742 | A | 1/1993 | Oberle |
| 5,179,744 | A | 1/1993 | Foster et al. |
| 5,182,826 | A | 2/1993 | Thomas et al. |
| 5,187,824 | A | 2/1993 | Stryker |
| 5,214,809 | A | 6/1993 | Stuart |
| 5,224,228 | A | 7/1993 | Larrimore |
| 5,230,113 | A | 7/1993 | Foster et al. |
| 5,233,974 | A | 8/1993 | Senoue et al. |
| 5,243,721 | A | 9/1993 | Teasdale |
| 5,249,319 | A | 10/1993 | Higgs |
| 5,252,278 | A | 10/1993 | Spann et al. |
| 5,259,079 | A | 11/1993 | Visser et al. |
| 5,267,365 | A | 12/1993 | Walter |
| 5,279,010 | A | 1/1994 | Ferrand et al. |
| 5,325,551 | A | 7/1994 | Tappel et al. |
| 5,329,657 | A | 7/1994 | Bartley et al. |
| 5,331,698 | A | 7/1994 | Newkirk et al. |
| 5,335,651 | A | 8/1994 | Foster et al. |
| 5,337,845 | A | 8/1994 | Foster et al. |
| 5,342,114 | A | 8/1994 | Burke et al. |
| 5,347,682 | A | 9/1994 | Edgerton, Jr. |
| 5,348,367 | A | 9/1994 | Mizelle |
| 5,366,036 | A | 11/1994 | Perry |
| 5,370,111 | A | 12/1994 | Reeder et al. |
| 5,375,910 | A | 12/1994 | Murphy |
| 5,377,370 | A | 1/1995 | Foster et al. |
| D355,322 | S | 2/1995 | Ackley et al. |
| 5,394,581 | A | 3/1995 | Leoutsakos |
| 5,398,354 | A | 3/1995 | Balonick et al. |
| 5,398,357 | A | 3/1995 | Foster |
| 5,402,544 | A | 4/1995 | Crawford et al. |
| 5,412,821 | A | 5/1995 | Wilkinson |
| 5,425,148 | A | 6/1995 | Ashcraft et al. |
| 5,444,883 | A | 8/1995 | Iura |
| 5,454,126 | A | 10/1995 | Foster et al. |
| 5,454,142 | A | 10/1995 | Neely et al. |
| 5,457,831 | A | 10/1995 | Foster et al. |
| 5,461,741 | A | 10/1995 | Graebe |
| 5,479,665 | A | 1/1996 | Cassidy et al. |
| 5,479,666 | A | 1/1996 | Foster et al. |
| 5,481,770 | A | 1/1996 | Ahlsten |
| 5,481,772 | A | 1/1996 | Glynn et al. |
| 5,483,709 | A | 1/1996 | Foster et al. |
| 5,485,699 | A | 1/1996 | Gabhart |
| 5,487,196 | A | 1/1996 | Wilkinson et al. |
| 5,497,766 | A | 3/1996 | Foster et al. |
| 5,502,853 | A | 4/1996 | Singleton et al. |
| 5,507,562 | A | 4/1996 | Wieland |
| 5,513,406 | A | 5/1996 | Foster et al. |
| 5,542,136 | A | 8/1996 | Tappel |
| 5,551,107 | A | 9/1996 | Graebe |
| 5,562,091 | A | 10/1996 | Foster et al. |
| 5,568,660 | A | 10/1996 | Raburn et al. |
| 5,577,279 | A | 11/1996 | Foster et al. |
| 5,580,504 | A | 12/1996 | Spann et al. |
| 5,586,346 | A | 12/1996 | Stacy et al. |
| 5,596,781 | A | 1/1997 | Graebe |
| 5,603,133 | A | 2/1997 | Vrzalik |
| 5,604,942 | A | 2/1997 | Allevato et al. |
| 5,606,754 | A | 3/1997 | Hand et al. |
| 5,611,096 | A | 3/1997 | Bartlett et al. |
| 5,613,252 | A | 3/1997 | Yu et al. |
| 5,613,255 | A | 3/1997 | Bish et al. |
| 5,620,066 | A | 4/1997 | Schuttler |
| 5,628,078 | A | 5/1997 | Pennington et al. |
| 5,630,238 | A | 5/1997 | Weismiller et al. |
| 5,634,224 | A | 6/1997 | Gates |
| 5,638,563 | A | 6/1997 | Iura |
| 5,642,546 | A | 7/1997 | Shoenhair |
| 5,649,331 | A | 7/1997 | Wilkinson et al. |
| 5,652,985 | A | 8/1997 | Wilkinson et al. |
| 5,659,910 | A | 8/1997 | Weiss |
| 5,666,681 | A | 9/1997 | Meyer et al. |
| 5,672,849 | A | 9/1997 | Foster et al. |
| 5,680,661 | A | 10/1997 | Foster et al. |
| 5,682,631 | A | 11/1997 | Weismiller |
| 5,689,845 | A | 11/1997 | Sobieralski |
| 5,692,256 | A | 12/1997 | Kramer et al. |
| 5,699,566 | A | 12/1997 | Chuang |
| 5,708,997 | A | 1/1998 | Foster et al. |
| 5,715,548 | A | 2/1998 | Weismiller |
| 5,724,685 | A | 3/1998 | Weismiller et al. |
| 5,731,062 | A | 3/1998 | Kim et al. |
| 5,732,423 | A | 3/1998 | Weismiller et al. |
| 5,742,957 | A | 4/1998 | Vanzant |
| 5,745,936 | A | 5/1998 | Van McCutchen et al. |
| 5,745,937 | A | 5/1998 | Weismiller et al. |
| 5,749,112 | A | 5/1998 | Metzler |
| 5,771,511 | A | 6/1998 | Kummer et al. |
| 5,781,949 | A | 7/1998 | Weismiller et al. |
| 5,784,732 | A | 7/1998 | Vail |
| 5,790,997 | A | 8/1998 | Ruehl |
| 5,832,549 | A | 11/1998 | Le Pallec et al. |
| 5,845,352 | A | 12/1998 | Matsler et al. |
| 5,857,739 | A | 1/1999 | Smith |
| 5,860,899 | A | 1/1999 | Rassman |
| 5,878,452 | A | 3/1999 | Brooke et al. |
| 5,926,878 | A | 7/1999 | Morton et al. |
| 5,933,888 | A | 8/1999 | Foster et al. |
| 5,940,910 | A | 8/1999 | Weismiller et al. |
| 5,963,998 | A | 10/1999 | Carew et al. |

(56) References Cited

U.S. PATENT DOCUMENTS 5,983,429 A 11/1999 Stacy et al.
5,987,668 A 11/1999 Ackley
5,996,150 A 12/1999 Blevins et al.
6,000,076 A 12/1999 Webster et al.
6,036,271 A 3/2000 Wilkinson et al.
6,038,717 A 3/2000 Persson
6,038,721 A 3/2000 Gordon
6,047,422 A 4/2000 Yousif
6,047,424 A 4/2000 Osborne et al.
6,058,531 A 5/2000 Carroll
6,058,533 A 5/2000 Nelson
6,089,593 A 7/2000 Hanson et al.
6,095,610 A 8/2000 Okajima et al.
6,098,222 A 8/2000 Hand et al.
6,112,345 A 9/2000 Foster et al.
6,112,867 A 9/2000 Mintgen et al.
6,119,291 A 9/2000 Osborne et al.
6,141,806 A 11/2000 Bobey et al.
6,151,739 A 11/2000 Meyer et al.
6,154,899 A 12/2000 Brooke et al.
6,163,903 A 12/2000 Weismiller et al.
6,182,310 B1 2/2001 Weismiller et al.
6,212,714 B1 4/2001 Allen et al.
6,223,369 B1 5/2001 Maier et al.
6,230,346 B1 5/2001 Branson et al.
6,240,583 B1 6/2001 Brooke et al.
6,253,397 B1 7/2001 Bartow et al.
6,256,812 B1 7/2001 Bartow et al.
6,256,821 B1 7/2001 Boyd
6,256,822 B1 7/2001 Weston et al.
6,269,504 B1 8/2001 Romano et al.
6,269,505 B1 8/2001 Wilkinson
6,272,702 B1 8/2001 Uchida et al.
6,282,735 B1 9/2001 Stolpmann et al.
6,282,737 B1 9/2001 Vrzalik
6,286,166 B1 9/2001 Henley et al.
6,295,675 B1 10/2001 Ellis et al.
6,296,089 B1 10/2001 Koch et al.
6,315,319 B1 11/2001 Hanson et al.
6,320,510 B2 11/2001 Menkedick et al.
6,324,709 B1 12/2001 Ikeda et al.
6,336,235 B1 * 1/2002 Ruehl .................... A61G 7/00 5/624
6,347,422 B2 2/2002 Heavrin
6,351,863 B1 3/2002 Meyer et al.
6,353,950 B1 3/2002 Bartlett et al.
6,357,065 B1 3/2002 Adams
6,360,385 B1 3/2002 Lewandowski
6,363,552 B1 4/2002 Hornbach et al.
6,374,436 B1 4/2002 Foster
6,374,437 B1 4/2002 Voelker
6,397,416 B2 6/2002 Brooke et al.
6,401,277 B1 6/2002 Savage et al.
6,415,814 B1 7/2002 Hand et al.
6,427,264 B1 8/2002 Metz et al.
6,427,270 B1 8/2002 Blevins et al.
6,446,283 B1 9/2002 Heimbrock et al.
6,460,930 B2 10/2002 Thornton
6,481,033 B2 11/2002 Fogel
6,484,332 B2 11/2002 Korver, II
6,496,993 B2 12/2002 Allen et al.
6,499,163 B1 12/2002 Stensby
6,499,167 B1 12/2002 Ellis et al.
6,505,368 B1 1/2003 Ellis
6,516,479 B1 2/2003 Barbour
6,526,609 B2 3/2003 Wong
6,536,056 B1 3/2003 Vrzalik et al.
6,539,566 B1 4/2003 Hayes
6,547,330 B1 4/2003 Hester
6,560,793 B2 5/2003 Walker
6,564,409 B2 5/2003 Metz et al.
6,565,112 B2 5/2003 Hanson et al.
6,584,628 B1 * 7/2003 Kummer .............. A61G 7/0507 5/713
6,584,629 B2 7/2003 Tsuji et al.
6,601,251 B2 8/2003 Paul
6,601,253 B1 8/2003 Tarquinio
6,611,979 B2 9/2003 Welling et al.
6,622,323 B2 9/2003 Zerhusen et al.
6,622,364 B2 9/2003 Hamilton et al.
6,623,080 B2 9/2003 Clapper
6,640,360 B2 11/2003 Hornbach et al.
6,640,361 B2 11/2003 Heimbrock et al.
6,643,873 B2 11/2003 Heimbrock et al.
6,651,281 B1 11/2003 Figiel
6,654,974 B2 12/2003 Ruehl et al.
6,658,680 B2 12/2003 Osborne et al.
6,662,393 B2 12/2003 Boyd
6,663,184 B2 12/2003 Hagiike
6,675,415 B2 1/2004 Wong
6,678,908 B2 1/2004 Borders et al.
6,684,427 B2 2/2004 Allen et al.
6,684,436 B1 2/2004 Lovelace
6,684,472 B2 2/2004 Abdelmoula et al.
6,687,936 B2 2/2004 Graebe et al.
6,691,346 B2 2/2004 Osborne et al.
6,691,348 B2 2/2004 Plummer et al.
6,691,349 B2 2/2004 Blevins
6,691,350 B2 2/2004 Weismiller
6,692,069 B2 2/2004 Beroth et al.
6,694,548 B2 2/2004 Foster et al.
6,694,549 B2 2/2004 Perez et al.
6,694,557 B1 2/2004 Bobey et al.
6,695,406 B2 2/2004 Plant
6,698,836 B1 3/2004 Veneruso
6,701,556 B2 3/2004 Romano et al.
6,704,954 B2 3/2004 Metz et al.
6,704,956 B2 3/2004 Riley et al.
6,708,358 B2 3/2004 Hensley
6,715,169 B2 4/2004 Niederkrom
6,721,975 B1 4/2004 Lemire
6,725,474 B2 4/2004 Foster et al.
6,725,479 B1 4/2004 Stryker et al.
6,726,279 B1 4/2004 Figel et al.
6,728,983 B2 5/2004 Bartlett et al.
6,728,985 B2 5/2004 Brooke et al.
6,732,390 B2 5/2004 Krywiczanin
6,745,996 B1 6/2004 Guthrie
6,751,815 B2 6/2004 Heimbrock et al.
6,757,924 B2 7/2004 Goodwin et al.
6,779,209 B2 8/2004 Ganance
6,779,340 B2 8/2004 Pfaff et al.
6,781,517 B2 8/2004 Moster et al.
6,782,574 B2 8/2004 Totton et al.
6,791,460 B2 9/2004 Dixon et al.
6,799,340 B2 10/2004 Schatz
6,817,363 B2 11/2004 Biondo et al.
6,820,293 B2 11/2004 Alverson
6,820,294 B2 11/2004 Shiery et al.
6,820,640 B2 11/2004 Hand et al.
6,822,571 B2 11/2004 Conway
6,823,549 B1 11/2004 Hampton
6,826,793 B2 12/2004 Tekulve
6,826,795 B2 12/2004 Wilkinson
6,829,793 B2 12/2004 Brooke et al.
6,829,796 B2 12/2004 Salvatini et al.
6,839,926 B2 1/2005 Heimbrock et al.
6,846,042 B2 1/2005 Hanson et al.
6,851,142 B2 2/2005 Stryker et al.
6,854,145 B2 2/2005 Ruehl et al.
6,862,759 B2 3/2005 Hand et al.
6,862,762 B1 3/2005 Johnson et al.
6,866,341 B2 3/2005 Behnert
6,874,179 B2 4/2005 Hensley et al.
6,874,185 B1 4/2005 Phillips et al.
6,874,800 B2 4/2005 George
6,880,186 B2 4/2005 Johansson
6,880,189 B2 4/2005 Welling et al.
6,892,405 B1 5/2005 Dimitriu et al.
6,897,780 B2 5/2005 Ulrich et al.
6,901,617 B2 6/2005 Sprouse, II et al.
6,904,631 B2 6/2005 Vrzalik et al.
6,910,236 B2 6/2005 Rene
6,922,863 B2 8/2005 Giori et al.

(56) References Cited

U.S. PATENT DOCUMENTS 6,924,441 B1 8/2005 Mobley et al.
6,926,366 B2 8/2005 Wolters
6,928,673 B2 8/2005 Risk, Jr.
6,928,681 B1 8/2005 Stacy
6,934,987 B2 8/2005 Newkirk et al.
6,938,289 B2 9/2005 Morin
6,951,036 B2 10/2005 Lemire
6,952,846 B2 10/2005 Flannery et al.
6,952,852 B2 10/2005 Reeder et al.
6,976,281 B2 12/2005 Schunk et al.
6,978,501 B2 12/2005 Vrzalik
6,990,700 B2 1/2006 Chung
6,993,799 B2 2/2006 Foster et al.
7,000,272 B2 2/2006 Allen et al.
7,007,323 B2 3/2006 Zerhusen et al.
7,017,208 B2 3/2006 Weismiller et al.
7,028,352 B2 4/2006 Kramer et al.
7,028,358 B2 4/2006 Liu
7,036,166 B2 5/2006 Kramer et al.
7,039,972 B2 5/2006 Chaffee
7,044,460 B2 5/2006 Bolton
7,076,818 B2 7/2006 Kummer et al.
7,082,635 B2 8/2006 Barman et al.
7,086,107 B2 8/2006 Ellis et al.
7,107,636 B2 9/2006 Metz et al.
7,107,637 B2 9/2006 Kuek et al.
7,111,340 B2 9/2006 Mitchell et al.
7,114,207 B2 10/2006 Wang
7,120,950 B2 10/2006 Garrigues
7,120,955 B2 10/2006 Wang
7,127,762 B1 10/2006 Lau
7,171,708 B2 2/2007 Osborne et al.
7,182,323 B2 2/2007 Muller
7,188,379 B2 3/2007 James et al.
7,191,482 B2 3/2007 Romano et al.
7,191,483 B2 3/2007 Hochschild
7,213,279 B2 5/2007 Weismiller et al.
7,216,389 B2 5/2007 Ellis et al.
7,225,488 B2 6/2007 Wu
7,229,134 B2 6/2007 Ito
7,237,287 B2 7/2007 Weismiller et al.
7,237,471 B2 7/2007 Mintgen et al.
7,246,389 B2 7/2007 Taguchi et al.
7,260,860 B2 8/2007 Chambers et al.
7,263,734 B1 9/2007 Buchanan et al.
7,293,839 B2 11/2007 Shimizu
7,296,312 B2 11/2007 Menkedick
7,296,313 B2 11/2007 Hense
7,296,314 B2 11/2007 Wyatt et al.
7,313,837 B2 1/2008 Wang
7,325,265 B2 2/2008 Hornbach et al.
7,346,945 B2 3/2008 Phillips et al.
7,406,729 B2 8/2008 Hornbach et al.
7,412,734 B2 8/2008 Stryker et al.
7,430,771 B2 10/2008 Heimbrock
7,444,696 B2 11/2008 Lin et al.
7,458,119 B2 12/2008 Hornbach et al.
7,464,425 B2 12/2008 Chambers et al.
7,509,698 B2 3/2009 Poulos et al.
7,523,515 B2 4/2009 Allen et al.
7,536,739 B2 5/2009 Poulos et al.
7,568,247 B2 8/2009 Strobel et al.
7,587,776 B2 9/2009 Poulos et al.
7,600,817 B2 10/2009 Kramer
7,676,862 B2 3/2010 Poulos et al.
7,685,664 B2 3/2010 Stolpmann
7,698,761 B2 4/2010 Neuenswander et al.
7,716,766 B2 5/2010 Poulos et al.
7,743,441 B2 6/2010 Poulos et al.
7,757,318 B2 7/2010 Poulos et al.
7,774,876 B2 8/2010 Brown
7,779,494 B2 8/2010 Poulos et al.
7,784,128 B2 8/2010 Kramer
7,793,950 B2 9/2010 Van Eeden
7,832,528 B1 11/2010 Liang
7,836,531 B2 11/2010 Girard
8,056,160 B2 11/2011 Poulos et al.
8,063,785 B2 11/2011 Sacchetti
8,069,514 B2 12/2011 Poulos et al.
8,104,122 B2 1/2012 Richards et al.
8,104,123 B2 1/2012 Paz et al.
RE43,155 E 2/2012 Allen et al.
8,117,695 B2 2/2012 Paz
8,539,625 B2 9/2013 Poulos et al.
8,566,984 B2 10/2013 Paz et al.
8,590,073 B2 11/2013 Bly
8,793,824 B2 8/2014 Poulos et al.
8,955,176 B1 2/2015 Mullikin
9,119,753 B2 9/2015 Poulos et al.
9,320,663 B2 4/2016 Poulos et al.
9,687,401 B2 6/2017 Alford et al.
10,064,771 B2 9/2018 Poulos et al.
10,179,077 B2 1/2019 Poulos et al.
10,617,582 B2 4/2020 Poulos et al.
10,744,054 B2 8/2020 Poulos et al.
11,103,405 B2 8/2021 Poulos et al.
11,116,684 B2 9/2021 Poulos
11,141,335 B2 * 10/2021 Poulos .................. A61G 7/005
11,266,554 B2 3/2022 Poulos
11,458,056 B2 10/2022 Poulos et al.
11,523,955 B2 12/2022 Poulos et al.
2001/0048239 A1 12/2001 Kogure
2002/0059679 A1 5/2002 Weismiller
2002/0078509 A1 6/2002 Williams
2002/0174487 A1 11/2002 Kramer et al.
2003/0075966 A1 4/2003 Behnert
2003/0079293 A1 5/2003 Ellis et al.
2003/0080597 A1 5/2003 Beroth et al.
2003/0145383 A1 8/2003 Schwaegerle
2003/0167568 A1 9/2003 Brooke
2003/0172459 A1 9/2003 Roussy
2003/0177584 A1 9/2003 Boyd
2003/0208847 A1 11/2003 Vrzalik et al.
2003/0221262 A1 12/2003 Torbet et al.
2003/0221391 A1 12/2003 Bolton
2004/0010855 A1 1/2004 Piraino
2004/0034931 A1 2/2004 Kummer et al.
2004/0143904 A1 7/2004 Borders et al.
2004/0154097 A1 8/2004 Blevins
2004/0187217 A1 9/2004 Barman et al.
2004/0193078 A1 9/2004 Flick
2005/0012377 A1 1/2005 Ito
2005/0028289 A1 2/2005 Hakamiun
2005/0034764 A1 2/2005 Hanh et al.
2005/0076715 A1 4/2005 Kuklis et al.
2005/0104420 A1 5/2005 Murphy
2005/0160530 A1 7/2005 Taguchi et al.
2005/0166323 A1 8/2005 Kawakami et al.
2005/0166328 A1 8/2005 Ben-Levi
2005/0166330 A1 8/2005 Williams
2005/0172405 A1 8/2005 Menkedick
2005/0200180 A1 9/2005 Guyton
2005/0229321 A1 10/2005 Phillips et al.
2005/0262635 A1 12/2005 Wing
2006/0006724 A1 1/2006 Shimizu
2006/0021142 A1 2/2006 Hornback et al.
2006/0021144 A1 2/2006 Hornbach et al.
2006/0021145 A1 2/2006 Hornbach et al.
2006/0026762 A1 2/2006 Hornbach
2006/0026765 A1 2/2006 Hornbach et al.
2006/0026767 A1 2/2006 Chambers et al.
2006/0026768 A1 2/2006 Chambers et al.
2006/0031955 A1 2/2006 Barkhouse
2006/0031995 A1 2/2006 Barkhouse
2006/0053555 A1 3/2006 Poulos
2006/0059621 A1 3/2006 Poulos et al.
2006/0059624 A1 3/2006 Poulos et al.
2006/0101581 A1 5/2006 Blanchard et al.
2006/0150321 A1 7/2006 Brockman
2006/0167079 A1 7/2006 Menkedick et al.
2006/0168729 A1 8/2006 Weismiller et al.
2006/0168730 A1 8/2006 Menkedick et al.
2006/0168731 A1 8/2006 Menkedick et al.
2006/0195986 A1 9/2006 Hakamiun et al.

(56) References Cited

U.S. PATENT DOCUMENTS

| | | | |
|---|---|---|---|
| 2006/0260051 A1 | 11/2006 | Paz | |
| 2006/0272097 A1 | 12/2006 | Dionne et al. | |
| 2006/0277683 A1 | 12/2006 | Lamire | |
| 2007/0070684 A1 | 3/2007 | Poulos | |
| 2007/0080030 A1 | 4/2007 | Kramer | |
| 2007/0113352 A1 | 5/2007 | Poulos | |
| 2007/0163043 A1 | 7/2007 | Lemire et al. | |
| 2007/0169267 A1 | 7/2007 | Paz et al. | |
| 2007/0234477 A1 | 10/2007 | Dorenbeck | |
| 2007/0266499 A1 | 11/2007 | O'Keefe et al. | |
| 2008/0086815 A1 | 4/2008 | Kappeler et al. | |
| 2008/0201851 A1 | 8/2008 | Menkedick et al. | |
| 2008/0211248 A1 | 9/2008 | Lambarth | |
| 2009/0106906 A1* | 4/2009 | Soltani ............... | A61G 7/05769 5/713 |
| 2009/0300845 A1 | 12/2009 | Paz et al. | |
| 2010/0005592 A1 | 1/2010 | Poulos et al. | |
| 2010/0325794 A1 | 12/2010 | Chung | |
| 2011/0030142 A1 | 2/2011 | Karwal | |
| 2011/0113556 A1 | 5/2011 | Roussy | |
| 2012/0066832 A1 | 3/2012 | Poulos et al. | |
| 2012/0073052 A1 | 3/2012 | Meyer et al. | |
| 2012/0096644 A1 | 4/2012 | Heimbrock | |
| 2012/0144588 A1 | 6/2012 | Heimbrock | |
| 2012/0198613 A1 | 8/2012 | Jelinek | |
| 2012/0198629 A1 | 8/2012 | Hornbach | |
| 2012/0286557 A1 | 11/2012 | Hoffman et al. | |
| 2013/0139318 A1 | 6/2013 | Paz | |
| 2013/0145550 A1 | 6/2013 | Roussy et al. | |
| 2015/0007393 A1 | 1/2015 | Palashewski | |
| 2015/0237432 A1 | 10/2015 | Poulos | |
| 2016/0074265 A1 | 3/2016 | Lyon | |
| 2016/0193095 A1 | 7/2016 | Roussy | |
| 2017/0281440 A1 | 10/2017 | Puvogel | |
| 2018/0160820 A1 | 6/2018 | Hsu | |
| 2019/0076310 A1 | 3/2019 | Poulos | |
| 2019/0142671 A1 | 5/2019 | Poulos et al. | |
| 2019/0142672 A1 | 5/2019 | Poulos et al. | |
| 2019/0142673 A1 | 5/2019 | Poulos et al. | |
| 2019/0262201 A1 | 8/2019 | Borgman | |
| 2020/0008994 A1 | 1/2020 | Poulos et al. | |
| 2020/0008995 A1 | 1/2020 | Poulos et al. | |
| 2020/0230002 A1 | 7/2020 | Poulos et al. | |
| 2021/0177680 A1 | 6/2021 | Poulos et al. | |
| 2022/0023125 A1 | 1/2022 | Poulos et al. | |
| 2022/0023126 A1 | 1/2022 | Poulos et al. | |
| 2023/0113787 A1 | 4/2023 | Poulos et al. | |

FOREIGN PATENT DOCUMENTS

| | | | |
|---|---|---|---|
| CN | 101056557 | B | 1/2011 |
| DE | 8610640 | U1 | 6/1986 |
| DE | 8714843 | U1 | 2/1988 |
| EP | 0465810 | A1 | 1/1992 |
| EP | 1086681 | A1 | 3/2001 |
| EP | 1 147 757 | A2 | 10/2001 |
| EP | 1 621 173 | A2 | 2/2006 |
| EP | 1793706 | B1 | 7/2008 |
| GB | 183181 | A | 7/1922 |
| GB | 189572 | A | 12/1922 |
| JP | 11 221134 | A | 10/1999 |
| WO | WO 97/05845 | A1 | 2/1997 |
| WO | WO 98/04170 | A | 2/1998 |
| WO | WO 2004/060257 | A2 | 7/2004 |
| WO | WO 2006/036523 | A1 | 4/2006 |
| WO | WO 2007/021878 | A2 | 2/2007 |
| WO | WO 2013/192411 | A2 | 12/2013 |

OTHER PUBLICATIONS

Oct. 30, 2009—(WO) Written Opinion—App. No. PCT/US09/03811.

Jan. 5, 2011—(WO) IPRP—App. No. PCT/US09/03811.

Stryker, Isoflex Sleep Surface, 2005.

Geltec, Redux Tri-Zone Pressure/Shear Support Surface, at least as early as 2006.

Brochure for ROHO Dry Floatation Mattress System, received Nov. 2007.

International Search Report and Written Opinion for related International Patent Application No. PCT/US2015/049391 dated Jan. 20, 2016.

Information and photographs of a Vitalgo Standing Bed, at least as early as 2011.

* cited by examiner

FIG. 6D
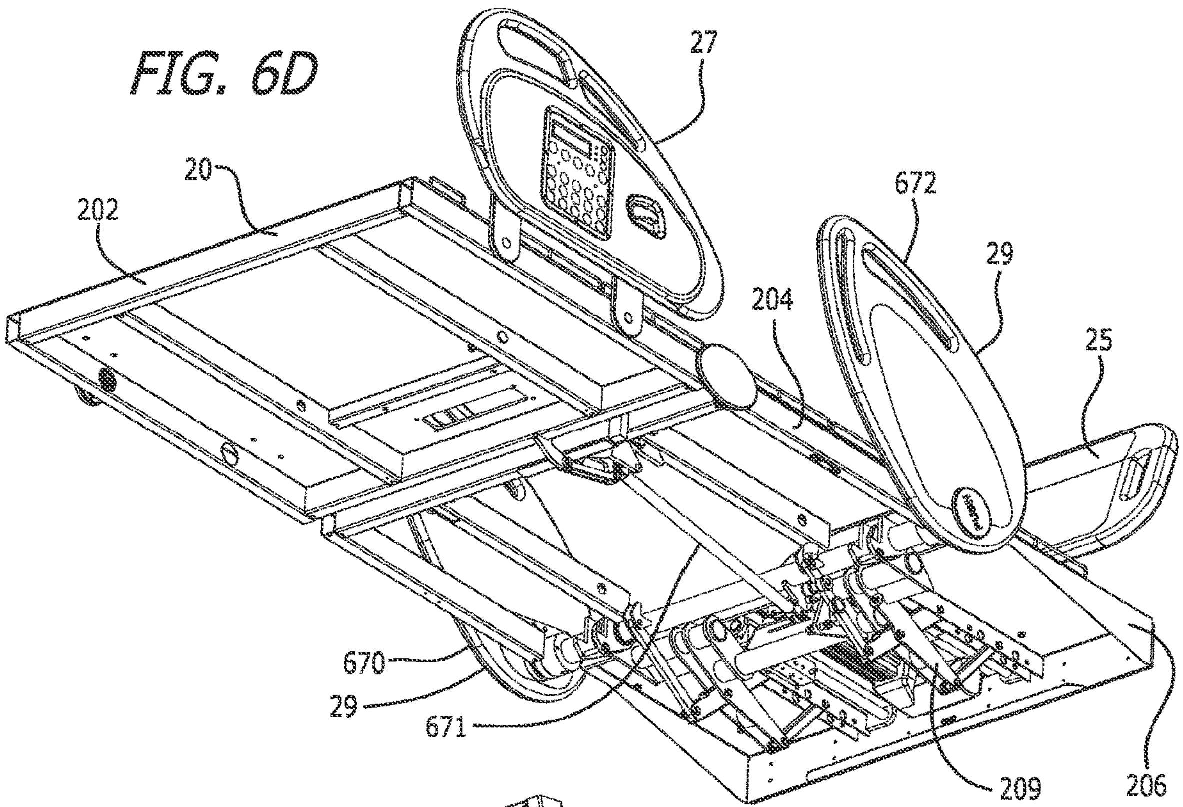
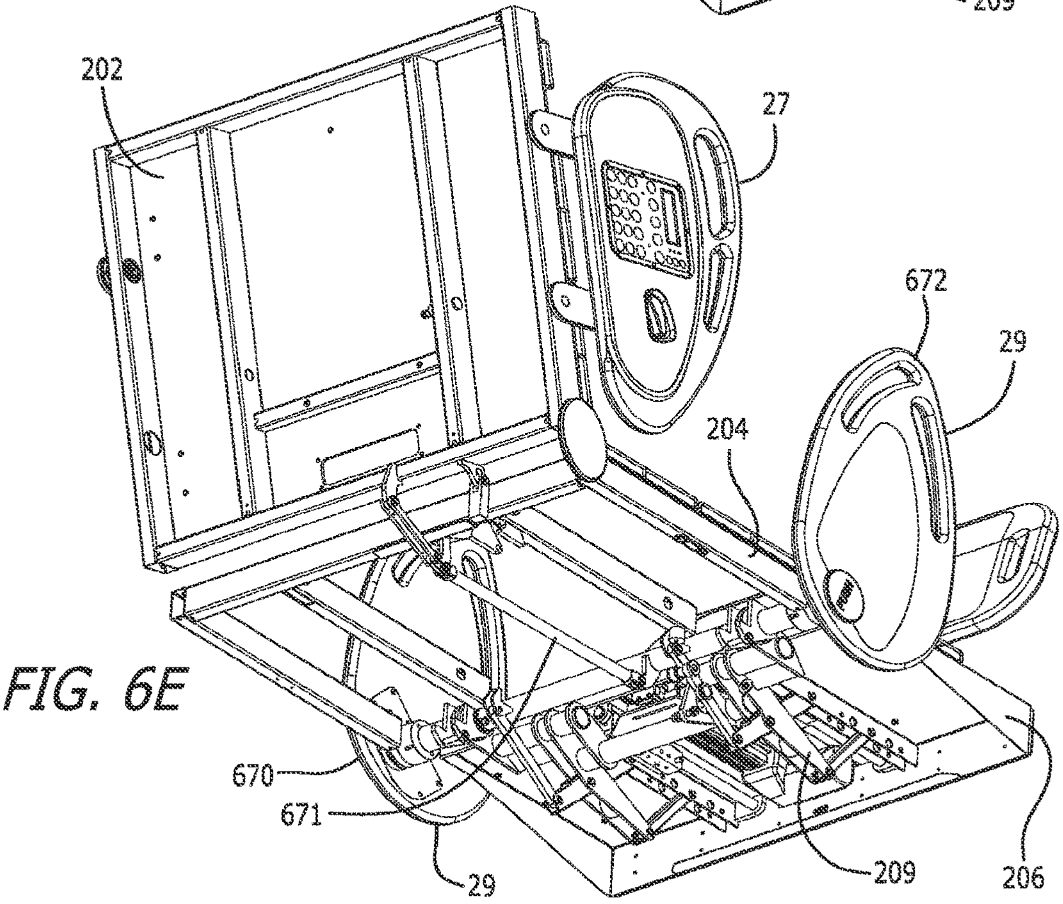
FIG. 6E

FIG. 9
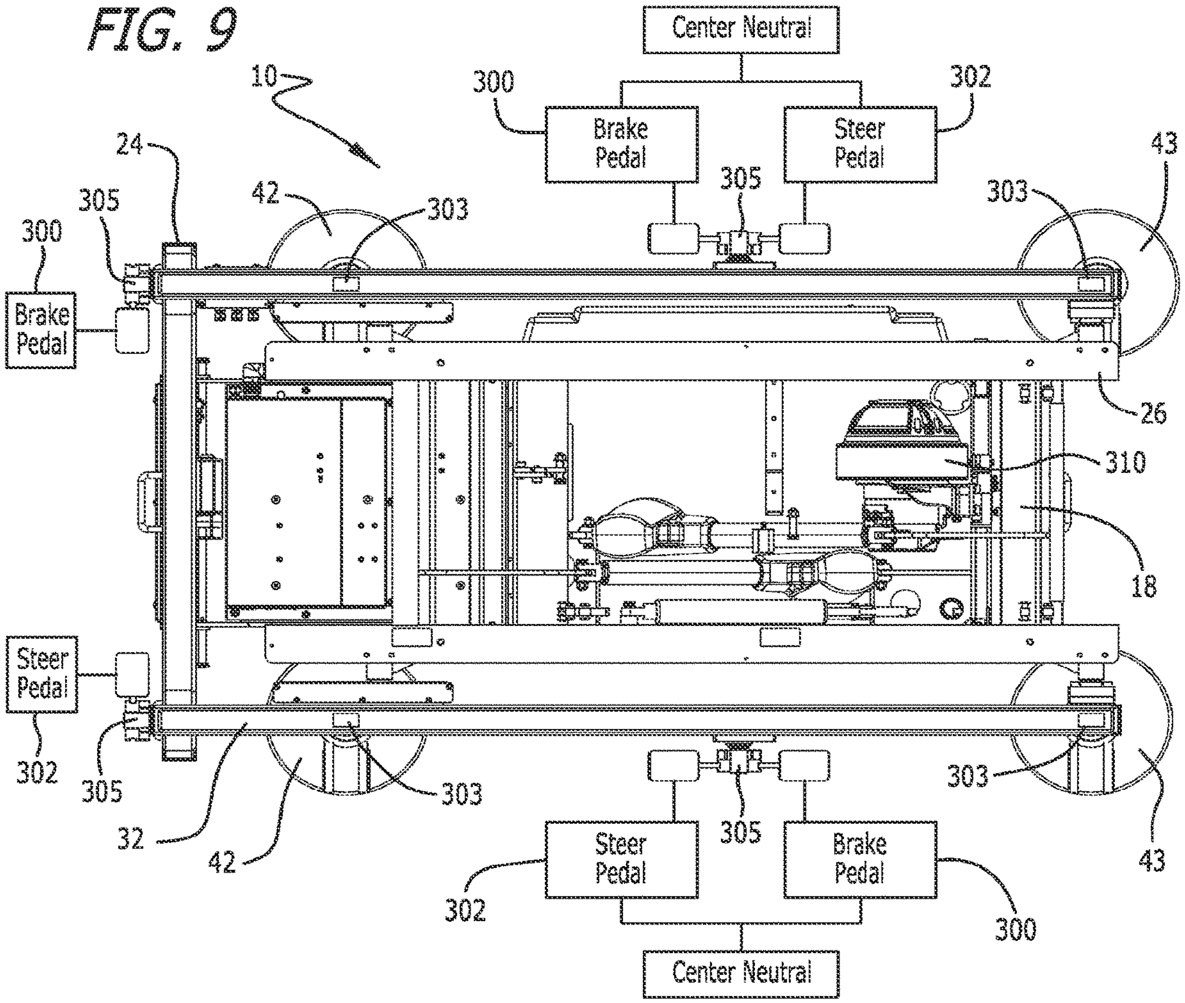
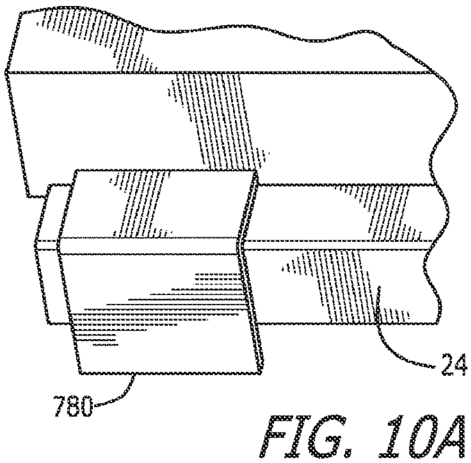
FIG. 10A
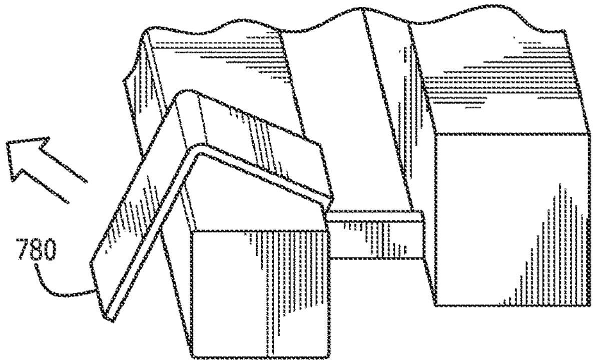
FIG. 10B

FIG. 15
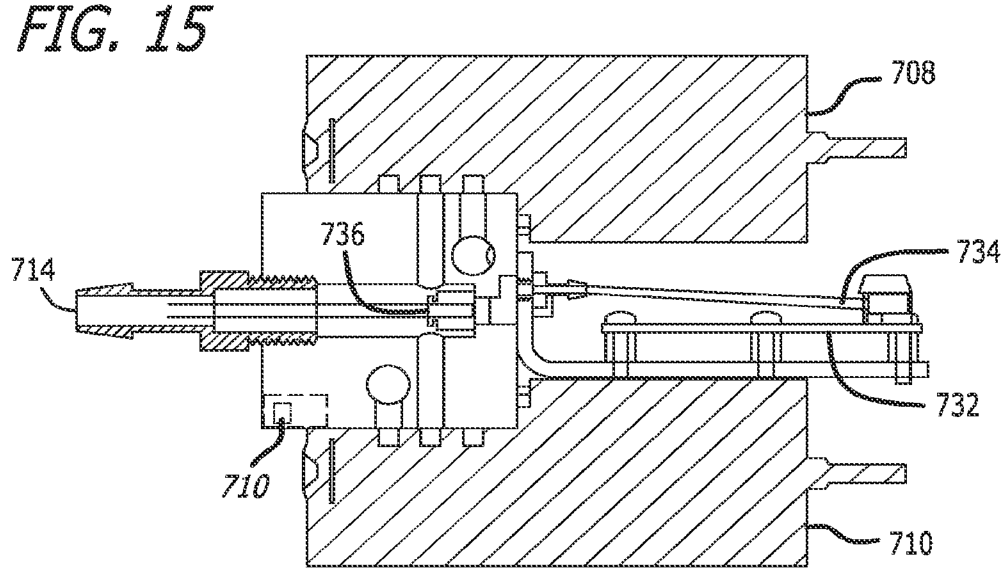
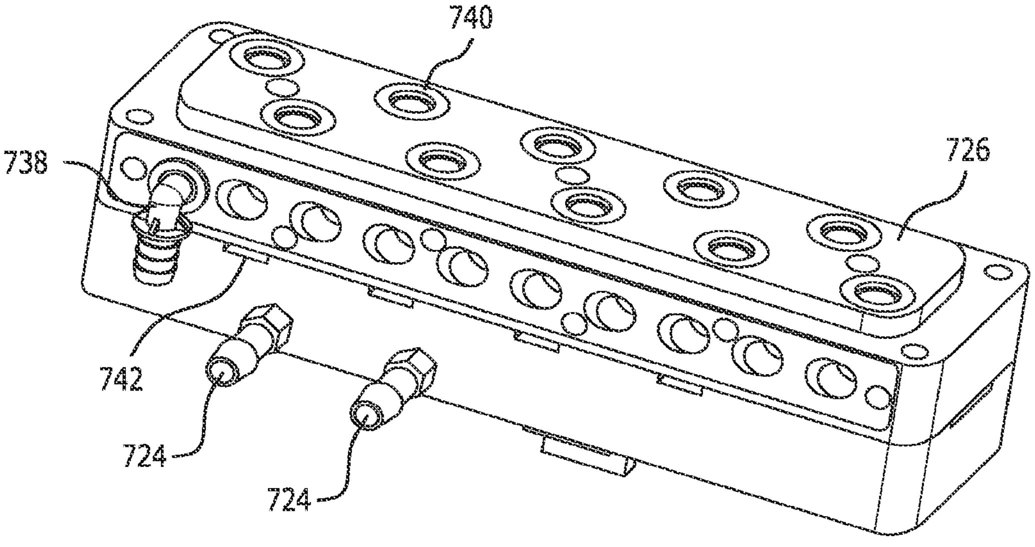
FIG. 16

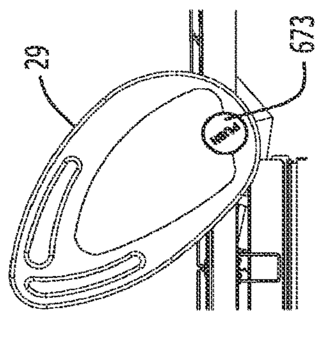
Highest Position
FIG. 17A
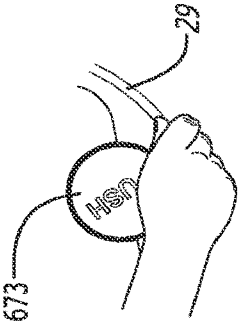
Unlocking Rail
FIG. 17B
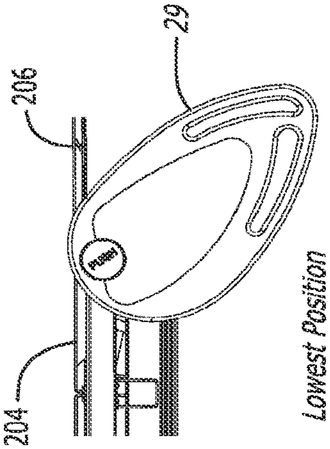
Lowest Position
FIG. 17C
FIG. 18A
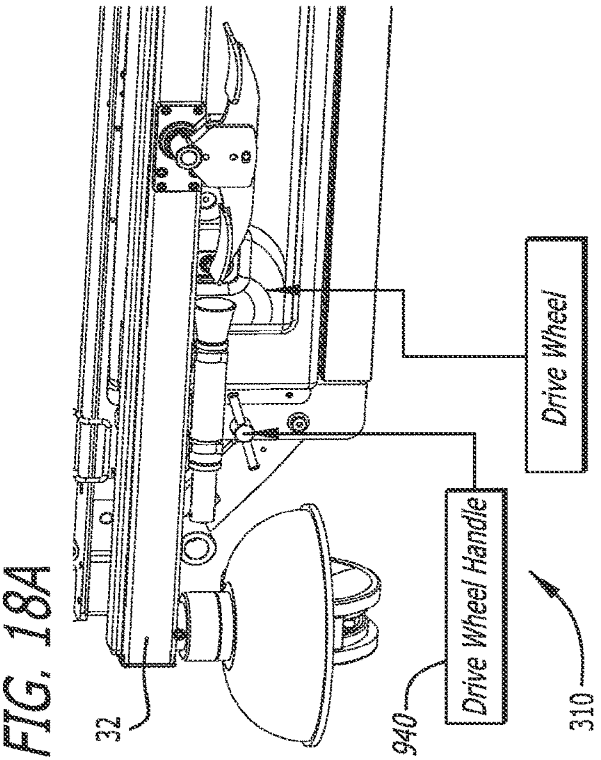
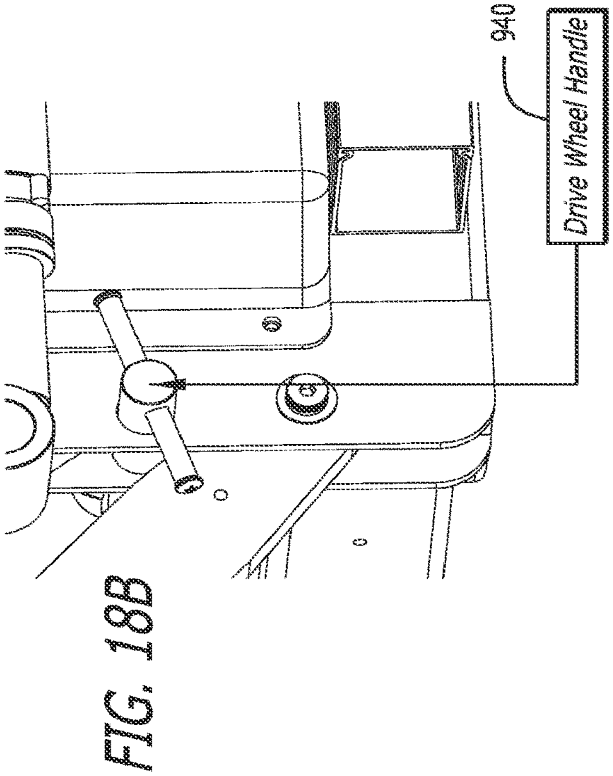
FIG. 18B

PATIENT SUPPORT WITH STAND-UP AND SIT FEATURES

CROSS-REFERENCE TO RELATED APPLICATIONS

This patent application is a continuation of copending U.S. patent application Ser. No. 16/576,578, filed Sep. 19, 2019, which is a continuation of U.S. patent application Ser. No. 16/244,960, filed Jan. 10, 2019, issued as U.S. Pat. No. 11,141,335, which is a continuation of U.S. patent application Ser. No. 14/690,387, filed Apr. 18, 2015, issued as U.S. Pat. No. 10,179,077, which claims the benefit of U.S. Provisional Patent Application No. 61/981,591, filed Apr. 18, 2014, which are incorporated by reference.

This patent application is a continuation of copending U.S. patent application Ser. No. 16/244,835, filed Jan. 10, 2019, which is a continuation of U.S. patent application Ser. No. 14/690,387, filed Apr. 18, 2015, issued as U.S. Pat. No. 10,179,077, which claims the benefit of U.S. Provisional Patent Application No. 61/981,591, filed Apr. 18, 2014, which are incorporated by reference.

This patent application is a continuation of copending U.S. patent application Ser. No. 17/496,525, filed Oct. 7, 2021, which is a continuation of U.S. patent application Ser. No. 16/576,578, filed Sep. 19, 2019, which is a continuation of U.S. patent application Ser. No. 16/244,960, filed Jan. 10, 2019, issued as U.S. Pat. No. 11,141,335, which is a continuation of U.S. patent application Ser. No. 14/690,387, filed Apr. 18, 2015, issued as U.S. Pat. No. 10,179,077, which claims the benefit of U.S. Provisional Patent Application No. 61/981,591, filed Apr. 18, 2014, which are incorporated by reference.

TECHNICAL FIELD

The present invention relates generally to a patient support, and more specifically to a bed being positionable to assist a patient to a sitting position and/or a standing position when the patient is lying on the bed, or to position a patient in any angular position between 0° (i.e., horizontal, lying position) and approximately 90° (i.e., vertical, standing position).

BACKGROUND OF THE INVENTION

Hospital beds are well known in the art. While hospital beds according to the prior art provide a number of advantageous features, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

BRIEF SUMMARY

The present invention generally provides a hospital bed having a tilt and stand capabilities.

According to one embodiment, a patient support bed is provided comprising: a base frame; a patient support assembly connected to the base frame, the patient support assembly having a separately movable head section, seat section and foot section, wherein the head section is adjacent a head of the bed, wherein the foot section is adjacent a foot end of the bed, and wherein the foot section transitions from a generally horizontal position to a generally vertical position to place the patient support bed in a chair orientation to allow a patient to exit the bed at the foot end of the bed; a tilt frame connected between the base frame and the patient support assembly, the tilt frame being rotatable adjacent the foot end of the bed to place the patient support assembly, including the head section, seat section and foot section, in a generally vertical position to allow a patient to exit the bed in a standing orientation; and, a foot board assembly connected to the foot section, the foot board assembly having a foot board, the foot board assembly separately movable about a longitudinal axis of the bed toward the head end and the foot end of the bed.

According to another embodiment, the patient support bed further comprises a mattress on the patient support assembly, the mattress connected at its foot end to the footboard assembly, the foot end of the mattress movable with the foot board toward the head end of the bed.

According to another embodiment, the patient support bed further comprises a first siderail adjacent the head section of the bed and a second siderail adjacent the foot section of the bed, and a linkage connecting the second siderail with the head section so that the second siderail rotates with the head section of the bed.

According to another embodiment, the patient support bed further comprises a CPR release to automatically drop the patient support assembly, including the head section, seat section and foot section, from the generally vertical position, when the bed is in a standing mode, to a generally horizontal position.

According to another embodiment, the CPR release disengages two actuators, including a first actuator for the head section and a second actuator for the tilt frame.

According to another embodiment, the patient support bed further comprises an actuator to separately raise and lower the head end of the patient support assembly when the head section, seat section and foot section are in parallel planes, and a separate actuator to separately raise and lower the foot end of the patient support assembly when the head section, seat section and foot section are in parallel planes, the separate actuators thereby providing to place the patient support assembly in both the Trendelenburg and reverse Trendelenburg positions.

According to another embodiment, the patient support bed further comprises a plurality of casters connected to the base frame and a powered locking system that locks each of the casters prior to the tilt frame being able to be tilted.

According to another embodiment, the patient support bed further comprises a sensor at a foot end of the foot section to sense pressure and have the bed stop movement when moving to either the chair orientation or the standing orientation.

According to another embodiment, the patient support bed further comprises a sensor at a foot end of the foot board to sense pressure and have the bed stop movement when moving to either the chair orientation or the standing orientation.

According to another embodiment, the patient support bed further comprises deck width extenders with connected mattresses at the head section and seat section.

According to another embodiment, the patient support bed further comprises a powered drive wheel connected to the base frame, and a controller for controlling the speed of the powered drive wheel, the controller connected to a headboard of the bed.

According to another embodiment, the patient support bed is provided comprising: a base frame; a patient support assembly connected to the base frame, the patient support assembly having a separately movable head section, seat section and foot section, wherein the head section is adjacent a head of the bed, wherein the foot section is adjacent a foot end of the bed; a foot board assembly connected to the foot section, the foot board assembly separately movable about a longitudinal axis of the bed toward the head end and the foot end of the bed; and, a mattress on the patient support assembly, the mattress connected at its foot end to the footboard assembly, the foot end of the mattress movable with the foot board assembly toward the head end of the bed.

According to another embodiment, a patient support bed is provided, comprising: a base frame; a patient support assembly connected to the base frame, the patient support assembly having a separately movable head section, seat section and foot section, wherein the head section is adjacent a head of the bed, wherein the foot section is adjacent a foot end of the bed; and, a first siderail adjacent the head section of the bed and a second siderail adjacent the foot section of the bed, and a linkage connecting the head section of the bed with the second siderail to rotate the second siderail with the head section of the bed.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 6D is a bottom perspective view of the patient support bed of FIG. 6A illustrating the linkage between the head deck section and the foot siderail.

FIG. 6E is another bottom perspective view of the patient support bed of FIG. 6A illustrating the linkage between the head deck section of the foot siderail.

FIG. 9 is a schematic of a brake and steer system for one embodiment of a patient support bed.

FIG. 10A is a perspective view of a CPR handle for a patient support bed in the unactuated position.

FIG. 10B is a perspective view of a CPR handle for a patient support bed in the actuated position.

FIG. 15 is a cross-sectional view of the main manifold and valve control system of FIG. 14.

FIG. 16 is a perspective view of one embodiment of a CPR manifold for a patient support bed.

FIGS. 17A-17C are schematics of the movement of second-end siderail of the patient support bed of FIG. 2.

FIG. 18A is a partial perspective view of one embodiment of an optional drive system for the patient support bed.

FIG. 18B is a partial perspective view of one embodiment of a drive wheel handle for the optional drive system of FIG. 18A.

DETAILED DESCRIPTION OF THE INVENTION

Figure 1A:
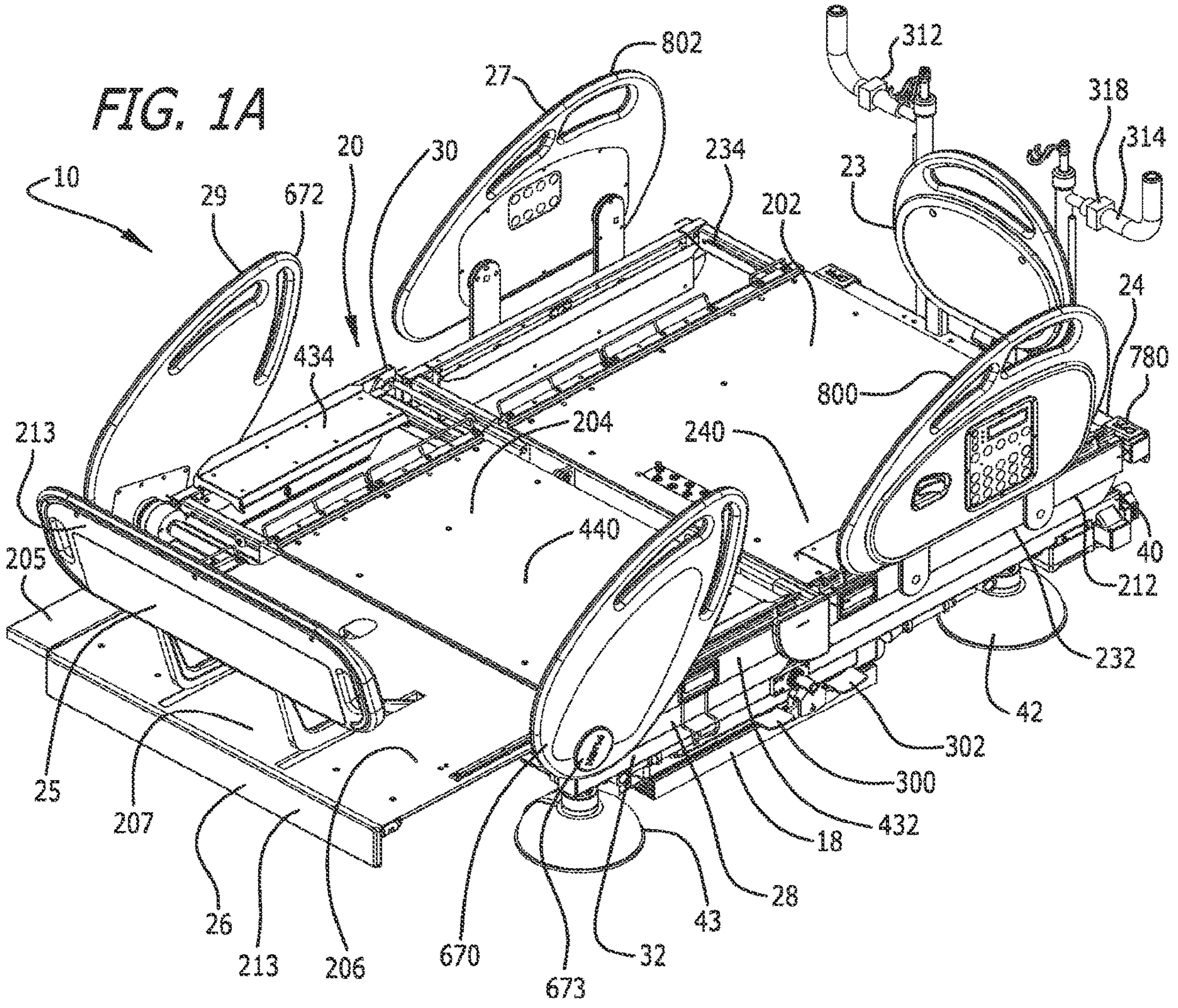
FIG. 1A is a perspective view of one embodiment of a patient support bed in a lowered bed position and with optional width extenders.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now to the Figures, there is shown a variety of embodiments of patient support beds 10. The term "bed" herein is used to denote any embodiment of a support for a patient. As such, in different embodiments the "bed" is provided as a traditional bed, a gurney or stretcher (not shown), an operating room table or surgical table (not shown), a bed that expands and contracts in width (see FIG. 1A-1D), a bed that converts to a chair to allow the patient to exit the bed (see FIGS. 2A-2D, 3A-3B and 6A-6C), a bed that tilts to allow the patient to exit and enter the bed standing (see FIGS. 4A-4C), and a variety of combinations thereof. Additionally, each of these variations may have a variety of optional equipment and support surfaces associated therewith.

In the chair bed embodiment the bed 10 is manipulated to achieve both a conventional bed position having a generally horizontal patient support or sleeping surface upon which a user lies in a supine position, and a sitting position wherein the foot deck of the bed is provided in a generally vertical position such that the user's feet can be positioned on or adjacent the floor and the back of the user is supported by a raised back support. In the expanding width bed configuration the bed 10 is manipulated to convert to a wider patient support surface at various sections of the bed 10. The width of the expanding width bed 10 may be narrowed, however, to that of a conventional hospital bed to provide for ease of mobility of the bed 10. Additionally, in one embodiment the bed 10 is a bariatric bed, meaning it is provided to support morbidly obese patients. In the standing or tilt configuration the bed 10 is manipulated to angularly rotate the patient support surface to a substantially vertical position, wherein the entire patient support surface is generally in-line and preferably at an angle of about 75° from the horizontal, to allow a patient to exit and enter the bed standing. Alternately, the tilt or stand bed may be stopped at any angle between 0° and 75° to provide for different therapeutic benefit to the patient. The tilt bed also may have, as part of its control system, features to provide reports on the amount of tilt (i.e., angle), length/duration of tilt at each angle, etc. Such reports and data may be downloaded from the controller to provide history reports to the clinicians.

In various embodiments, patient support beds 10 are provided as shown in FIGS. 1A-1D and 2A-2D. Each bed 10 generally comprises a base frame assembly 32, an intermediate frame assembly 18 coupled to the base frame assembly 32, a weigh frame assembly 34 coupled to the intermediate frame assembly 18, and a patient support assembly 19 supported on the weigh frame assembly 34. In various embodiments, the base frame assembly 32 has a plurality of actuators that raise and lower the intermediate frame assembly 18. The weigh frame assembly 34 is preferably connected to the intermediate frame assembly 18, and the patient support assembly 19 is connected to the weigh frame assembly 34. Generally, the weigh frame assembly 34 is coupled to the intermediate frame assembly 18 by a plurality of load cells or load beams. In a bed that does not employ a tilting frame assembly, the patient support assembly 19 is coupled to the weigh frame assembly 34 by a plurality of actuators that raise and lower the different sections of the bed 10 (i.e., a head section, an intermediate or seat section, and a foot section), typically at various angular orientations.

Figure 4A:
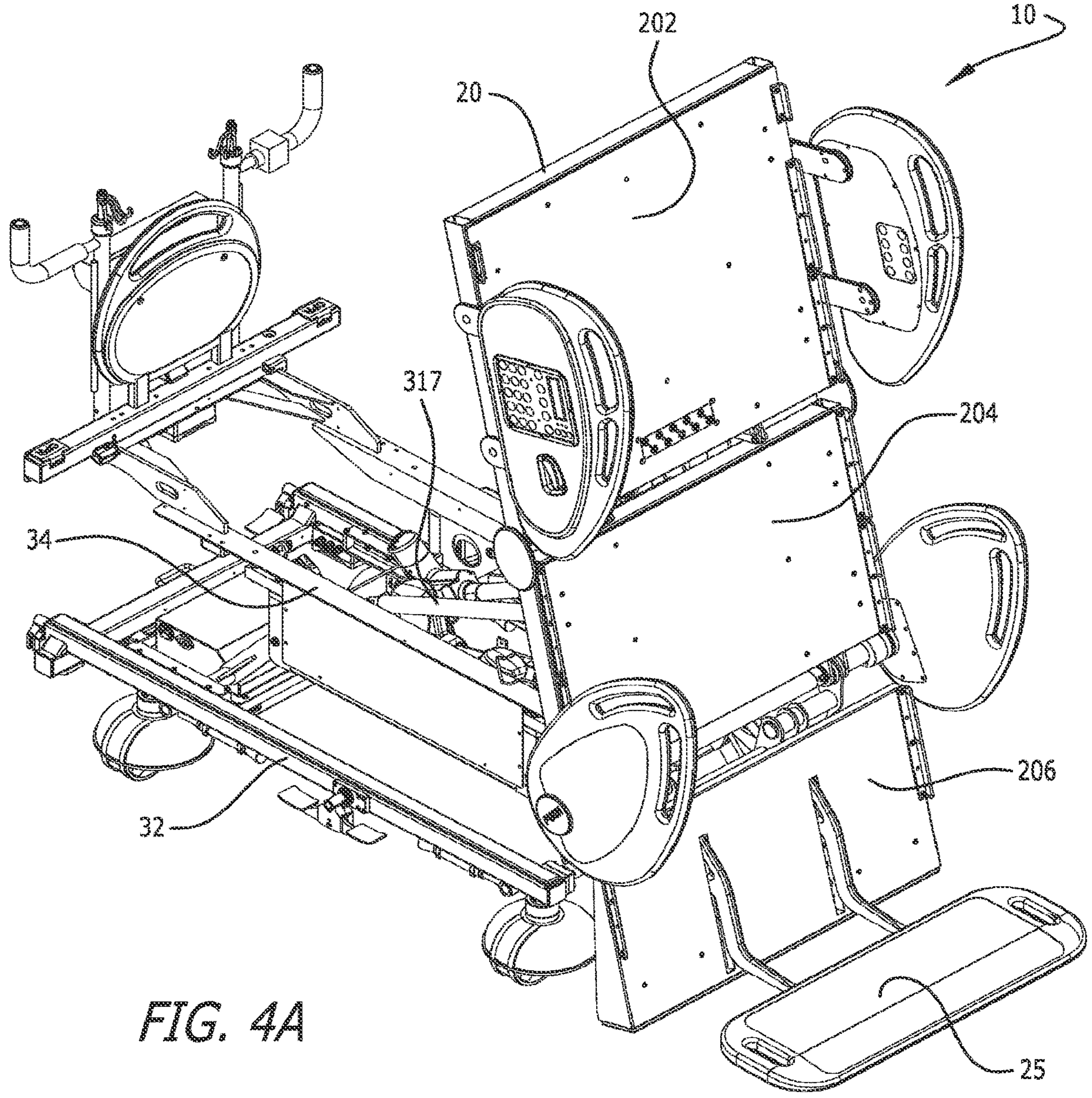
FIG. 4A is a front perspective view of one embodiment of a patient support bed in a standing position.
Figure 4B:
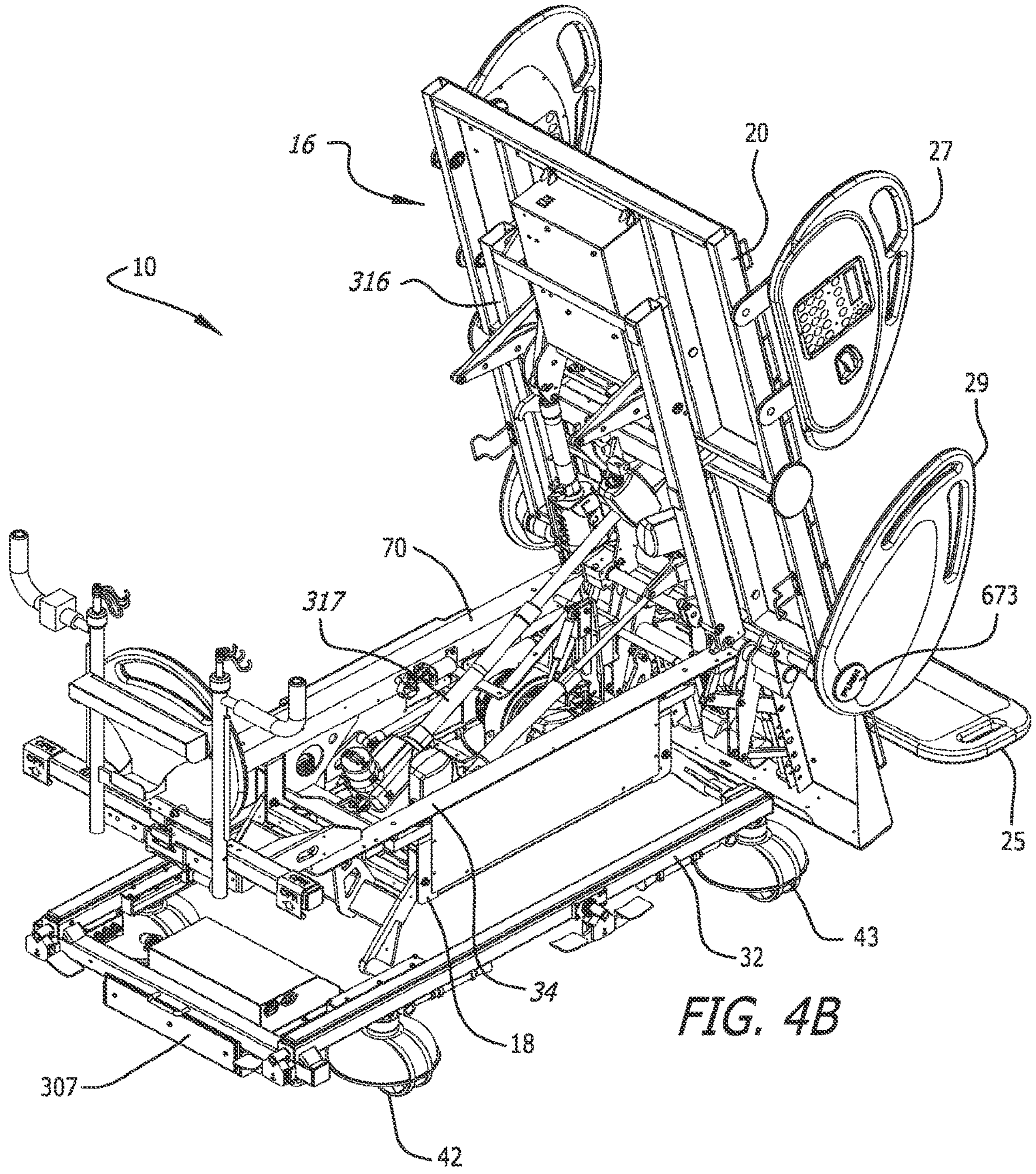
FIG. 4B is a rear perspective view of the patient support bed of FIG. 4A.
Figure 4C:
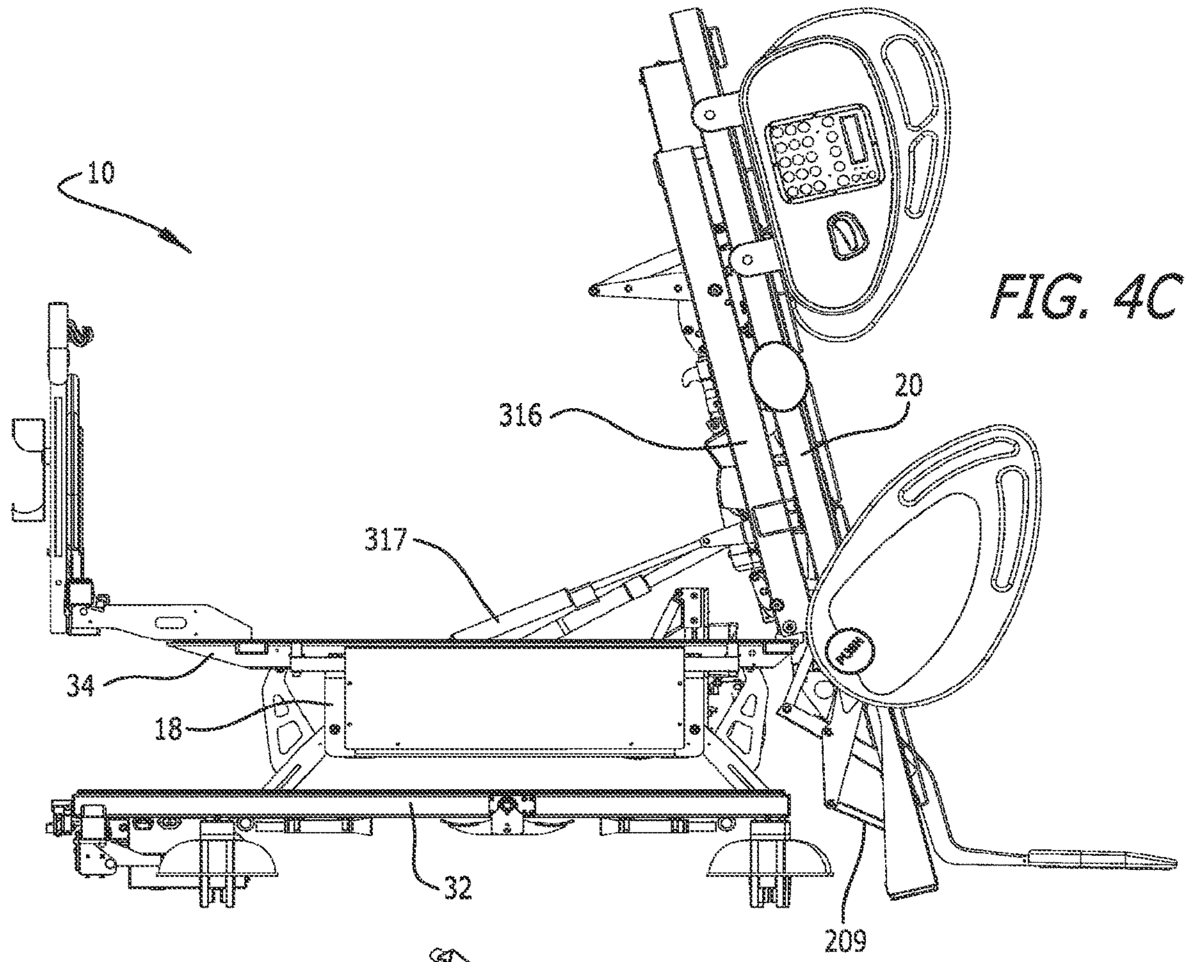
FIG. 4C is a side elevation view of the patient support bed of FIG. 4A.

In an embodiment where the bed can tilt to provide standing access and egress, such as shown in FIGS. 4A-4C, a tilting frame assembly 16 is provided. The tilting frame assembly 16 is supported by the weigh frame assembly 34 (see FIG. 4D). The tilting frame assembly 16 may preferably be connected with a lift actuator to the intermediate frame assembly 18 to provide for lifting of the tilting frame assembly 16. In a bed that employs a tilting frame assembly 16, the tilting frame assembly 16 is preferably connected to the weigh frame assembly 34, but becomes partially removed when in tilt/stand mode.

The patient support assembly 19 preferably comprises a support deck assembly 20 and a mattress 22, however, either component may be identified as the patient support. The patient support assembly 19 may also include a patient support extension assembly, also referred to as a deck extension assembly. Various embodiments of patient support extension assemblies are described in detail in U.S. application Ser. Nos. 11/224,668; 11/224,669; 11/224,739; and, Ser. No. 11/224,691.

The mattress 22 may be a foam mattress, closed air-cell mattress, inflatable mattress, low-air loss mattress, fluidized mattress, percussion mattress, rotation mattress or any other type of mattress known in the art, including a mattress made of a combination of the aforementioned. As explained above, in one embodiment without tilt/stand up capabilities the patient support assembly 19 is connected to the weigh frame assembly 34, and the weigh frame assembly 34 is connected to the intermediate frame assembly 18 via load cells. If tilt/stand up capabilities are provided, the tilt frame assembly 16 will typically be connected to the weigh frame assembly 34. In one embodiment the bed 10 will be capable of transitioning to a chair orientation, and in some embodiments also or alternately to an expanded width orientation.

The bed 10 has a head end 24, a foot end 26 opposing the head end 24, a first side 28 and a second side 30 opposing the first side 28. The term "head end" is used to denote the end of any referred to object that is positioned nearest the head end 24 of the bed 10, and the term "foot end" is used to denote the end of any referred to object that is positioned nearest the foot end 26 of the bed 10.

The bed 10 also preferably has a headboard 23 and a footboard 25. In one embodiment, the headboard 23, as shown in FIGS. 3A-3B is generally removably connected to the weigh frame 70 of the weigh frame assembly 34, and in alternate embodiments it may be connected to the intermediate frame assembly 18. The headboard 23 is generally provided at the very head end 24 of the bed 10. In a preferred embodiment the footboard 25, as shown in FIGS. 1-6, is movably connected to the foot deck section 206 of the bed 10.

Figure 5A:
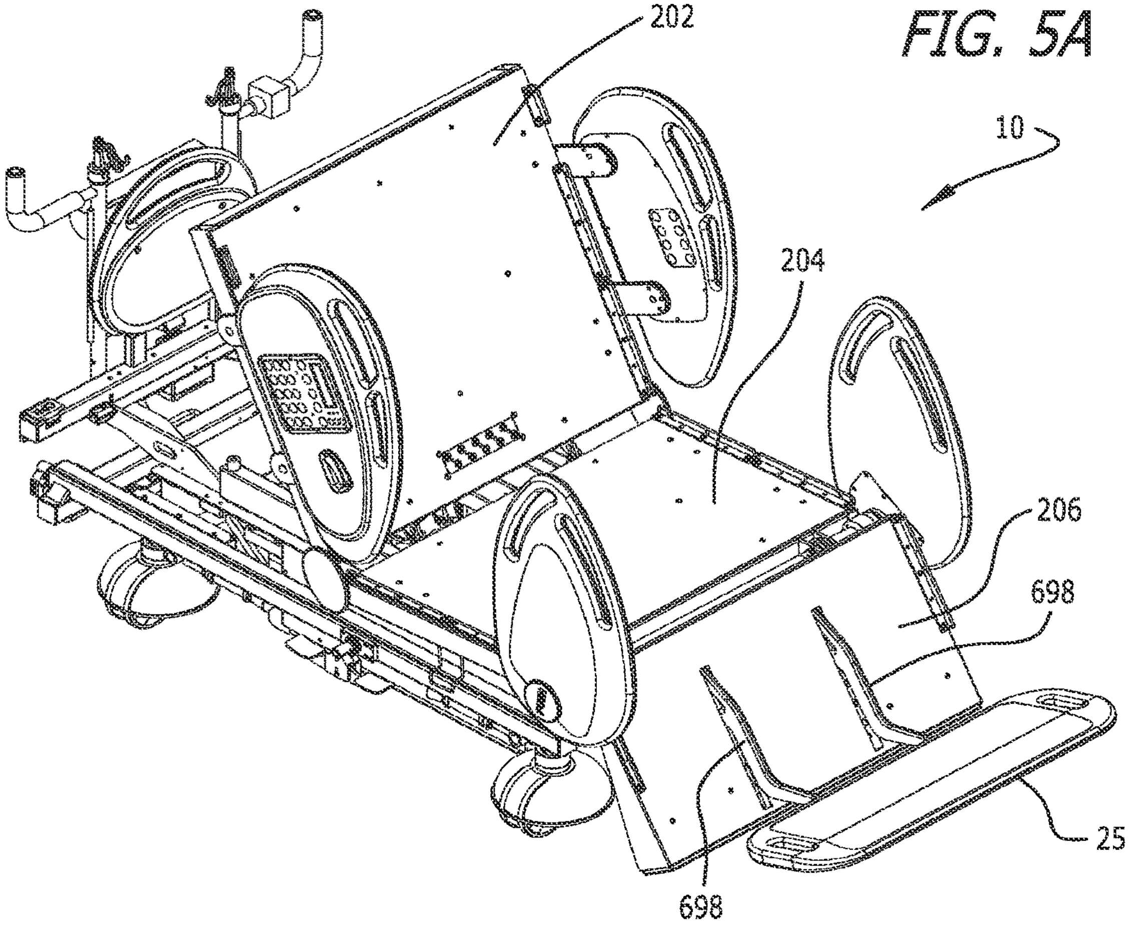
FIG. 5A is a front perspective view of one embodiment of a patient support bed in an x-hale chair position.
Figure 5B:
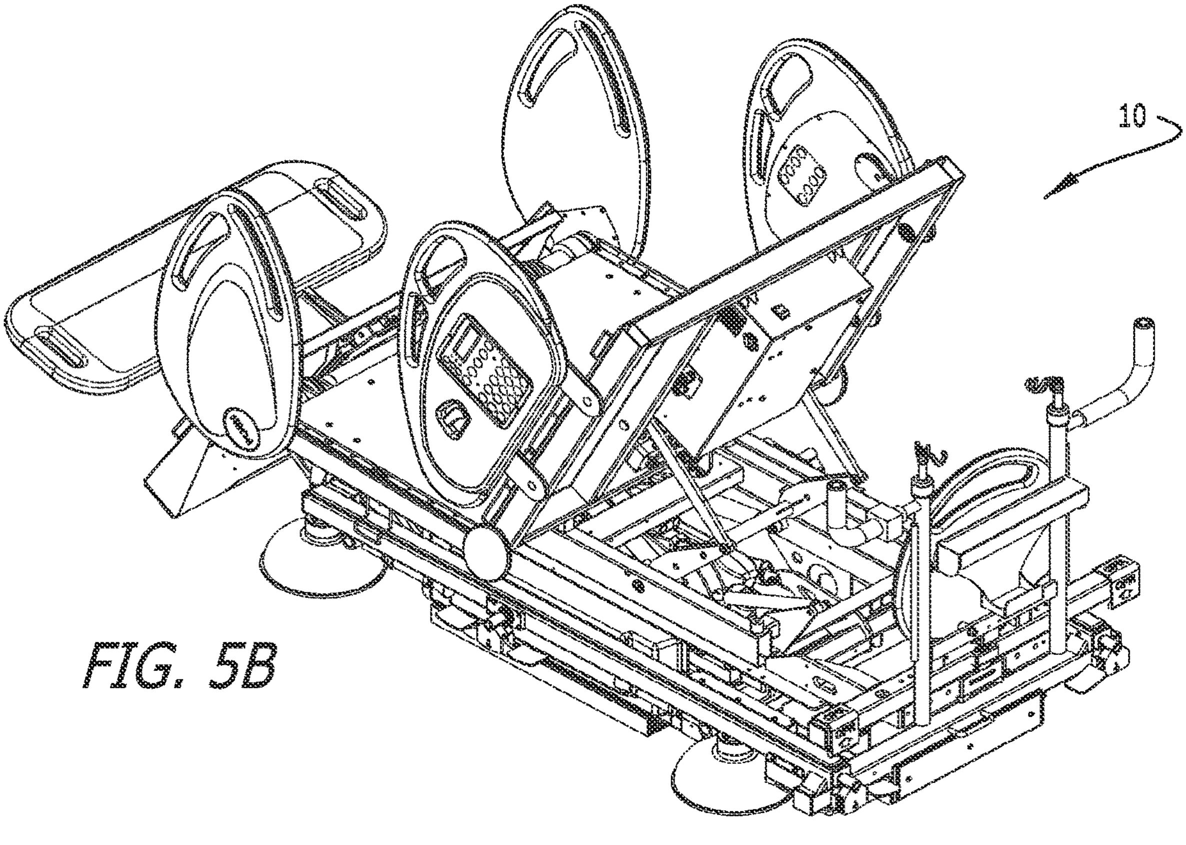
FIG. 5B is a rear perspective view of the patient support bed of FIG. 5A.
Figure 5C:
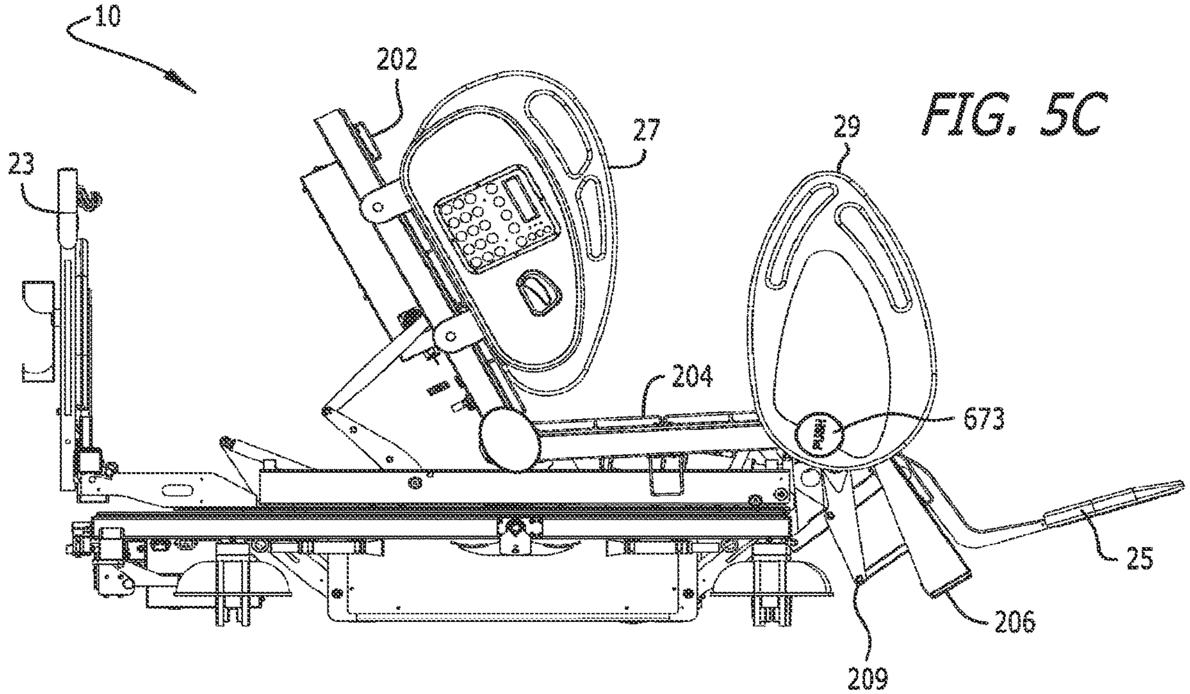
FIG. 5C is a side elevation view of the patient support bed of FIG. 5A.

The bed 10 can assume a plurality of positions/orientations via manipulation of the intermediate frame assembly 18 [e.g., foot end 26 and head end 24 up (bed 10 in up position as shown in FIG. 3A), foot end 26 and head end 24 down (bed 10 in lower position as shown in FIGS. 2A-2D), foot end 26 up and head end 24 down (Trendelenburg position, not shown, by raising the foot end 26 and lowering the head end 24 of the intermediate frame assembly 18), and head end 24 up and foot end 26 down (reverse Trendelenburg position, not shown, by raising the head end 24 and lowering the foot end 26 of the intermediate frame assembly 18)], and the various deck sections (head deck section 202, intermediate or seat deck section 204 and foot deck section 206) of the support deck assembly 20, as explained herein. For example, the bed 10 can assume a standard bed position such that the support deck assembly 20 is in the horizontal position as shown in FIG. 1, the bed 10 can assume a chair orientation such as shown in FIGS. 3B and 6A-6C, the bed 10 can assume a knee-gatch or cardiac-chair position, the bed 10 can assume an X-hale position, such as shown in FIGS. 5A-5C, the bed 10 can assume a stand up or tilt position, such as shown in FIGS. 4A-4C, and the bed can assume a variety of positions therebetween.

In a preferred embodiment, the intermediate frame assembly 18 is raised and lowered via internal arms and actuators connected to the base frame assembly 32 to allow the intermediate frame assembly 18 to nest within the base frame assembly 32 and thereby lower the bed 10 closer to the floor. Specifically, a first actuator is provided to raise and lower the head end 24 of the intermediate frame assembly 18, and a second actuator is provided to raise and lower the foot end 26 of the intermediate frame assembly 18. These actuators also assist in placing the bed 10 in the Trendelenburg and reverse Trendelenburg positions.

As explained herein, an optional drive system 310 may be provided to provide a driving force to assist in moving the bed during transportation. Referring to FIGS. 3A, 3B and 18, the drive system 310 may be connected to the intermediate frame assembly 18. To operate the drive system 310 the brakes must be disengaged and the intermediate frame assembly 18 must be lowered such that the drive system 310 properly contacts the floor. When the drive system 310 is in proper engagement with the floor, the drive system 310 can be controlled via the controls (forward and reverse, and speed control) on the transport handles 314 at the head end 24 of the bed 10. In one embodiment, a drive wheel handle 940 is provided to raise and lower the drive wheel manually in case of a power supply shortage.

Figure 1B:
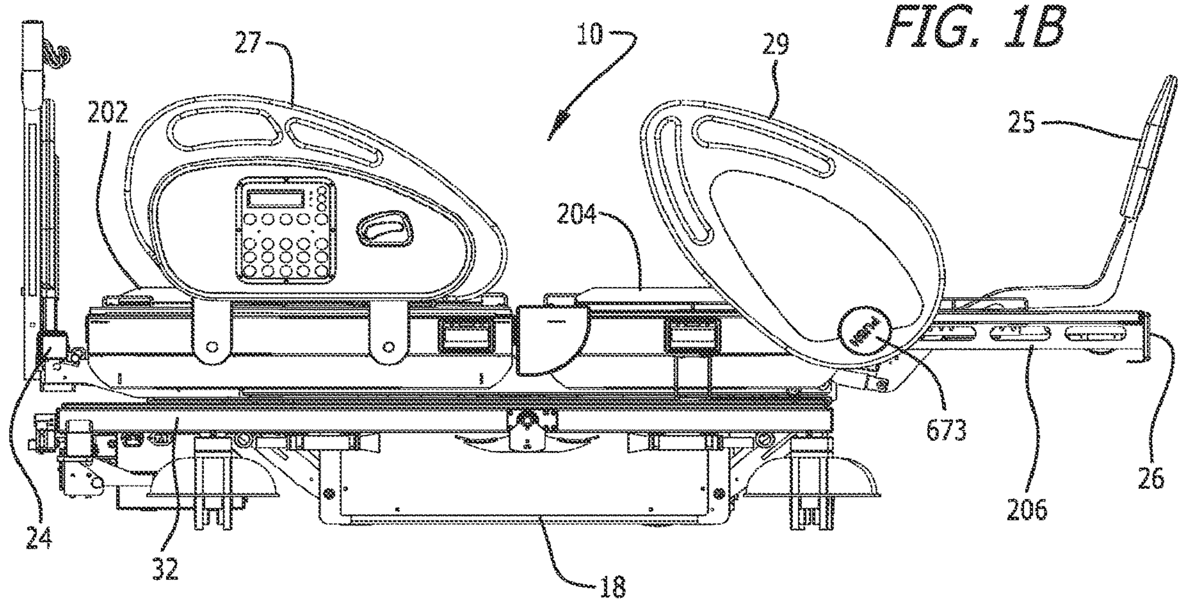
FIG. 1B is a side elevation view of the patient support bed of FIG. 1A.
Figure 1C:
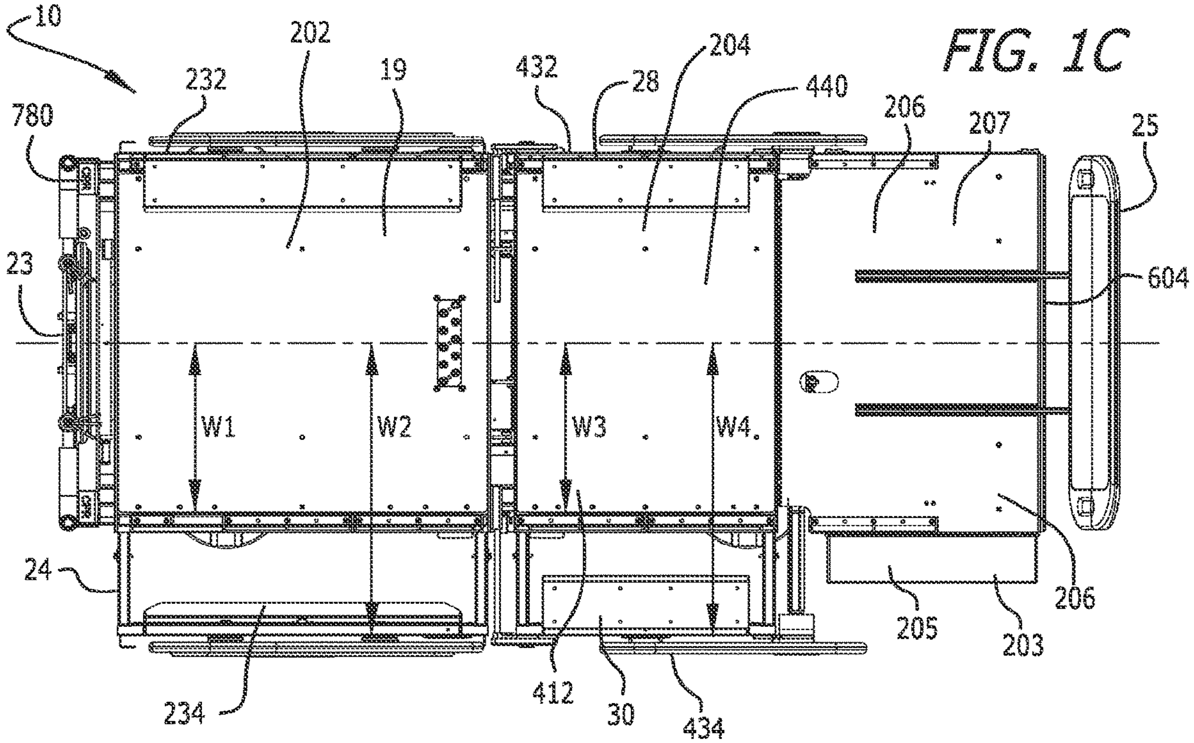
FIG. 1C is a top elevation view of the patient support bed of FIG. 1A.
Figure 1D:
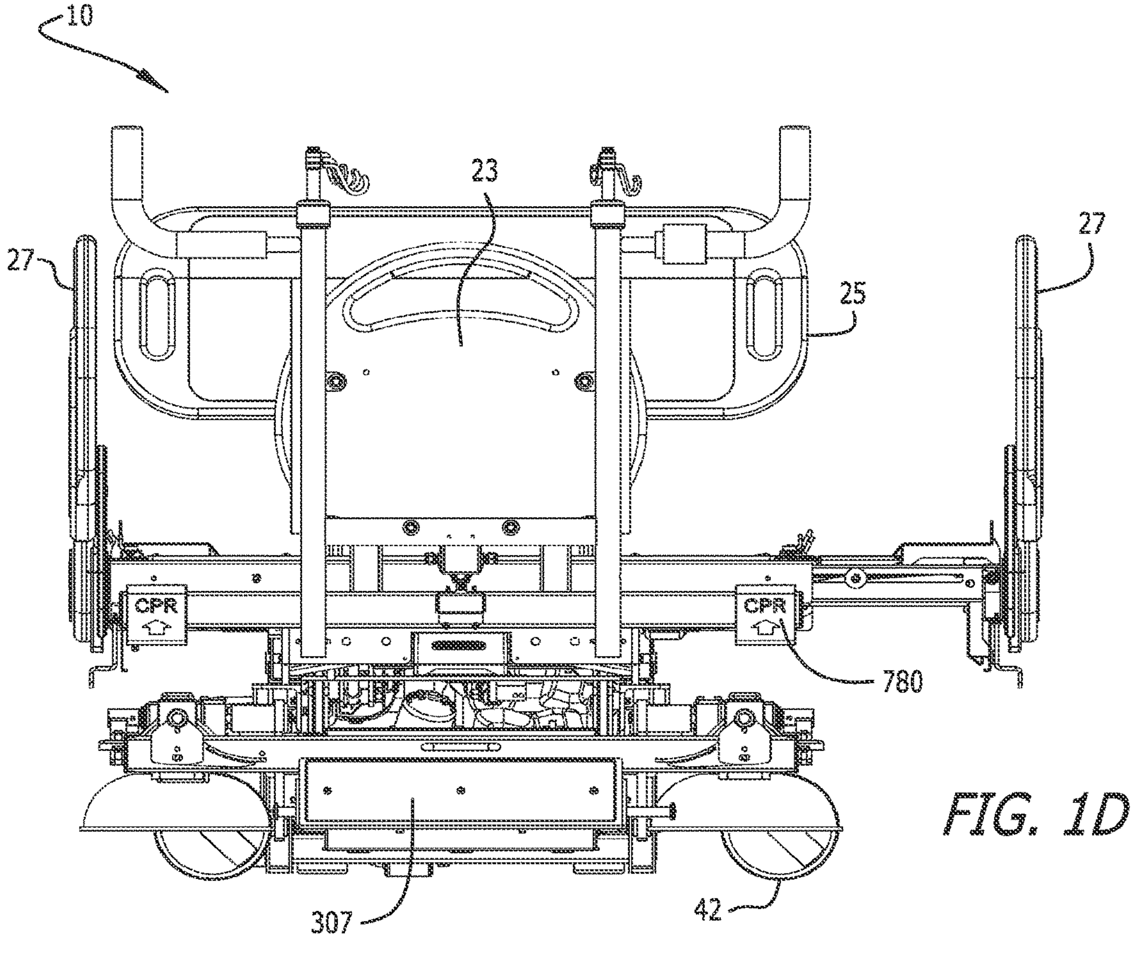
FIG. 1D is a rear elevation view of the patient support bed of FIG. 1A.
Figure 2A:
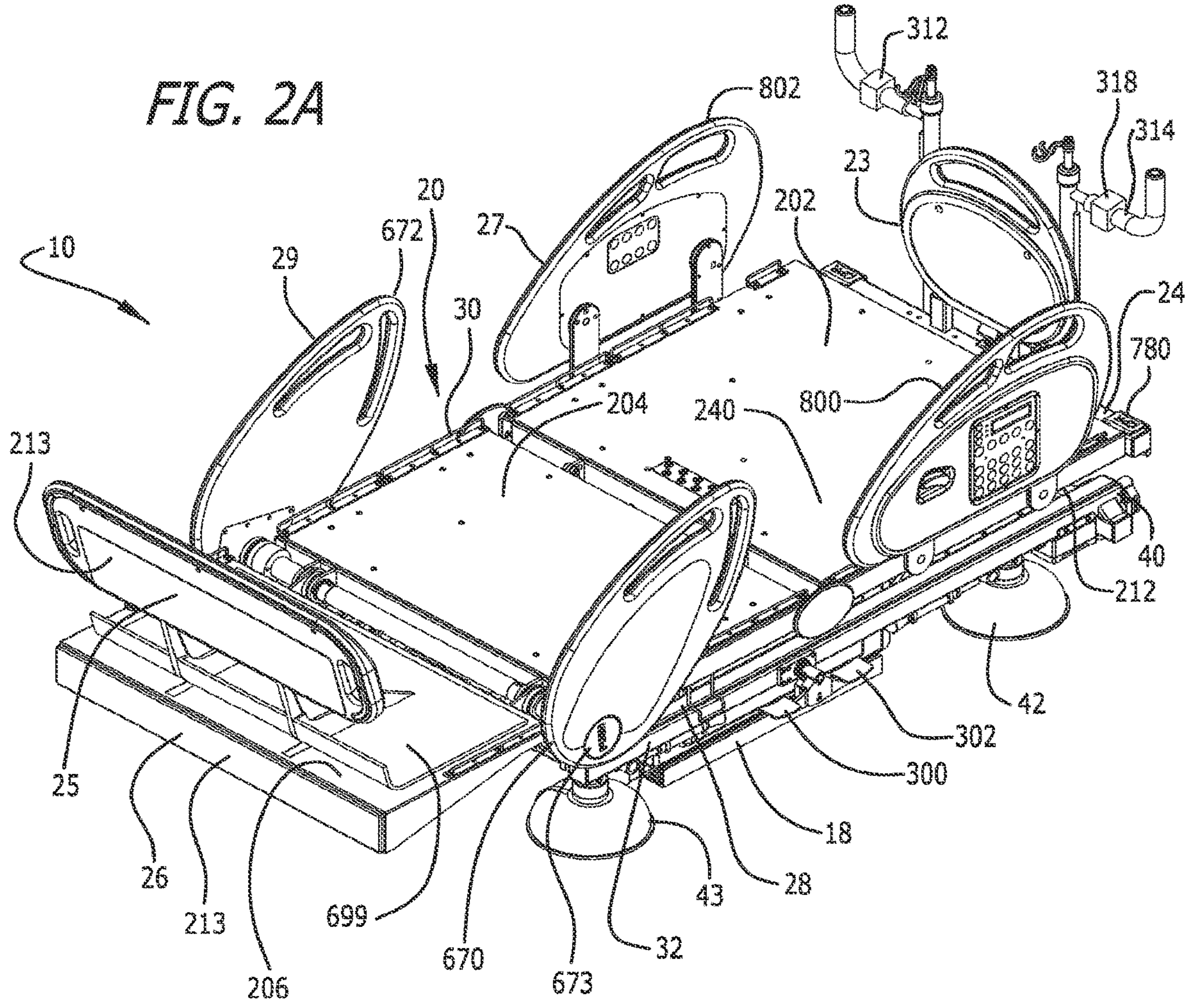
FIG. 2A is a perspective view of another embodiment of a patient support bed in a lowered bed position.

Referring to the figures, the patient support bed 10 is shown in a traditional hospital bed configuration in FIGS. 1A-1D and 2A-2D. However, as explained in greater detail herein, in various embodiments, such as shown in FIGS. 1A-1D, the patient support bed 10 also has deck extender assemblies at each side of the head deck section 202, seat deck section 204 and foot deck section 206. The bed 10 in FIG. 1A is shown in a perspective view, the bed 10 in FIG. 1B is shown in a side view, the bed 10 in FIG. 1C is shown in a top view, and the bed 10 in FIG. 1D is shown in a rear view. The mattress 22 has been removed from the bed 10 in these figures. The deck extender assemblies at each side of each bed section are individually openable/closeable to independently adjust the width of any side of the bed at any section of the bed.

The bed 10 in FIG. 3A is provided with the seat deck section 204 articulated upward and the foot deck section 206 fairly horizontal to provide for elevation of the legs and feet of the patient. In this figure some of the brake pedals 300 and steering pedals 302 are illustrated. In a preferred embodiment, one brake pedal 300 and one steering pedal 302 are provided at the head end 24 of the bed, and one brake pedal 300 and one steering pedal 302 are provided on each side of the bed 10 extending from the base frame assembly 32.

Referring to FIG. 3B, in one embodiment the bed 10 can be manipulated into the chair configuration. As shown in the figure, this embodiment of the bed 10 includes a variety of optional equipment. Optional equipment includes the following: a hand pendant 304 is provided for articulating the bed 10 (see also FIG. 8); a patient Human Machine Interface (HMI) 306 is provided on the inside of each of the siderails 27 toward the head end 24 of the bed 10 for allowing the patient to articulate certain portions of the bed 10, and an operator HMI 308 is provided on the outside of each of the siderails 27 for allowing the clinician to articulate additional portions of the bed 10, and also to operate the scale functionality; a width extender may be provided at each side of the head deck section 202, the seat deck section 204 and the foot deck section 206 as shown in the embodiment of FIGS. 1A-1D, but is not provided in the embodiment of FIGS. 2A-2D; a drive system 310 is provided to assist in providing a driving force to move the bed and facilitate the work of caregivers by only requiring minimal force during bed transportation; and, controllers for the drive system 310 are provided on the transport handles 314 at the head end 24 of the bed10, including a forward/reverse switch 312 and an accelerator switch 318.

The siderail assemblies for the bed 10 generally provide a barrier that is movable from a first position to a second position. In the first position the siderails assist in generally precluding a patient on the bed from rolling or falling off the bed (see FIG. 1). The siderails are movable to the second position, however, to provide unfettered access to the patient on the bed for a caregiver or other individual to perform any procedures on the patient (not shown). In one embodiment two pairs of siderail assemblies are provided, a first pair of siderail assemblies 27 is provided toward the head end 24 of the bed, and a second pair of siderail assemblies 29 is provided toward the foot end 26 of the bed. Pairs of siderails are provided to impart barriers at both the first side 28 and second side 30 of the bed. The second pair of siderail assemblies 29 are mounted to respective shafts to allow the second pair of siderail assemblies 29 to rotate from the first position to the second position.

The base frame assembly 32 of the bed 10 generally comprises a base frame 40 and a plurality of steerable and lockable casters 42, 43. The casters include a pair of casters 42 at the head end of the base frame assembly 32, and a pair of casters 43 at the foot end of the base frame assembly 32. In the tilt or stand-up bed configuration, as shown in FIGS. 4A-4C, heavy duty casters are preferred. A schematic of one embodiment of a central brake and steer system is provided at FIG. 9. One aspect of the brake and steer system is that it includes brake pedals 300 and steer pedals 302 at the head end 24 of the bed and near the transport handle 314. The brake and steer pedals 300, 302 located near the transport handle 314 at the head end 24 of the bed 10 are arranged in such a way that the operator who is moving the bed can easily activate the pedals without moving to the sides of the bed. When not transporting the bed 10, there are two central brake/steer systems located at the middle of each bed side allowing the operator to easily position the casters 42, 43 to steer or brake. In one embodiment, all six of the brake and steer pedals 300, 302 are mechanically linked together with a series of mechanical linkages that may extend within the tubing of the base frame 40—this is referred to as the manual mode. As a result, the operator only needs to activate one of the brake/steer pedals 300, 302 to set the entire brake and steer system in either brake mode or steer mode because all of the brake/steer pedals and all of the casters are mechanically linked. Alternately, rather than employing a manual or mechanically linked system to lock/unlock each of the casters 42, 43, any embodiment of the beds may employ an automatic mode to lock/unlock each of the casters 42, 43. In the automatic mode rather than relying on mechanical linkages to lock/unlock each of the casters 42, 43, the bed 10 has an automatic system that powers separate actuators 303 for each caster 42, 43 to separately lock/unlock each of the casters 42, 43 as desired. Further, for the automatic mode a plurality of sensors or switches 305 are provided at each of the brake and steer pedals 300, 302. The sensors/switches 305 are electrically connected to each of the actuators 303 at each of the casters 42, 43 to separately lock/unlock each of the casters 42, 43.

Figure 19A:
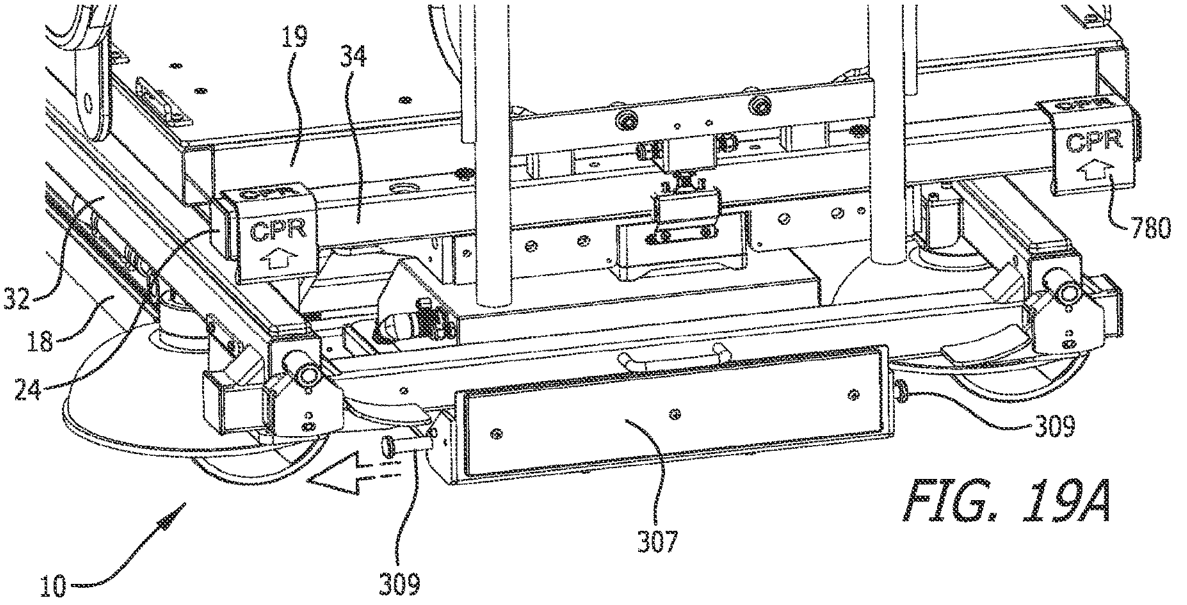
FIG. 19A is a perspective view of one embodiment of a control switch for the powered brake/steer system for the patient support bed, with the switch in the manual mode.
Figure 19B:
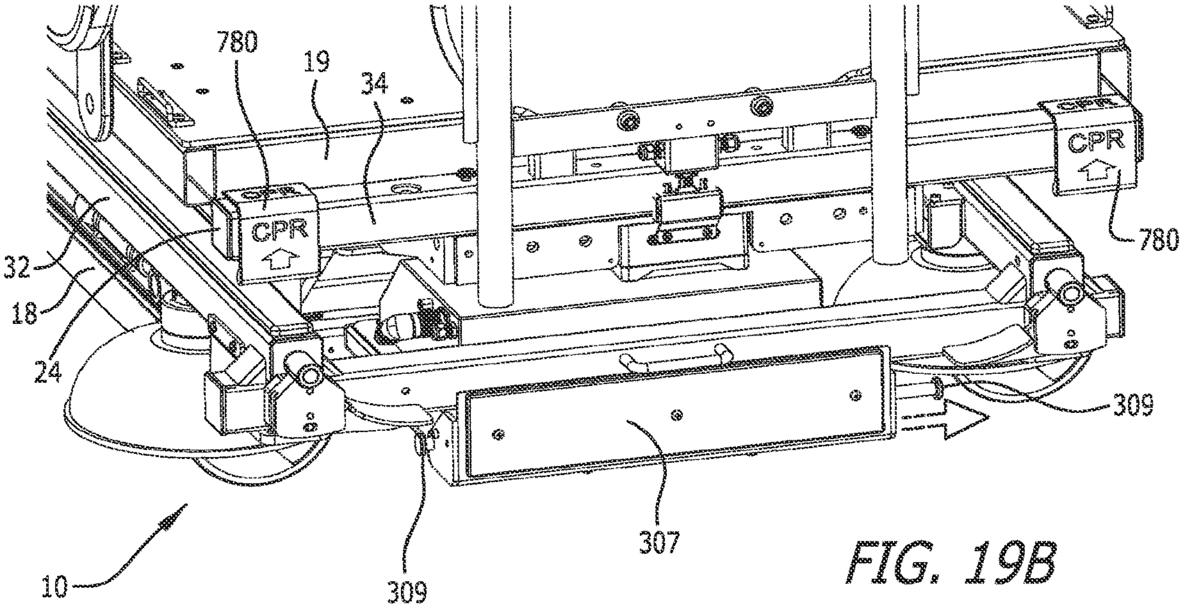
FIG. 19B is a perspective view of the control switch for the powered brake/steer system for the patient support bed of FIG. 19A, with the switch in the auto mode.

In one embodiment, as shown in FIGS. 19A and 19B, the bed 10 includes an override switch 307 at the head end 24 of the bed 10 to transition the brake and steer system between the automatic mode (using sensors/switches 305 at the pedals 300, 302 to operate actuators 303 at the casters 42, 43 to lock/unlock each caster) and the manual mode (using mechanical linkages to mechanically connect each of the pedals 300, 302 with the casters 42, 43 to lock/unlock each caster). The override switch 307 has a rod 309 extending out of the override switch 307 that manipulates that switch 307 between the automatic mode and the manual mode. In one embodiment, when the rod 309 is moved to the left, as shown in FIG. 19A, the override switch 307 places the brake and steer system in manual mode. Conversely, when the rod 309 is moved to the right, as shown in FIG. 19B, the override switch 307 places the brake and steer system in the automatic mode.

There are three modes to the brake and steer system. The first mode is the brake mode. The brake mode is set by fully engaging/pressing any of the three brake pedals 300. When in the brake mode all four casters 42, 43 will be simultaneously locked to prevent the bed 10 from moving. In the manual mode the casters 42, 43 are locked when any of the brake pedals 300 is engaged and the mechanical linkage system operates to mechanically lock each caster 42, 43. In the automatic mode, when any of the brake pedals 300 are pressed the sensor/switch 305 at that brake pedal operates to electrically manipulate each actuator 303 at each caster 42, 43 to lock each caster 42, 43. The second mode is the neutral mode. The neutral mode is set by positioning any of the brake/steer pedals 300, 302 to the middle position which is the neutral position. In the neutral position all four of the casters 42, 43 the mechanical linkage system placed all of the casters 42, 43 in the fully rotatable and unlocked orientation. In the automatic mode the sensor/switch 305 at the brake/steer pedals 300, 302 would sense that one of the brake/steer pedals 300, 302 was placed in the middle position and the sensor/switch 305 would electrically manipulate each actuator 303 to place each of the caster 42, 43 in the neutral position so that they are both fully rotatable and unlocked. The third mode is the steer mode. The steer mode is set by fully engaging/pressing any of the three steer pedals 302. In the steer position, when the brake and steer assembly is in the manual mode, one or more of the casters at the foot end 26 of the bed will lock in the forward position, through a mechanical linkage connected from the steer pedals 302 to the caster(s) at the foot end 26 of the bed 10 to assist in overall steering capabilities of the bed during transport. Similarly, when the brake and steer assembly is in the automatic mode, when steer pedals 302 is engaged the switch/sensor 305 at that pedal 302 will sense that the steer pedal 302 was engaged and would electrically operate the actuator 303 at one of more of the casters at the foot end 26 of the bed 10 to lock that caster in the forward position.

The brake and steer system is supported by a brake or caster lock function in the bed's software that ensures that the brake system is in the lock mode before allowing the bed to go into tilt or stand mode. For example, if the user attempts to place the bed into tilt/stand mode and the caster/brake lock is not engaged, the software will provide an alarm and will preclude the user from actuating tilt/stand mode. Once the bed is placed into brake lock mode (i.e., all casters are locked either mechanically or with actuators) the software will disarm the alarm and allow the user to place the bed in tilt/stand mode. Further, once in tilt/stand mode, the software will not allow the brake lock mode to be disengaged until the bed is back in the full horizontal position. The brake and steer system uses a solenoid that is operated by the software to maintain the brake lock in brake mode during tilt/stand operations. In the automatic mode, the brake and steer system will maintain the actuators 303 in the lock mode during tilt/stand operations to keep each caster locked. The caster lock function locks the casters to prevent any unexpected movement of the bed during tilt/stand mode.

Figure 2B:
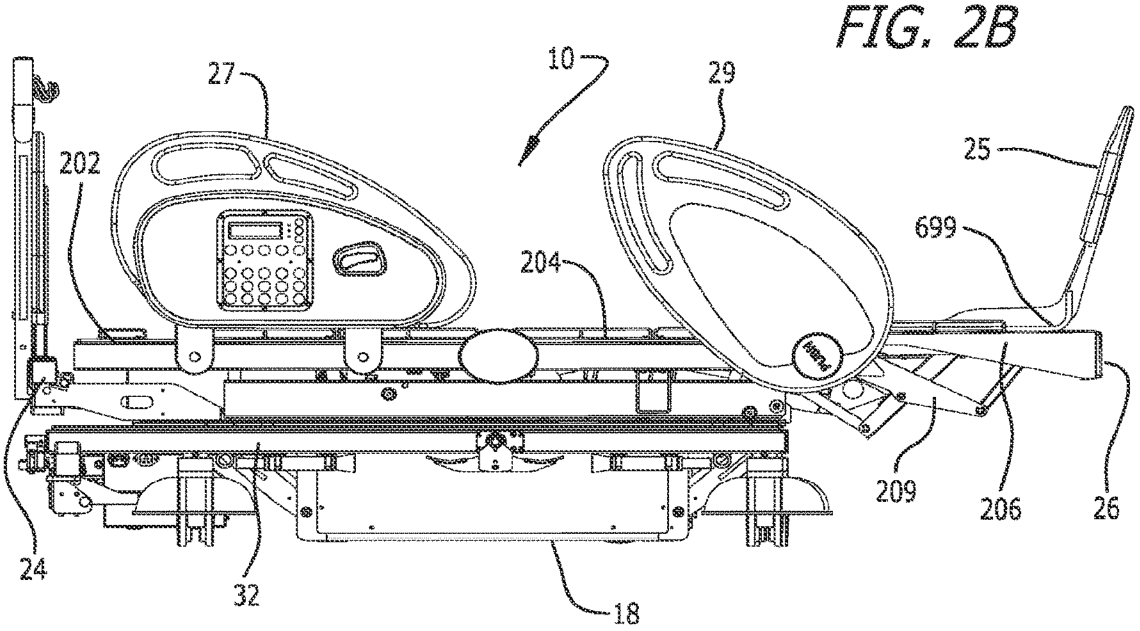
FIG. 2B is a side elevation view of the patient support bed of FIG. 2A.
Figure 3A:
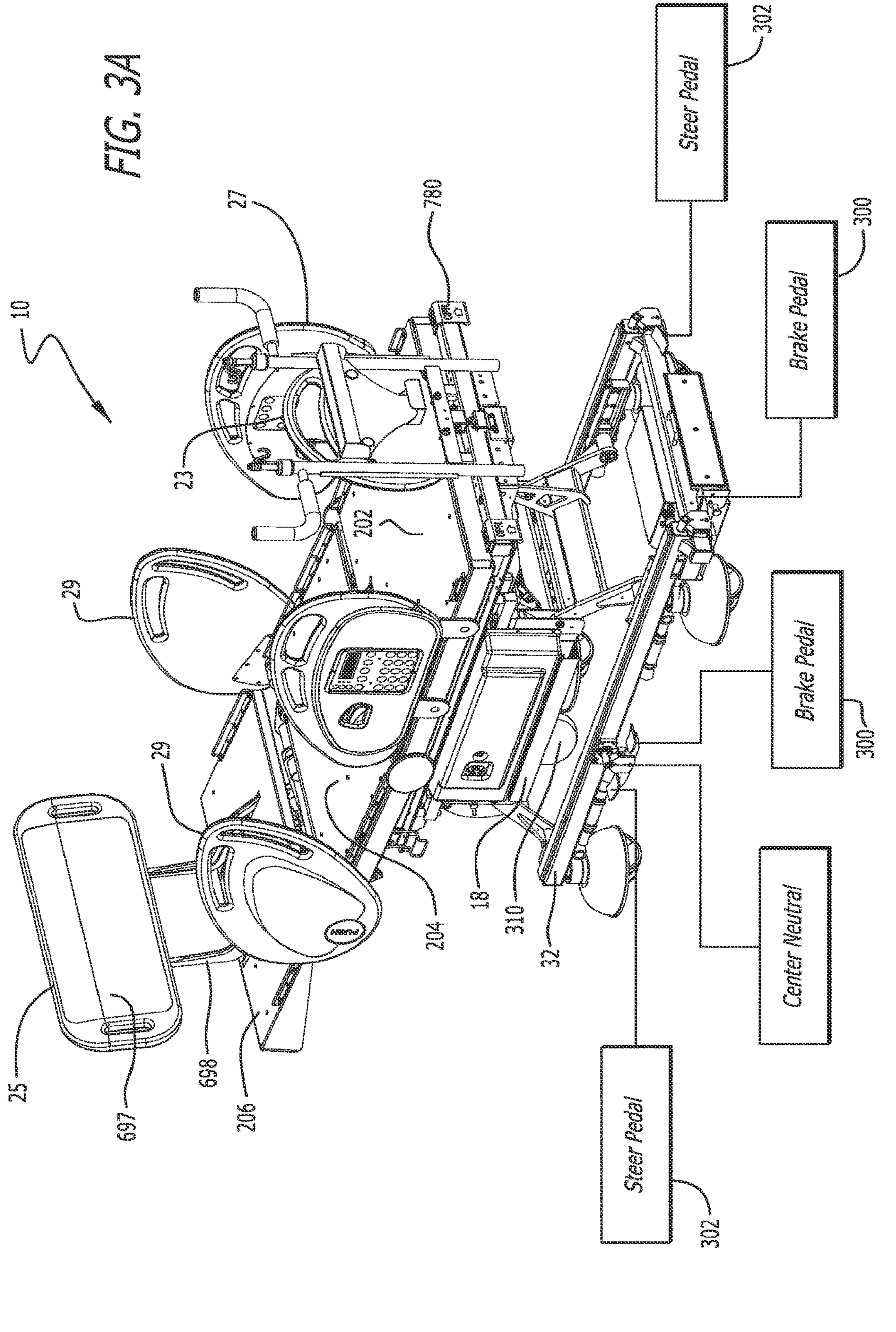
FIG. 3A is a perspective view of one embodiment of a patient support bed in a raised position.
Figure 3B:
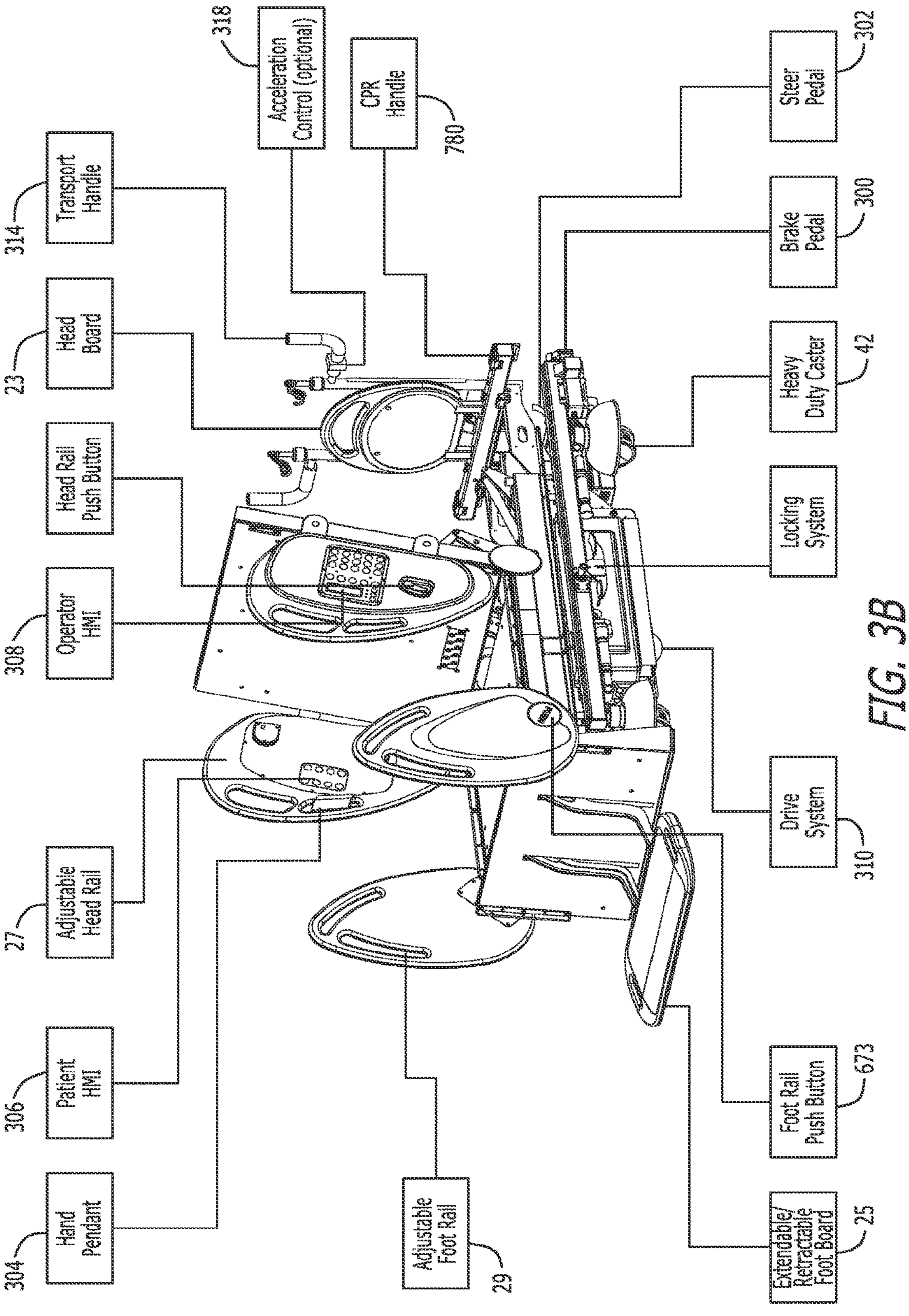
FIG. 3B is a perspective view of one embodiment of a patient support bed in a chair position and with optional equipment.

As best shown in the embodiments of FIGS. 1B and 2B, the base frame assembly 32, intermediate frame assembly 18, and weigh frame assembly 34 extend from the head end 24 of the bed 10 toward the foot end 26 of the bed 10. However, in one embodiment, these frame assemblies generally do not extend fully to the foot end 26 of the bed 10. Instead, as is explained in detail herein, these assemblies 32, 18, 34 generally end around the distal end of the seat deck section 204 of the patient support deck 20. Accordingly, the foot deck section 206 extends beyond the foot end 26 of the base frame assembly 32, intermediate frame assembly 18 and weigh frame assembly 34.

The intermediate frame assembly 18 of one embodiment of the bed 10 is connected to the base frame assembly 32 with a plurality of actuators to independently raise and lower each end of the intermediate frame assembly 18. In one embodiment of the intermediate frame assembly 18 is made of a welded tubular frame assembly. Because each end of the intermediate frame assembly 18 can be independently raised and lowered, the bed 10 can be put into the trendelenberg and reverse trendelenberg positions.

In one embodiment the weigh frame assembly 34 is connected to the intermediate frame assembly 18 with a plurality of load beams. In one embodiment, four separate load cell assemblies extend from the top outer corner of the intermediate frame 180 to support the weigh frame assembly 34. In a preferred embodiment, the weigh frame assembly 34 and the patient support assembly 19 (i.e., the support deck assembly 20 and the mattress 22), including all actuators to actuate the patient support assembly 19, are all supported from the load cell assemblies. The load cell assemblies 35 include load cells that movably couple the weigh frame assembly 34 to the intermediate frame assembly 18. Each load cell includes a fixed portion and a sensing portion that is movable relative to the fixed portion. Each load cell assembly 35 also comprises a transducer connected to the sensing portion that provides an electrical signal in response to movement of the sensing portion relative to the fixed portion. The extent of the movement of the sensing portion depends upon the amount of weight supported by the load cells, and accordingly the electrical signal provided by the load cells varies in response to the weight supported by the weigh frame assembly 34.

In one embodiment, the weigh frame assembly 34 generally comprises a weigh frame 70 and a plurality of actuators, including actuators to raise and lower the support deck assembly 20. Accordingly, in one embodiment the support deck assembly 20 is operably connected to the weigh frame assembly 34. In one embodiment of the bed 10, the support deck assembly 20 for the bed 10 comprises a plurality of different deck sections. For example, as shown in FIG. 5A, the support deck assembly 20 comprises a head deck section 202 adjacent the head end 24 of the bed 10, an intermediate or seat deck section 204, and a foot deck section 206 adjacent the foot end 26 of the bed 10. These sections of the support deck assembly 20 generally comprise the main deck. The head deck section 202 may also be referred to as a first deck section, the intermediate or seat deck section 204 may also be referred to as a second deck section, and the foot deck section 206 may also be referred to as a third deck section. The head deck section 202 is generally movable from a generally horizontal position to a more vertical back-support position, and the foot deck section 206 is movable from a generally horizontal position to a generally vertical position. The seat deck section 204 is positioned between the head deck section 202 and the foot deck section 206. In one embodiment the seat deck section 204 is pivotably connected to the weigh frame 70, such that the seat deck section 204 can pivot upwardly to allow the bed 10 to attain a knee-gatch or cardiac chair position.

In one embodiment, such as shown in FIGS. 4-6, the weigh frame assembly 34 supports a tilt frame assembly 16, and the tilt frame assembly 16 supports the support deck assembly 20 for the bed 10. Referring to FIG. 4D, in one embodiment the tilt frame 316 is hingedly connected at its foot end 26 to the weigh frame 70. This allows the tilt frame 316 to be tilted forward by the tilt/stand actuator to place the bed in stand mode. In one embodiment, the tilt actuator 317 is connected between the tilt frame 316 and a fixture connected to the weigh frame 70. The tilt actuator 317 is extendable to lift the tilt frame 316 to place the bed in stand mode. The tilt frame 316 has a pair of rubber pads on its head end 24 to cushingly support the tilt frame 316 on the weigh frame 70 when the tilt frame 316 is not in the stand mode.

Figure 6A:
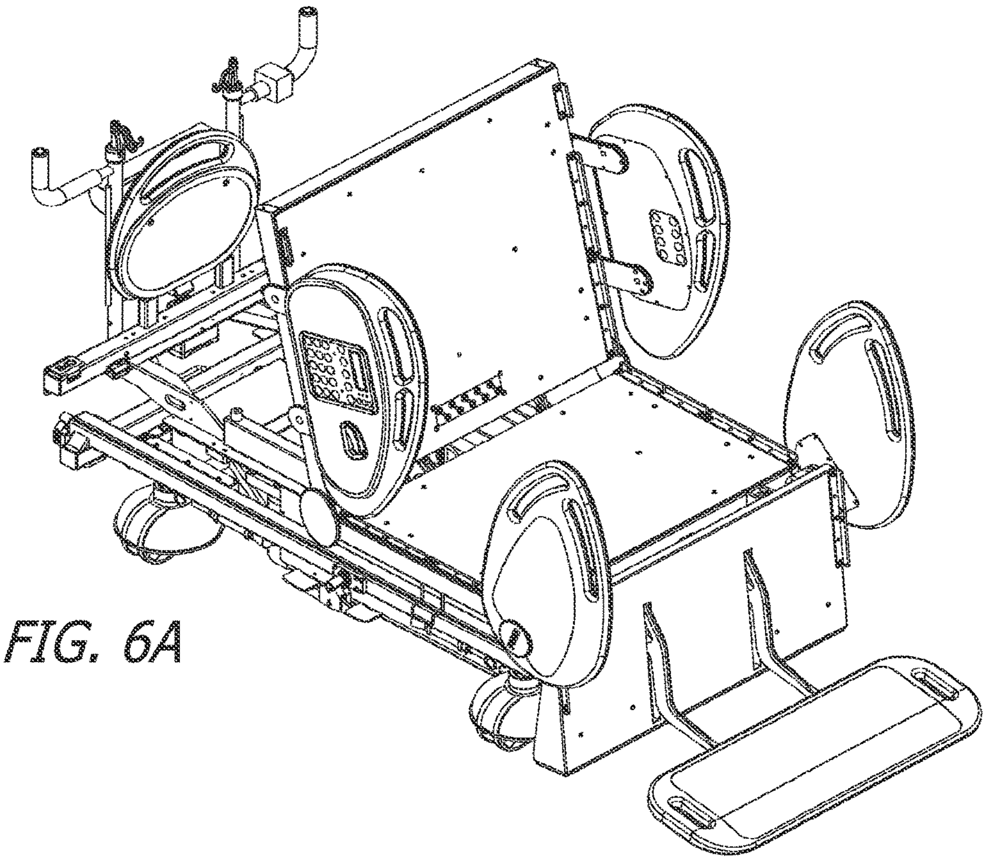
FIG. 6A is a front perspective view of one embodiment of a patient support bed in a sit-to-stand chair position.
Figure 6B:
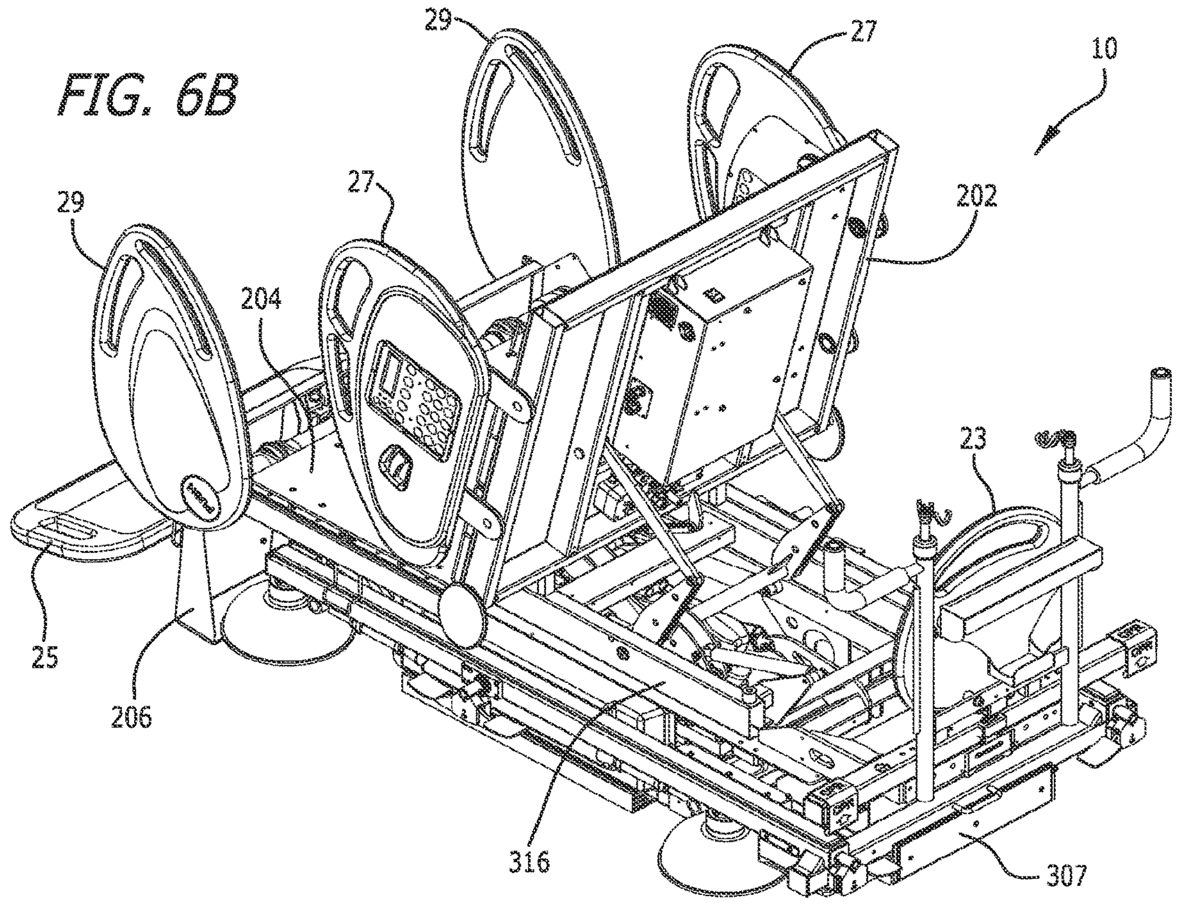
FIG. 6B is a rear perspective view of the patient support bed of FIG. 6A.
Figure 6C:
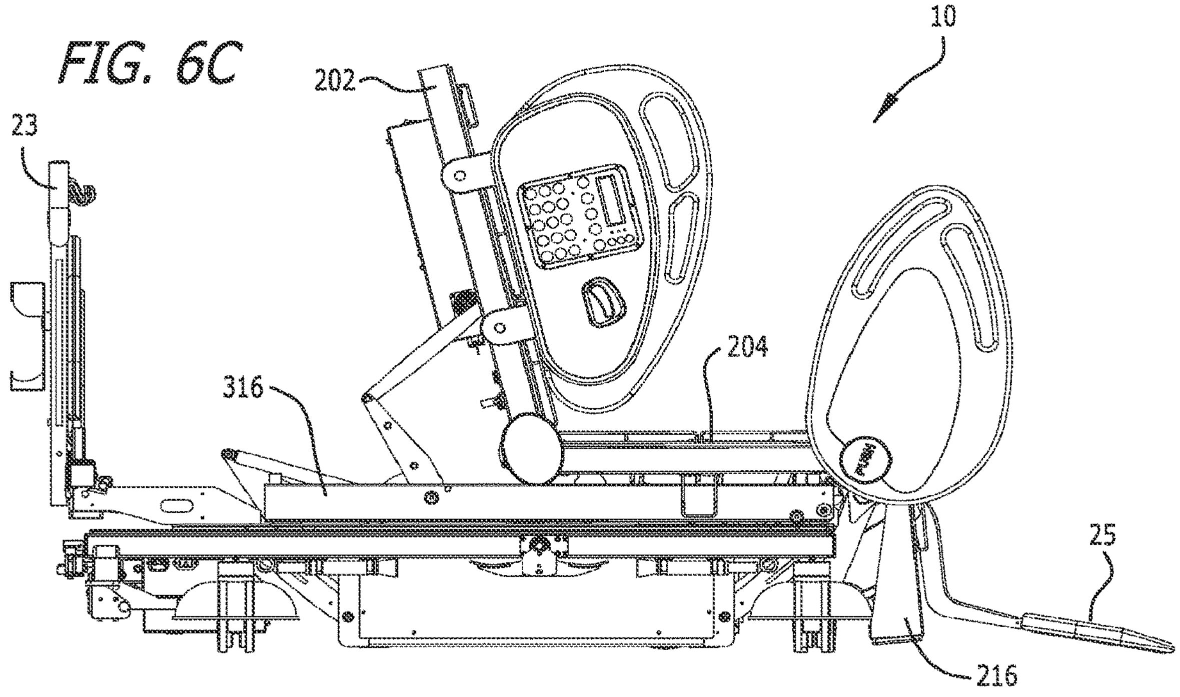
FIG. 6C is a side elevation view of the patient support bed of FIG. 6A.

In the embodiments shown in FIGS. 4-6, the head deck section 202 is preferably manipulated by a plurality of linkages and an actuator connected to the tilt frame assembly 16. The head deck section 202 may also be pivotally connected at one end, preferably the foot end of the head deck section 202, to either the tilt frame 316 or the seat deck section 204. Referring to FIG. 4D, in one embodiment the head deck section 202 is pivotally connected to the tilt frame 316. As shown in FIG. 6A, the head deck section 202 can pivot from approximately 0° in the horizontal position, to nearly 90° in the more vertical back-support position.

Figure 4D:
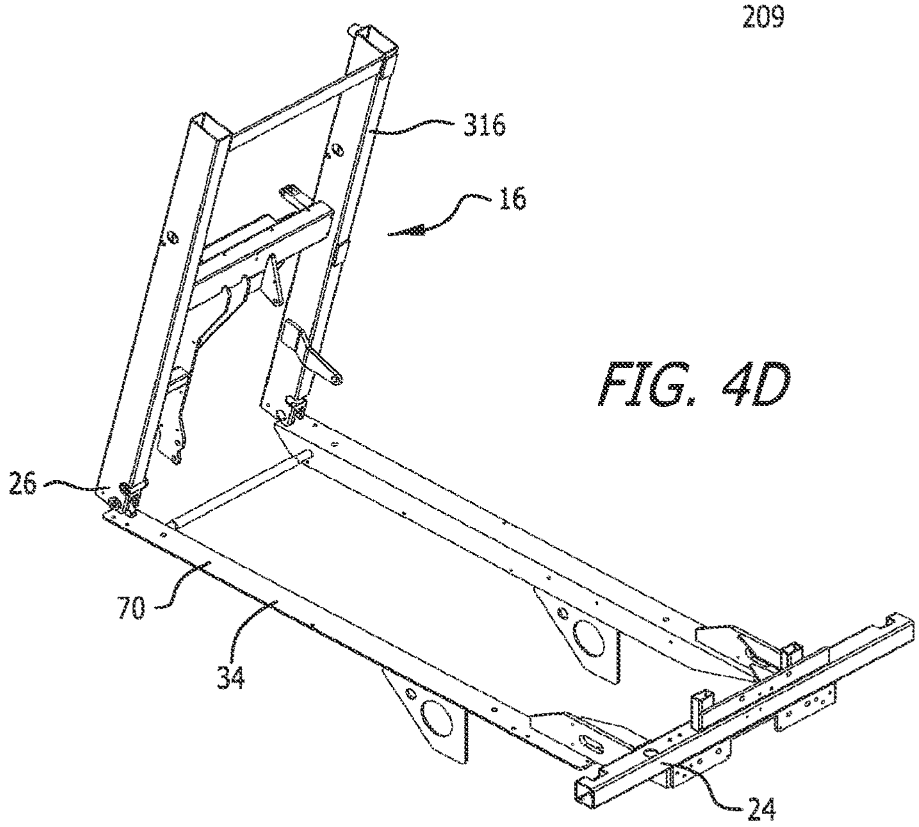
FIG. 4D is a perspective view of one embodiment of a tilt frame and weigh frame of the patient support bed of FIG. 4A.

Referring still to FIGS. 4-6, in one embodiment of the tilt/stand bed, the seat deck section 204 is pivotally connected to the tilt frame assembly 16 (see FIGS. 4C, 4D and 5B). At one position the seat deck section 204 is connected via an actuator to the tilt frame 316 of the tilt fame assembly 16 which allows the foot end of the seat deck section 204 to be pivoted upwardly, as shown in FIG. 5C. Additionally, one end, preferably the head end of the seat deck section 204, is pivotally connected to either the tilt frame 316 of the tilt frame assembly 16 or to the head deck section 202. The seat actuator connecting the seat deck section 204 to the tilt frame 316 adjusts the angle of the seat deck 204 with respect to the frame. In one embodiment the pivot range of the seat deck section 204 is from approximately 0° in the horizontal to approximately 15° in the knee-gatch position. In a preferred embodiment the length of the seat deck section 204 is a fixed length. In one embodiment the actuator for the seat deck 204 raises the seat deck 204 upon a pulling action by the actuator.

In one embodiment of the bed 10, the foot end 26 of the seat deck section 204 is pivotally raised and lowered. To pivotally raise the foot end 26 of the seat deck section 204 the seat deck section actuator 184 exerts a first force on the seat deck section 204. To lower the seat deck section 204 the seat deck section actuator 184 correspondingly exerts an opposite force on the seat deck section 204. Accordingly, the seat deck section 204 is movable from a generally horizontal position, as shown in FIG. 1B, to an angularly raised position with respect to the weigh frame 70, also known as a knee-gatch or X-hale position, as shown in FIG. 5C.

In one embodiment of the bed 10, the head deck section 202 generally comprises a head frame assembly 212 and a head deck plate 240. Additionally, in one embodiment wherein the bed 10 has a variable width component, the head deck section 202 also comprises a first side head deck extender assembly 232 and a second side head deck extender assembly 234. The deck extender assemblies are also referred to as patient support extension assemblies. The first side head deck extender assembly 232 is utilized to increase the width of the bed at the first side 28 of the bed 10, and the second side head deck extender assembly 234 is utilized to increase the width of the bed at the second side 30 of the bed 10.

The first and second side head deck extender assemblies 232, 234 are independently movable from a first retracted position to a second expanded position. Similarly, the supplemental mattresses on the first and second side head deck extender assemblies 232, 234 are thus repositioned from a first retracted position to a second expanded position. In one embodiment the distance from the centerline of the bed 10 to an edge of the mattress 22 is identified as distance $W_1$, and the distance from the centerline of the bed 10 to an edge of the supplemental mattress after the supplemental mattress is in the second expanded position is identified as distance $W_2$, where $W_2$ is greater than $W_1$. In a preferred embodiment, the width of the supplemental mattress is approximately 5 inches, and thus the distance from $W_1$ to $W_2$ is approximately 5 inches. In one embodiment, in the retracted or non-deployed position the deck extender assemblies 232, 234 are generally underneath the deck plate 240.

As briefly explained above, in a preferred embodiment each of the head deck extender assemblies 232, 234 also has a supplemental mattress assembly connected thereto for extending the patient support surface of the bed. In a preferred embodiment, a first side supplemental mattress assembly is provided for the first side head deck extender assembly 232, and a second side supplemental mattress assembly is provided for the second side head deck extender assembly 234 to increase the width of the surface supporting the patient. In a preferred embodiment, the width of the supplemental mattress is adapted to increase the width of the mattress of the bed approximately 5" per side, for a total mattress width increase of 10". Further, in a preferred embodiment the head deck extender assemblies 232, 234 are sliding drawer style assemblies.

In one embodiment of the bed 10, the seat deck section 204 generally comprises a seat frame assembly 412 and a seat deck plate 440. Additionally, in one embodiment wherein the bed has a variable width component, like the head deck section 202, the seat deck section 204 also comprises a first side seat deck extender assembly 432 and a second side seat deck extender assembly 434. The first side seat deck extender assembly 432 is utilized to increase the width of the bed at the first side 28 of the bed 10, and the second side head seat extender assembly 434 is utilized to increase the width of the bed at the second side 30 of the bed 10. The deck extender assemblies 432, 434 are connected to the seat deck section 204 and allowed to move relative thereto.

Like the first and second side head deck extender assemblies 232, 234, the first and second side seat deck extender assemblies 432, 434 are also independently movable from a first retracted position to a second expanded position. Similarly, the supplemental mattresses on the first and second side seat deck extender assemblies 432, 434 are thus repositioned from a first retracted position to a second expanded position. In one embodiment, the distance from the centerline of the bed 10 to an edge of the mattress 22 at the seat section is identified as distance $W_3$, and the distance from the centerline of the bed 10 to an edge of the supplemental mattress after the supplemental mattress is in the second expanded position at the seat deck section is identified as distance $W_4$, where $W_4$ is greater than $W_3$. In a preferred embodiment, the width of the supplemental mattress is approximately 5 inches, and thus the distance from $W_3$ to $W_4$ is approximately 5 inches.

In a preferred embodiment, each of the seat deck extender assemblies 432, 434 also has a supplemental mattress assembly connected thereto for extending the patient support surface of the bed. In a preferred embodiment, a first side supplemental mattress assembly is provided for the first side seat deck extender assembly 432, and a second side supplemental mattress assembly is provided for the second side seat deck extender assembly 434. Like the head deck extender assemblies, in the retracted or non-deployed position, the seat deck extender assemblies 432, 434 are generally underneath the seat deck plate 440. Further, like the head deck extender assemblies 232, 234, in a preferred embodiment the seat deck extender assemblies 432, 434 are sliding drawer style assemblies.

It is understood that in a preferred embodiment the deck extender assemblies operate completely independently. Accordingly, any deck extender assembly of the bed may be in the retracted or non-deployed position, the partially deployed position, or the expanded or deployed position at any time, irrespective of any other deck extender assembly. Further, it is understood that the supplemental mattresses for the head and seat deck extender assemblies are always connected to the deck extender assemblies, including in both the non-deployed positions and the deployed positions of the deck extender assemblies.

As shown in the Figures, the support deck assembly 20 of the patient support assembly 19 also comprises a foot deck section 206. In one embodiment the foot deck assembly 206 does not have a deck extender assembly, but in an alternate embodiment a foot deck extender assembly is possible and within the scope of the present invention. For example, in one embodiment, as shown in FIGS. 1A-1D, foot deck width extenders 205 are provided on each side of the foot deck section 206 (although the foot deck width extenders 205 are extended out at only one side). In a preferred embodiment the foot deck extenders 205 comprise a foot supplemental mattress connected to a supplemental plate 203 that is hinged about the side of the foot deck support plate 207. Thus, in a retracted position the supplemental plate 203 is hinged and rotated under the foot deck support plate 207 such that when the foot deck section 206 is in a substantially horizontal position the foot deck supplemental mattress extends downwardly away from the foot deck support plate 207 and towards the floor. The foot deck with extender 205 can be rotated or pivoted about the hinge at each side, respectively of the foot deck support plate 207 such that the supplemental plate 203 is generally in-line and extending outwardly from the foot deck support plate 207. In this manner, the foot deck supplemental mattress extends generally upwards, like the mattress on the foot deck section 206, but to the side of the mattress on the foot deck section 206, thereby providing a width extension for the foot deck section 206.

In one embodiment of a stand-up bed 10 as shown in FIGS. 1A-1D, the foot deck section 206 is operably connected to the seat deck section 204 and is pivotally mounted thereto. The foot deck section 206 is also operably connected to an actuator adjusting the angular orientation of the foot deck section 206. In one embodiment, the foot deck section 206 includes a foot deck frame 604 and foot deck plate 207. The foot deck plate 207 is connected to the foot deck frame 604, and the foot end of the mattress 22 is positioned on the foot deck plate 207.

In another embodiment of a stand-up bed 10 as shown in FIGS. 2A-2D, the foot deck section 206 is operably connected to the weigh frame assembly 34 and the seat deck section 204 with a non-pivotal actuation mechanism 209 that is driven by a foot deck actuator. Accordingly, the foot deck section 206 is not directly connected to the seat deck section 204, as is typical in most hospital beds. The foot deck actuator may be fixed to the weigh frame assembly 34. In a preferred embodiment the non-pivotal actuation mechanism 209 simultaneously rotates and longitudinally translates the foot deck section 206 from the generally horizontal position as shown in FIGS. 2A and 2B, to the substantially vertical position as shown in FIG. 3B. Further, in a most preferred embodiment the rotation of the foot deck section 206 is about a moving pivot point. Accordingly, unlike prior art actuation mechanisms used with foot decks that are pivotally connected to either the frame or the seat assembly and that merely pivot the foot deck about the pivotal connection, the preferred actuation mechanism 209 for the foot deck 206 of this application simultaneously longitudinally translates and rotates the foot deck 206 from the generally horizontal to the substantially vertical position. In one embodiment the actuation mechanism 209 is connected to the foot deck a distance from the head end edge of the foot deck section 206.

Figure 2C:
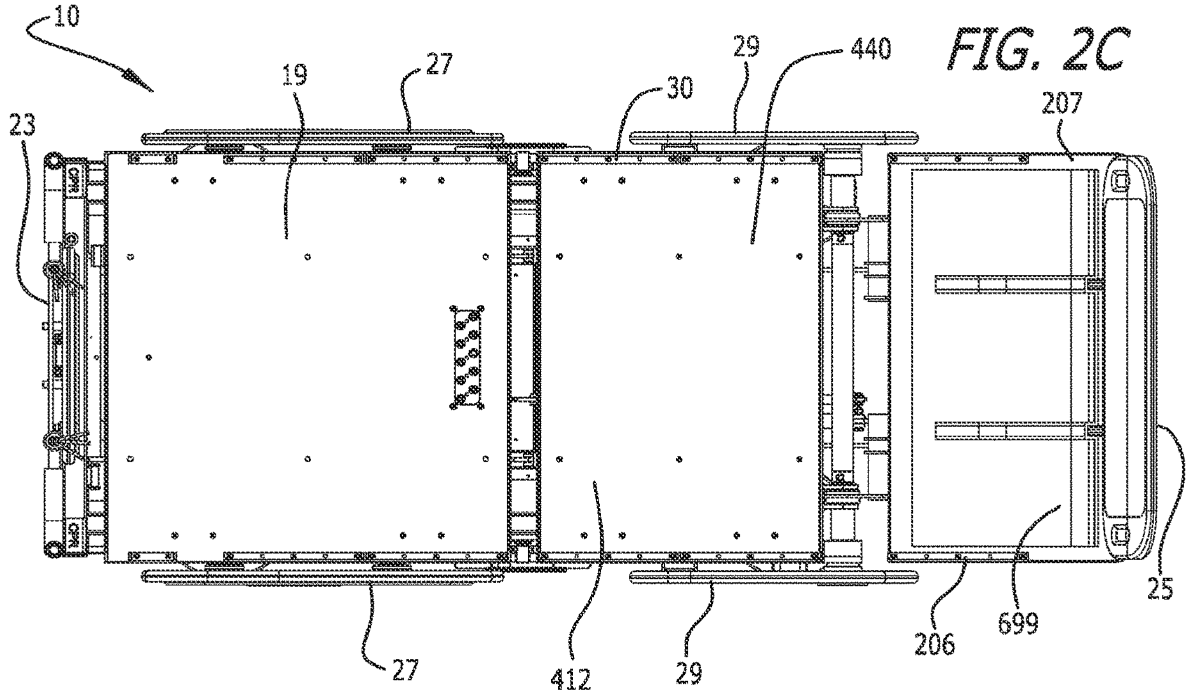
FIG. 2C is a top elevation view of the patient support bed of FIG. 2A.
Figure 2D:
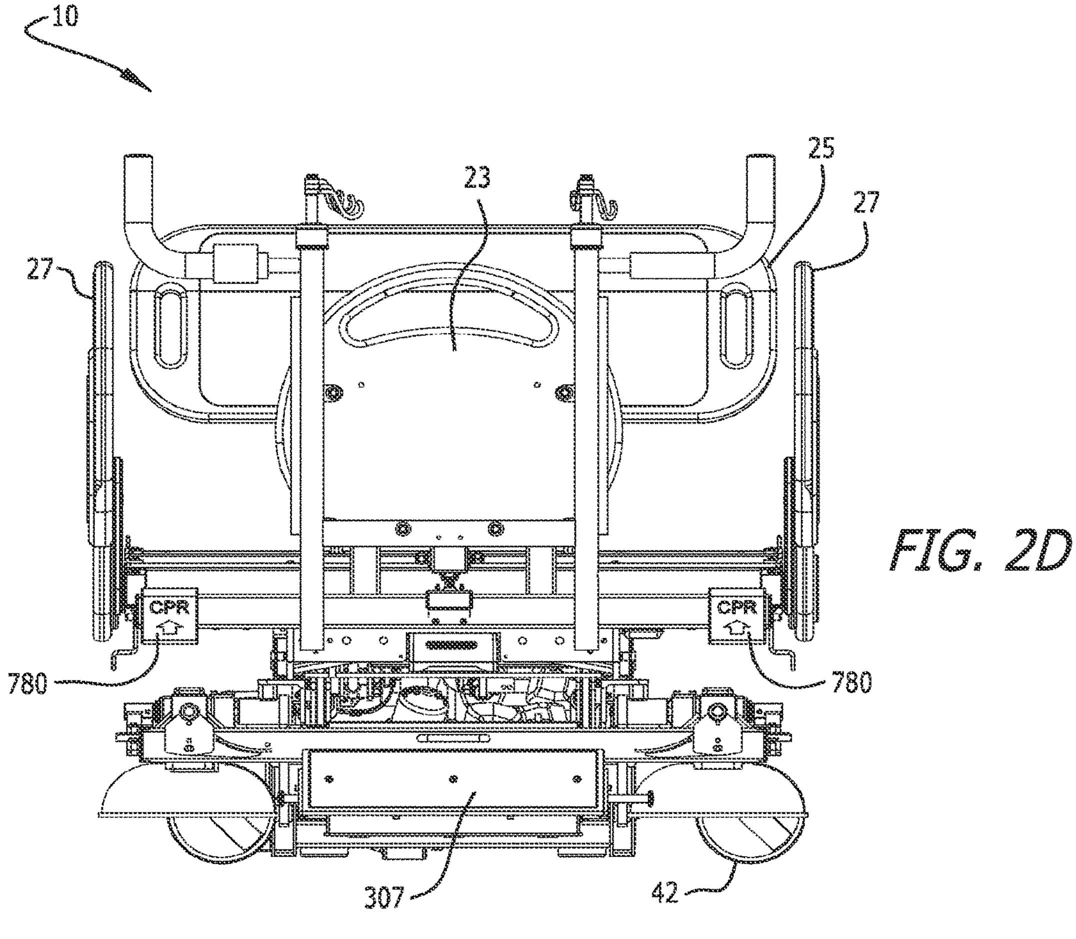
FIG. 2D is a rear elevation view of the patient support bed of FIG. 2A.

Additionally, as shown in FIGS. 2A and 2C, in a preferred embodiment the foot deck section 206 is provided a distance from the intermediate or seat deck section 204. Accordingly, a longitudinal space or gap is provided between the seat deck section 204 and the foot deck section 206 when the foot deck section 206 is in the generally horizontal position. As the foot deck section 206 transitions from the generally horizontal position to the substantially vertical position the length or size of the gap decreases due to the simultaneous translation and rotation of the foot deck 206 from the generally horizontal to the substantially vertical position.

As best shown in FIGS. 6D and 6E, in a preferred embodiment the non-pivotal actuation mechanism 209 comprises a six-bar linkage, however, alternate linkages, such as a four-bar linkage or other linkage types or mechanisms may be utilized without departing from the scope of the present disclosure. The non-pivotal actuation mechanism 209 preferably comprises first and second opposing links pivotally connected to the weigh frame 70 (the first link being adjacent the first side 28 of the bed 10, and the second link being adjacent the second side 30 of the bed 10), an H-frame member, first and second opposing drive rails (the first drive rail being adjacent the first side 28 of the bed 10, and the second drive rail being adjacent the second side 30 of the bed 10), and first and second control rails (the first control rail being adjacent the first side 28 of the bed 10, and the second control rail being adjacent the second side 30 of the bed 10).

Additionally, as shown in FIGS. 2-4, in a preferred embodiment the foot deck section 206 is provided a distance from the intermediate or seat deck section 204. Accordingly, a longitudinal space or gap is provided between the seat deck section 204 and the foot deck section 206. As the foot deck section 206 transitions from the generally horizontal position to the substantially vertical position the length or size of the gap decreases due to the rotation and/or translation of the foot deck 206 from the generally horizontal to the substantially vertical position.

A pair of foot end siderails 29 is provided on the bed 10. In one embodiment the foot end siderails 29 are rotatedly connected to a shaft, and rotate with the head deck section 202. Accordingly, when the head deck section 202 is rotated from the substantially horizontal position shown in FIGS. 1A and 2A to the more vertical position as shown in FIG. 3B, the foot end siderails 29 rotate accordingly. The second pair of siderail assemblies 29 generally comprises a first foot end siderail 670 located at the first side 28 of the bed, and a second foot end siderail 672 at the second side 30 of the bed. In an alternate embodiment, the foot end siderails 670, 672 are operably connected to the foot deck section 206 of the bed and remain stationary relative to the foot deck section 206 during movement of the foot deck section 206 between the generally horizontal position and the generally vertical position. Further, the foot end siderails 670,672 are movable from a first position, wherein they generally provide a barrier preventing the patient from unintentional exit off either of the sides 28, 30 of the bed, to a second position, wherein a barrier is not provided above the patient support surface. Each of the foot end siderails 670, 672 is independently movable from the first position to the second position.

In various embodiments, the foot end siderails 670, 672, or alternately handles, are generally rotatably coupled to one of the head deck section 202 or the foot deck section 206, unless disengaged therefrom as explained above. And, in a preferred embodiment, the foot end siderails 670,672 are coupled with linkage 671 to the head section 202. Thus, in such an embodiment, when the head section 202 is actuated to rotate, the foot end siderails 670, 672 will rotate as well. Each siderail assembly 29 may also be operably connected to the seat deck extender assemblies 432, 434. As such, when the seat deck extender assemblies 432, 434 are extended, the second set of siderails 29 will simultaneously be extended outwardly as well.

To provide for allowing independent movement of the siderails 670, 672, a locking assembly 673 is provided. As shown in FIG. 17, the locking assembly 673 includes an activation button that when pressed, disengages the second end siderail 670 or 672 to allow the second end siderail to rotate to the second position and to become disengaged from fixed movement with the head deck section 202. The siderail assemblies 29 also include a sensor. When the sensor senses that the siderail is not in the first position (i.e., when the activation button has been engaged to rotate the siderail from the first position to the second position, the sensor sends a signal to a controller of the bed to lock out or preclude the foot deck actuator from (a) allowing the foot deck section to be moved into the substantially vertical position of a chair configuration, and (b) allowing the bed to be actuated to the standing position. Additionally, a mechanical stop is utilized to preclude the foot deck siderails 670, 672 from being rotated to the second lower position when the foot deck 206 is in the vertical chair position or when the bed is in tilt or stand mode.

The siderails 670, 672 are provided not only as barriers, but as handles to assist the patient in moving out of the foot end 26 of the chair bed 10. Because in one embodiment the siderails 670, 672 are rotatedly fixed to the head deck section 202 through the drive mechanisms in the engaged state, the siderails 670, 672 have relative movement with the head deck section 202. Thus, as the head deck section 202 is rotated from the generally horizontal position to the substantially vertical position, the foot end siderails 670, 672 also rotate therewith. The patient can hold onto the foot end siderails 670, 672 during this rotation.

The bed 10 also incorporates a variety of lock-out features. For example, when the foot end siderails 29 or handles are in the second or down position, see FIG. 17C, the foot actuator is locked out and cannot transition the foot deck 206 to the full chair position. Similarly, the stand mode is not operable when the foot end siderails 29 are in the down position.

As explained above, the bed also has a first set of siderails 27. In one embodiment the first set of siderails 27 are provided toward the head end 24 of the bed. The first set of siderails 27 generally comprise a first head end siderail 800 located at the first side 28 of the bed, and a second head end siderail 802 located at the second side 30 of the bed. In one embodiment, the head end siderails 800, 802 are operably connected to the head deck section 202 of the bed and remain stationary relative to the head deck section 202 during movement of the head deck section 202 between the generally horizontal position and a more vertical back support position. In alternate embodiments, either of the sets of siderails 27, 29 may be connected to any frame of the bed, but they are preferable connected to the patient support platform 20. Additionally, the head end siderails 800, 802 may be connected to the seat deck section 204, the seat deck extenders, or any other support deck. In a preferred embodiment the first head end siderail 800 is connected to the first side head deck extender assembly 232, and the second head end siderail 802 is connected to the second side head deck extender assembly 234. The first and second head end siderails 800, 802 are movable from a first position, wherein they generally provide a barrier preventing the patient from unintentional exit off the bed at either of the sides 28, 30 thereof, to a second position, wherein a barrier is not provided above the patient support surface. Each of the head end siderails 800, 802 are independently movable from the first position to the second position. In both the first and second positions the head end siderails 800, 802 are adapted to remain stationary relative to the head deck section 202 during movement of the foot deck section 1206.

Figure 11A:
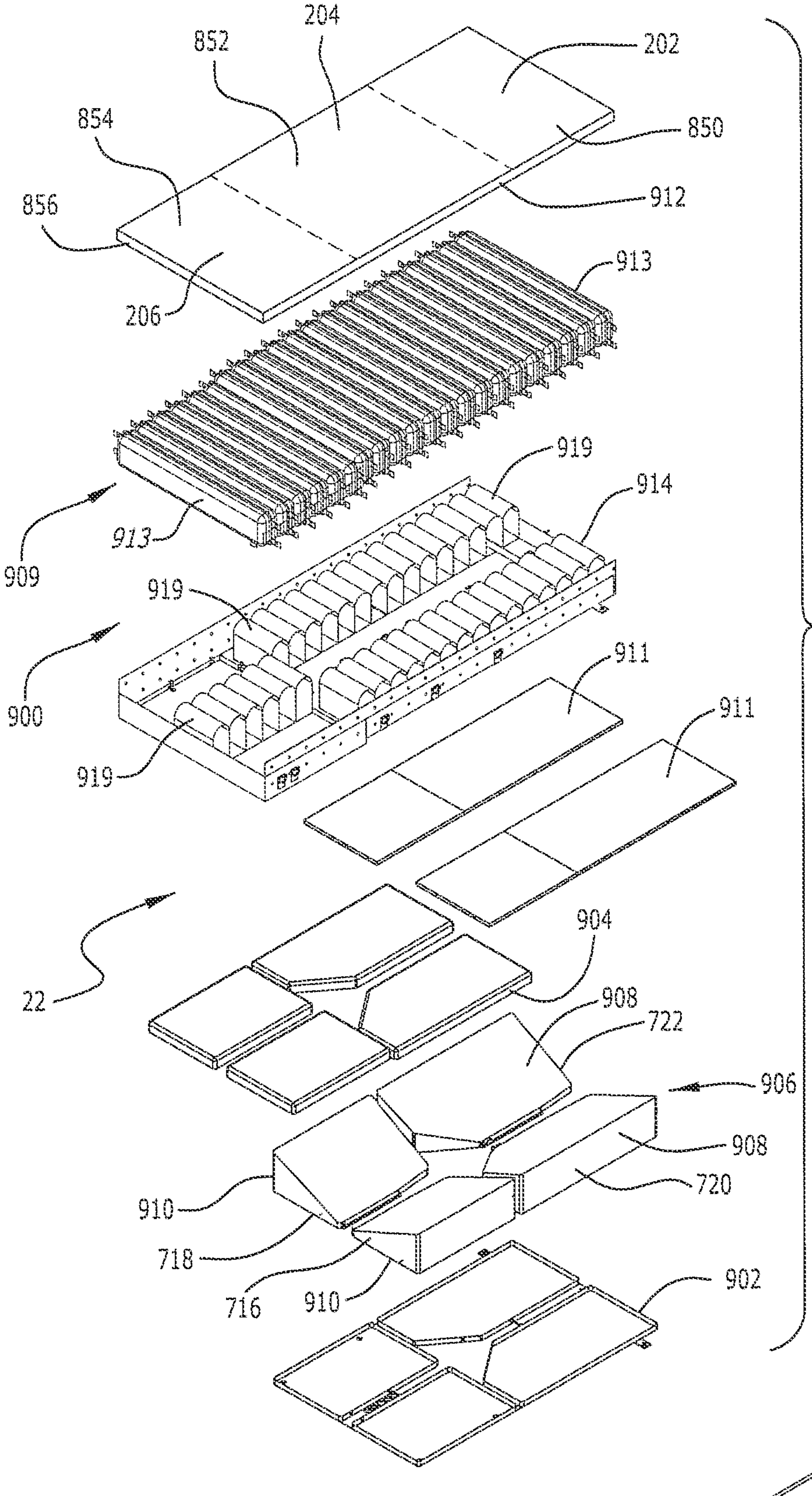
FIG. 11A is an exploded view of one embodiment of a rotational low-air loss mattress for a patient support bed.

As previously disclosed, the bed 10 has a patient support assembly 19, which in some embodiments includes a mattress 22. One embodiment of a mattress 22 for the bed 10 is shown in FIG. 11A. The mattress of FIG. 11A comprises a low air loss mattress with rotational capabilities, however, other mattress with additional or fewer capabilities may be employed. The mattress 22 is provided on the deck plates of the head deck, seat deck and foot deck sections 202, 204, 206. Though the mattress is a single component in many embodiments, it will be identified as having a head mattress portion 850, a seat mattress portion 852 and a foot mattress portion 854. For example, in one embodiment the head and seat mattress portions 850, 852 may be connected together and the foot mattress portion 854 may be separated. The head and seat mattress portions 850, 852 may be connected to the head and seat deck sections 202, 204, and the separate foot mattress portion 854 may be connected to the foot deck section 206. Additionally, the mattress 22 includes an encasing 856 that generally covers and/or encloses the entire mattress 22, or multiple encasings may be provided to cover different sections of the mattress, and the encasing(s) may be strapped or otherwise connected to the various sections of the bed 10. In an alternate mattress, the mattress may comprise a combination of air and foam sections and inserts.

Figure 11B:
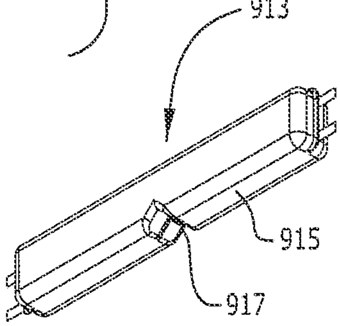
FIG. 11B is a perspective view of one embodiment of a low-air loss mattress section for a low-air loss mattress for a patient support bed.

Referring to FIG. 11A, a low air loss mattress 900 with rotational capabilities is provided. The low air loss functionality provides a light and diffused air flow directly to the patient's skin through thousands of microscopic apertures in the top coverlet of the mattress to address moisture and heat buildup which aids in microclimate management. Additionally, this mattress may also provide dynamic alternating pressure capabilities. Dynamic alternating pressure capabilities may be achieved by alternately inflating and deflating different air cells periodically, such as every 5 minutes. In one embodiment, structure for rotational capabilities of the low air loss mattress 900 comprises a bottom encasement 902 that mates with a top encasement 904 to enclose a turning bladder kit 906. The turning bladder kit provides two independent turning bladders 908 for the head section 202 (one for each side of the head section) of the bed, and two independent turning bladders 910 for the seat section 204 of the bed (one for each side of the seat section). The bladders include a first side seat rotation bladder 716, a second side seat rotation bladder 718, a first side head rotation bladder 720 and a second side head rotation bladder 722. In one embodiment the cross-sectional geometry of the rotation bladders is generally circular. In an alternate embodiment the cross-sectional geometry of the rotation bladders is generally triangular such that the tall portion of the rotation bladder is toward the edge of the patient support deck and the portion of the rotation bladder that approaches the baseline is toward the middle of the patient support deck. The top encasement 904 is zippered to the bottom encasement 902. Further, a plurality of independent low air loss and alternating pressure mattress sections 913 are provided as a low air loss and alternating pressure bladder system 909 within a top and bottom encasement 912, 914. The low air loss and alternating pressure bladder system 909 is preferably positioned above the rotation portions of the mattress. In one embodiment, the low air loss and alternating pressure mattress sections 913 comprise independent mattress sections that extend the width of the bed. In one embodiment, the mattress sections 913 have a foam member (not shown) placed inside a bladder 915 filled with air as shown in FIG. 11B. Further, in one embodiment, preferably located at the head and seat sections where rotation may be utilized, the foam member may be split into two separate foam members, with a gap between the two foam members in the middle of the mattress section 913, and the bladder 915 may have a notch 917 to facilitate easy rotation of the mattress section 913 at the head and seat sections. Generally, however, if no rotation is provided at the foot section, the foam members within the mattress sections 913 at the foot section of the bed may unitary and extend from one side of the mattress section 913 to the other side of the mattress section 913 without any break or gap. However, to accommodate for the arms 698 of the foot board 25 that may extend partially above the foot deck surface, the mattress sections 913 in the foot deck may have two notches, similar to notch 917 shown in FIG. 11B. The air cell sections 913 may be supported in the bottom encasement 914 with retaining loops 919.

Referring to FIG. 11A, an optional foam support 911, preferably with a plastic backing, may be provided above the top encasement 904 to support the air cell sections 913 of the low air loss and alternating pressure portion of the mattress. In one embodiment, the foam support 911 comprises separate or hingeable head and seat sections for each side of the bed. The low air loss and alternating pressure bladder system 909 is provided in a top and bottom encasement 912, 914 above the top encasement 904 of the rotational bladders and above the foam supports 911. In one embodiment, as show in FIG. 13, the alternating bladder system 909 includes six bladders 913 in the head section 202 of the mattress and each extending from one side of the mattress to the opposite side of the mattress, four bladders 913 in the seat section 204 of the mattress and each extending from one side of the mattress to the opposite side of the mattress, and six bladders 913 in the foot section 206 of the mattress and each extending from one side of the mattress to the opposite side of the mattress. Additionally, in one embodiment the bottom encasement 914 comprises a manifold system to provide air to each of the mattress section 913 bladders of the mattress. In one embodiment, each separate mattress section 913 has fasteners to maintain each mattress section 913 in the proper orientation within the top and bottom encasement 912, 914, and the mattress encasement 912, 914 is fixed with fasteners to the patient support platform.

Figure 13:
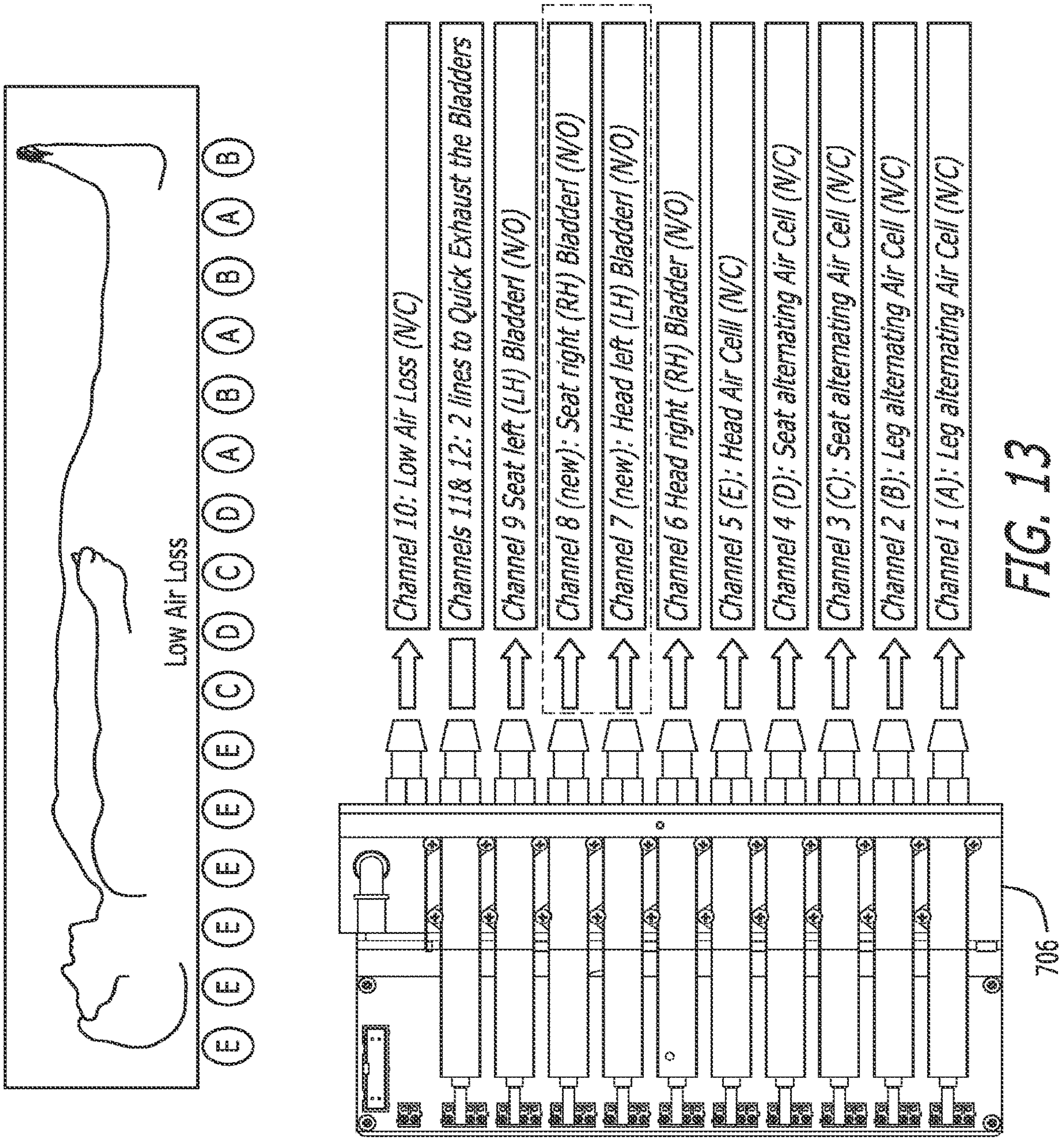
FIG. 13 is a schematic of a valve configuration for one embodiment of a low-air loss mattress for a patient support bed.

In one embodiment, the seat and foot sections of the alternating pressure mattress each have two zones, an A and B zone in the foot section, and a C and D zone in the seat section (see FIG. 13). This allows for alternating bladders 913 in each of the seat and foot sections to be inflated and deflated providing therapeutic benefit to the patient. Accordingly, in the mattress of FIG. 13 there are five zones for alternating pressure in the air bladders 913 of this mattress: one zone for the air bladders 913 in the head section, two zones for the air bladders 913 in the seat section and two zones for the air bladders 913 in the foot section.

Figure 12:
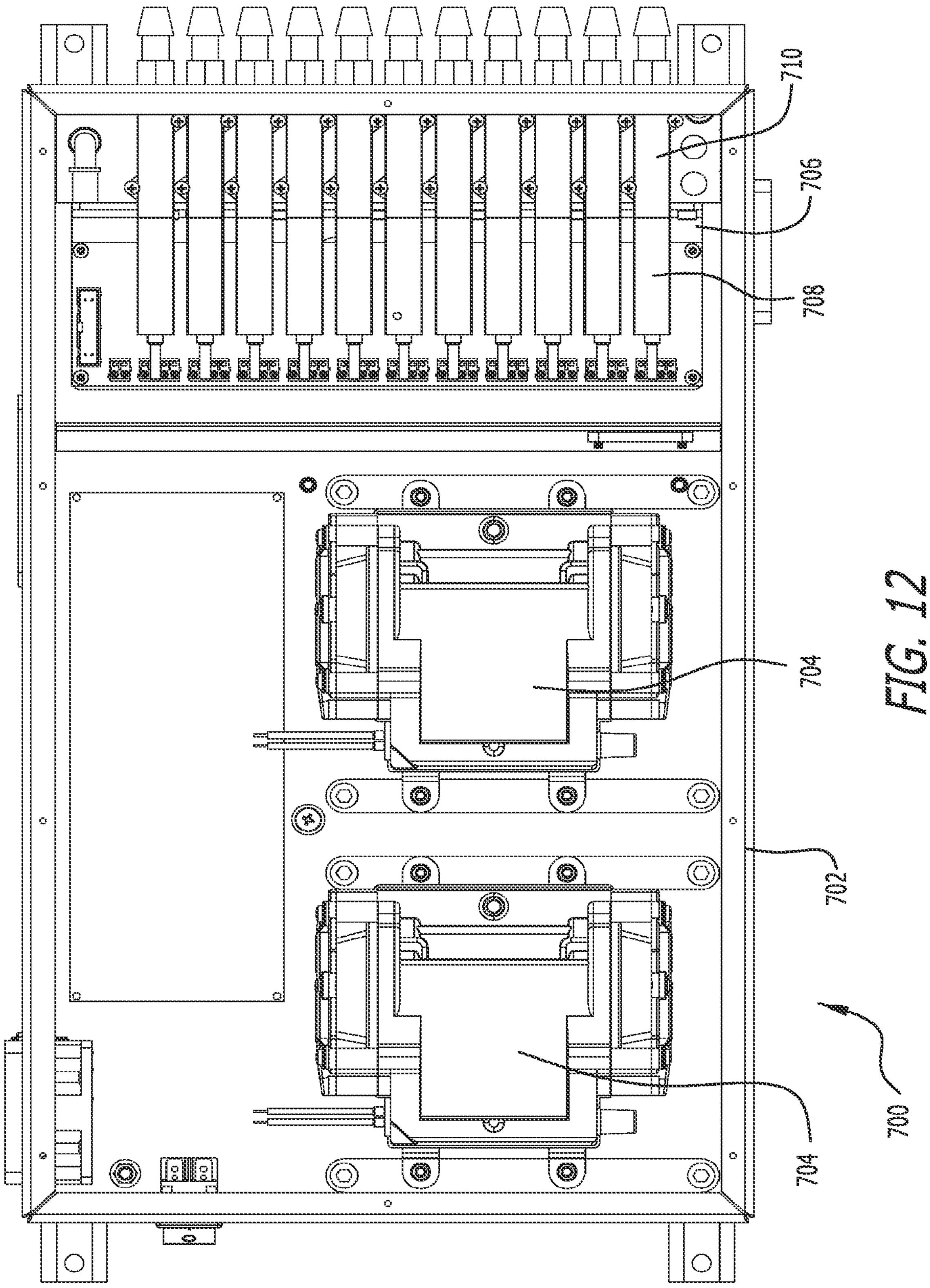
FIG. 12 is a perspective view of one embodiment of a pump and manifold enclosure for a patient support bed.
Figure 14:
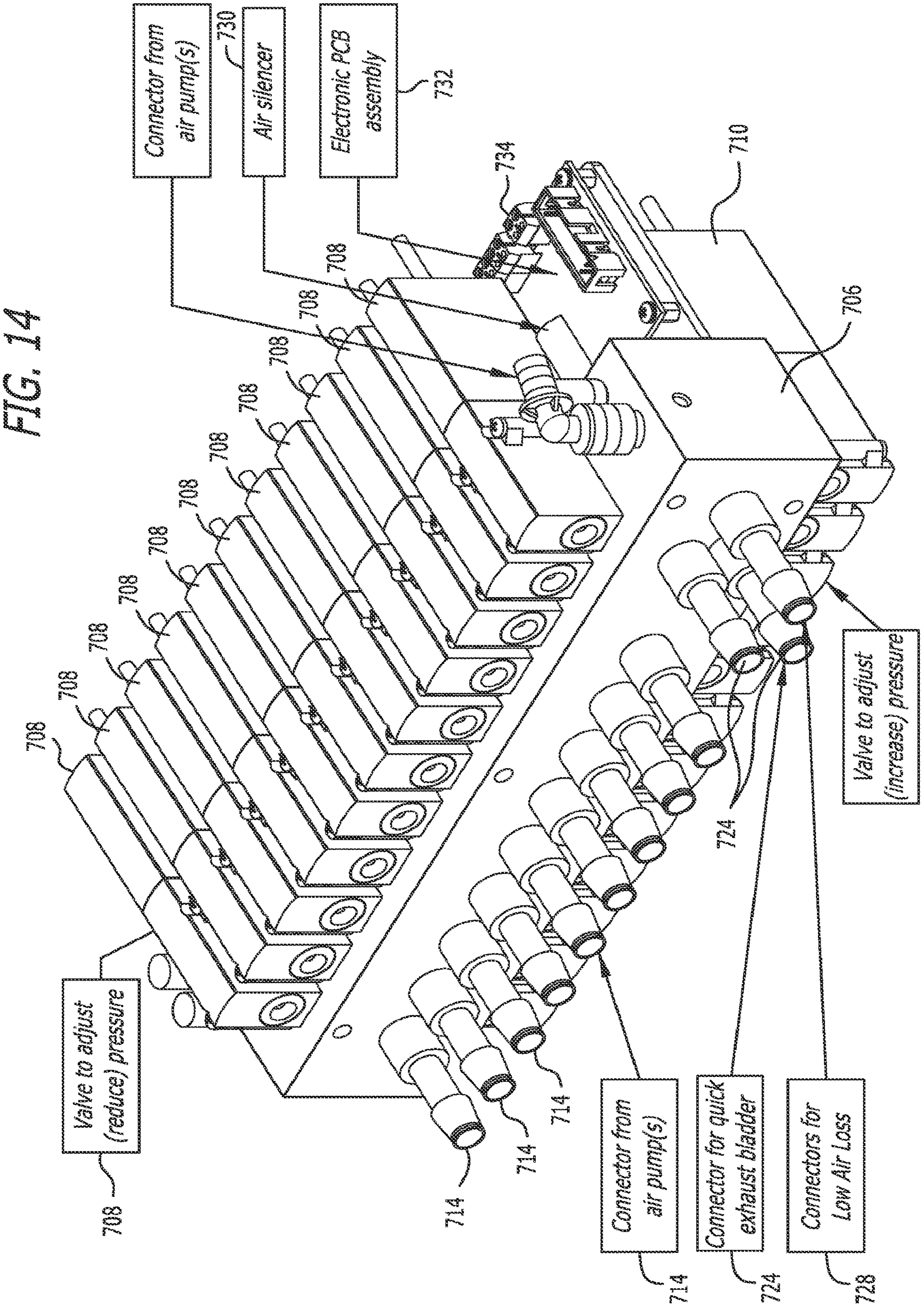
FIG. 14 is a perspective view of one embodiment of a main manifold and valve control system for a low air loss mattress for a patient support bed.

In one embodiment, when the bed 10 has air bladders, and particularly air bladders for patient support surfaces, the bed 10 may include an air supply control box 700 as shown in FIG. 12. Referring to FIG. 12 there is shown an enclosure 702 that houses pumps 704, a main manifold 706 and a plurality of valves 708, 710. As shown in FIG. 12, two pumps 704 are provided in a preferred embodiment to provide additional volume of air for quicker inflation and deflation of the air bladders, however, in alternate embodiments only one pump is provided. Air from the pumps enters the manifold 706 at the input fitting 712 (see also FIG. 14). The manifold has numerous outputs. As shown in FIG. 14, in one embodiment there are nine air bladder fitting 714 outputs. The nine outputs are for: (a) the air bladder zones in the head section (one zone), seat section (2 zones), foot section (2 zones)—which in total occupy 5 of the fittings 714; and, (b) the rotation bladders, including the first side seat rotation bladder 716, second side seat rotation bladder 718, first side head rotation bladder 720 and second side head rotation bladder 722 (see also FIG. 11)—which in total occupy 4 of the fittings 714. Next to the air bladder fittings 714 are quick exhaust bladder fittings 724 which are utilized to assist in deflating air cells more quickly by passing air to be drawn out of a specific bladder to the CPR manifold 726 that has quick exhaust valves. Finally, the last output fitting 728 is for the low air loss aspect of the mattress which bleeds air within the encasement of the mattress to allow the air to escape for therapeutic purposes. The main manifold 706 may also have an air silencer 730, which operates essentially as a muffler for air exhausting out of the manifold 706 that is not being quick released through the CPR manifold 726. In one embodiment, each of the nine air bladder output fittings 714 and the quick release exhaust bladder fittings 724 have a separate first valve 708 associated therewith to allow for adjusting the air pressure in the specific bladder/cell by reducing the air pressure in that specific bladder/cell. Accordingly, in a preferred embodiment there are ten first valves 708. Additionally, each of the nine air bladder output fittings 714, the quick release exhaust fittings 724 and the low air loss fitting 728 have a separate second valve 710 associated therewith to allow for adjusting the air pressure in the specific bladder/cell/low air loss area by increasing the air pressure to that specific bladder/cell/low air loss area. Accordingly, in a preferred embodiment there are 11 second valves 710.

The manifold 706 also has a mother board or PCB 732 (see FIGS. 14 and 15), on which there are, among other things, pressure sensors 734 for each output fitting. The pressure in each specific bladder/cell/low air loss area is determined by sensing the pressure within each respective output tube connected to each respecting output fitting with a separate smaller diameter tube (not shown) being inside that output tube. The smaller tubes connect to separate connectors 736 inside the manifold 706 (see the cross-sectional view of FIG. 15), which in turn are fluidly connected to the respective separate sensors 734 on the PCB 732.

In addition to the main manifold 706, in one embodiment a CPR manifold 726 is provided for rapidly dumping air from the various air bladders. Referring to FIG. 16, the CPR manifold 726 is provided in line between the main manifold 706 and the air mattress 22. Accordingly, tubes connect the appropriate output fittings on the main manifold 706 with respective connectors 738 on the CPR manifold 726 (note that not all of the respective connectors 738 are shown in FIG. 16). Further individual output fittings are then connected to the openings 740 on the top of the CPR manifold 726 to connect to each specific bladder/cell/low air loss area. The CPR manifold 726 also has a plurality of exhaust breath ways 742 to rapidly exhaust air out of any bladder/cell.

In one embodiment of the bed where a mattress is provided with rotational bladders, lumbar boost functionality may also be provided. Lumber boost functionality is achieved by filling the first side head rotation bladder 720 and the second side head rotation bladder 722 at the head section with air at the same time. Additionally, the head deck may be elevated, or the bed may be placed in the chair or X-gatch orientation. This essentially pushes that chest of the patient outwardly and provides a lumber boost.

In one embodiment the bed 10 is designed to quickly place the bed into a CPR position in which the head section, and preferably the seat and foot sections as well, are horizontal in case of emergency. In a preferred embodiment, the horizontal CPR position is achievable even when the bed is initially in the stand or tilt orientation, which previously has not been possible. To place the bed into the CPR position from the standing/tilting position the operator will lift one of the two CPR handles 780 located at the head side of the bed, as shown in FIGS. 10A and 10B, to quickly lower the bed from the standing position to the flat or horizontal position. If the bed is in any other position than the standing position, to place the bed into the CPR position the operator will similarly lift one of the two CPR handles 780, as shown in FIG. 10B, and the head section 202 of the bed will be immediately lowered. The CPR control is a momentary control. Accordingly, the CPR handle 780 must be continued to be lifted until the head section 202 or entire tilt frame is in the flat orientation. Releasing the CPR handle will stop movement. Additionally, in one embodiment the CPR release is a 2 stage release. By lifting the CPR handle 780 a first amount an electronic switch is engaged and the actuators of the bed will move the bed to the appropriate orientation. By lifting the CPR handle 780 an additional amount, a mechanical operation will take affect whereby the actuators will disengage and drop the sections of the bed by gravity. In one embodiment the CPR handle 780 can disengage two actuators, the head deck actuator and the tilt actuator. Engaging the CPR handle also operates to release air from various bladders (i.e., low air loss, rotation, alternating pressure, etc.) as explained above.

Figure 7A:
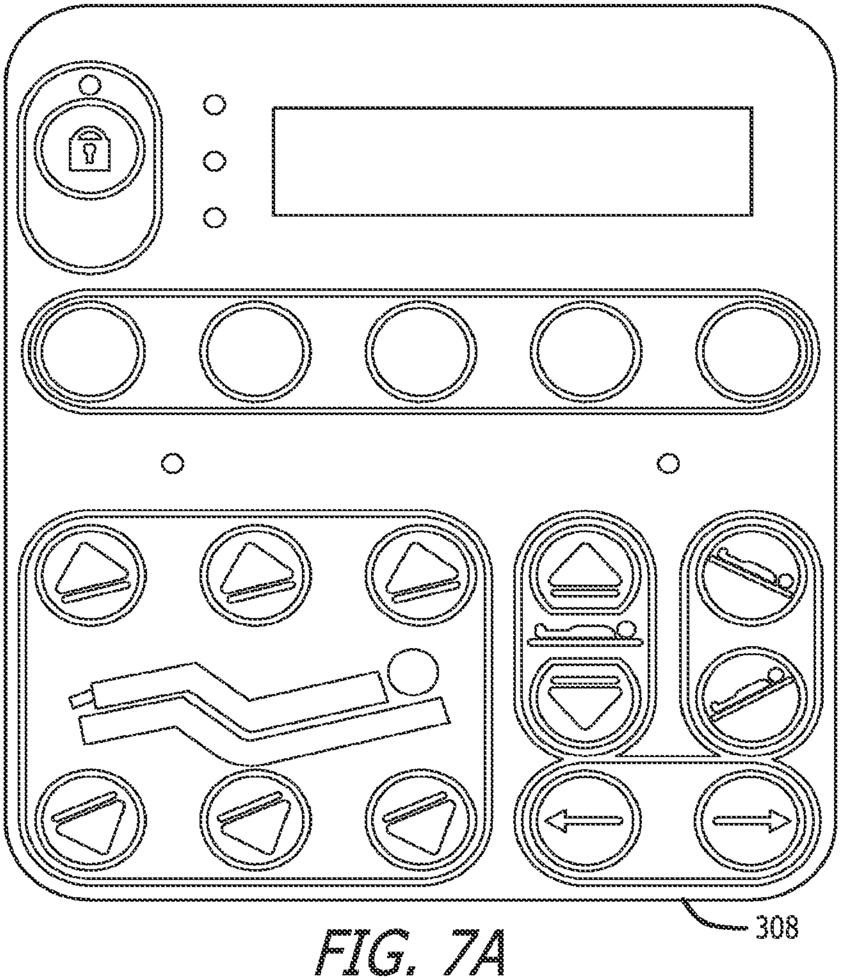
FIG. 7A is a front elevation view of one embodiment of an operator HMI display for one embodiment of a patient support bed.
Figure 7B:
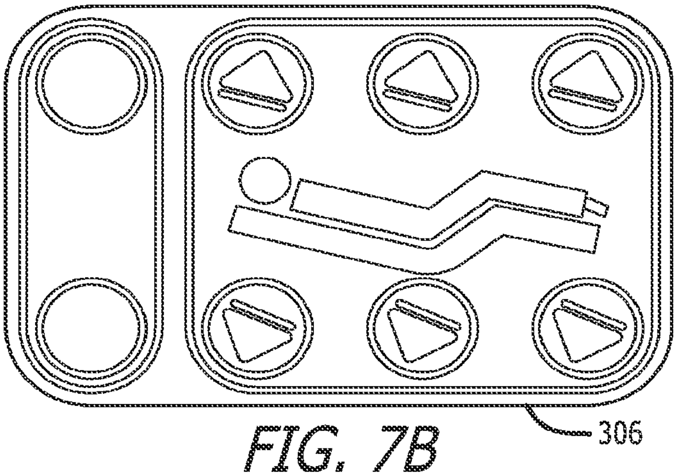
FIG. 7B is a front elevation view of one embodiment of a patient HMI display for one embodiment of a patient support bed.
Figure 8A:
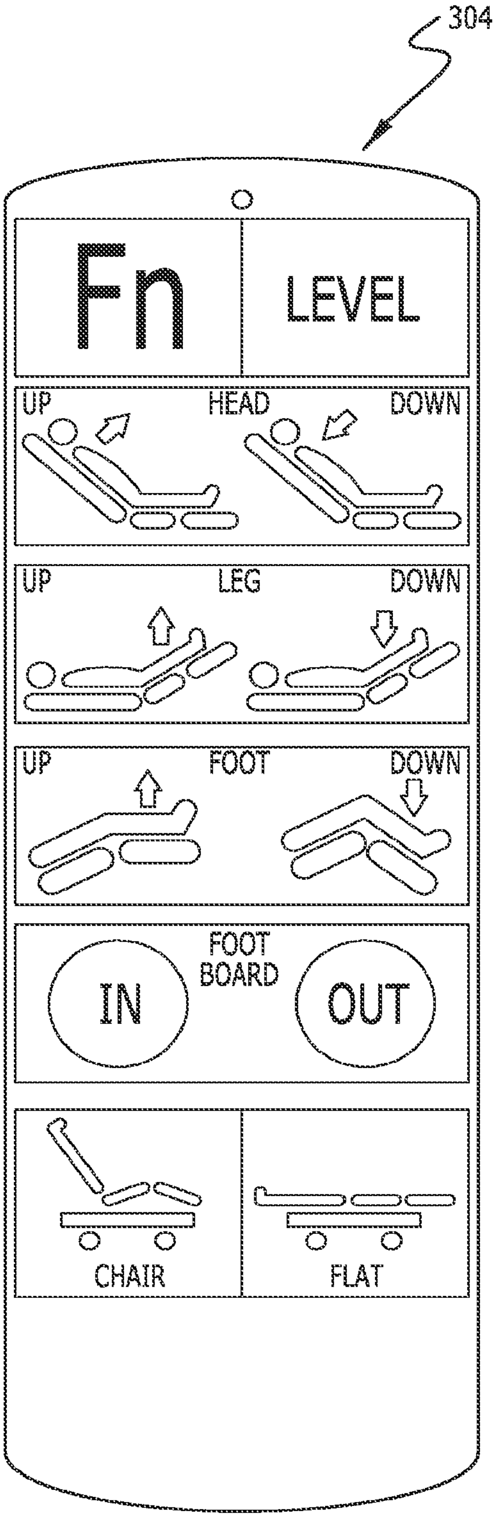
FIG. 8A is a front elevation view of one embodiment of a hand pendant for a patient support bed.
Figure 8B:
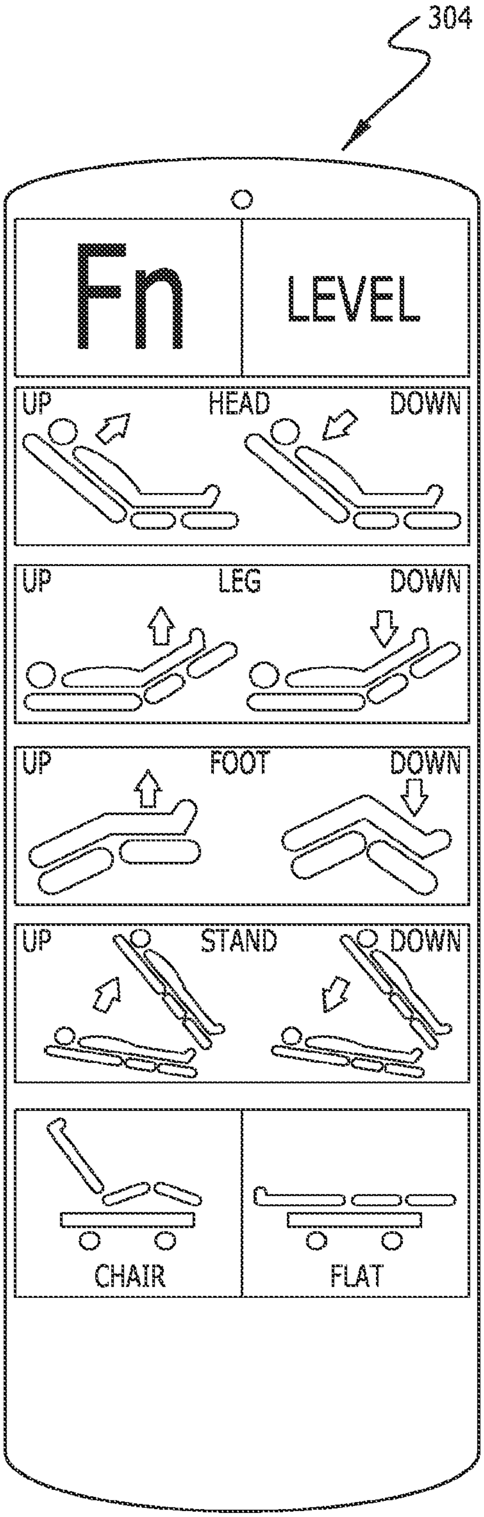
FIG. 8B is a front elevation view of another embodiment of a hand pendant for a patient support bed.

In one embodiment, the footboard 25 translates inwardly and outwardly with respect to an axis of the foot deck 206 extending from the head end of the foot deck 206 to the foot end of the foot deck 206. Movement of the footboard 25 is independent of movement of the foot deck 206, and independent of the type of mechanism to move the foot deck 206. In one embodiment a linear motor is provided to move the footboard 25 inwardly and outwardly. Further, in one embodiment the footboard 25 has approximately 8" of travel: 4" of travel outwardly from the zero position and away from the foot end 26 of the bed, and 4" of travel inwardly from the zero position and toward the head end 24 of the bed. The footboard 25 generally comprises a footboard barrier 697 connected to first and second arms 698. The arms 698 may be provided between the two sides of the foot deck 206, as shown in FIGS. 1A, 2A and 4A, or the arms 698 may be provided at the sides of the foot deck 206 so that the arms 698 are outside the mattress 22. Movement of the footboard 25 is controlled by using in and out buttons on the operator HMI 308 on the head end siderail 27 as shown in FIG. 7A, or in and out buttons on the hand pendant 304 as shown in FIG. 8A. The hand pendant 304 is preferably electrically connected with the control system of the bed using a wired cord.

In a preferred embodiment, a portion of the mattress is connected to the footboard 25. Accordingly, when the footboard 25 translates inwardly and outwardly (i.e., toward the head end of the bed and away from the head end of the bed) the mattress will similarly translate with the footboard 25. In such an embodiment, the footboard 25 may have a retainer member 699, also referred to as a footboard mattress support slide, to which the mattress is connected (See FIGS. 2A-2C). In one embodiment the retainer member 699 is connected to the arms 698 of the footboard assembly. Preferably, the portion of the mattress that is connected to the footboard 25 is the foot end 26 of the foot section of the mattress, and most preferably of a mattress that has an internal gap between the foot section and the seat section of the mattress. As the footboard 25 translates toward the head end 24 of the bed, i.e., toward the seat deck 204, the mattress over the foot deck will move toward the mattress over the seat deck to close the gap.

Preferably, the footboard 25 is generally maintained in the zero position. The bed is precluded from entering stand mode unless the footboard 25 is in the zero position. If the footboard 25 is not in the zero position and the operator attempts to tilt the bed, the control system will provide an alarm and an error message to the operator that is visible on the message board on the operator HMI 308. The error message will advise the operator that the footboard 25 is not in the zero position. Accordingly, the operator will have to move the footboard in or out, as necessary, to place the footboard in the zero position. Operation of the footboard in/out buttons provides for momentary movement of the footboard 25. Thus, as soon as the operator releases the in or out button, the footboard 25 will stop moving. During movement of the tilt assembly from the horizontal position (FIGS. 1A and 2A) to the stand position (FIGS. 4A and 4B) in stand mode the footboard 25 does not move, but remains in the zero position at all times. When the tilt frame is positioned in the final stand location, see FIGS. 4A and 4B, the bottom of the footboard 25, when the footboard is in the zero position, should rest approximately on the floor to allow a patient to exit or enter the bed in the standing orientation. Similarly, during movement of the tilt assembly from the stand position (FIGS. 4A and 4B) to the horizontal position (FIGS. 1A and 2A) the footboard 25 does not move, but instead remains in the zero position at all times.

Because in one embodiment the footboard 25 has footboard arms 698 that are interior of the sides of the foot deck assembly 206, the bottom portion of the mattress 22 may need to have slits to accommodate movement of the footboard 25. In one embodiment of the low air loss mattress 22 the overall height of the variety of air bladders at each of the head and seat sections 202, 204 may be approximately 7". At the foot section 206, the air bladders in one embodiment are approximately 3.5" in height, and a 3.5" foam insert 209 is provided below the air bladders in the foot deck section 206. The foam insert 209 may have slits that allow the arms 698 to pass back and forth as the footboard 25 is actuated in and out. Because of the geometry of the arms 698 and the limited movement of the footboard 25, preferably no slits are provided in the air bladders in the foot section 206. In an alternate embodiment arms 698 of the footboard 25 are provided outside the mattress 22, so no slits are required in the mattress 22. Further, in another alternate embodiment, the footboard 25 does not move toward the head end of the bed further than the zero position (thereby only having travel from the zero position and outwardly past the foot end of the bed 10), so that no slits are required in the mattress in this embodiment as well.

An additional aspect of one embodiment of the bed is that limit switches are provided for pinch points at various areas of the bed. For example, along the side of the bed limit switches are provided at various areas of the base frame 32 and/or intermediate frame 34 to stop the bed from moving down when the switch senses pressure. Additionally, limit switches 213 or sensors 213 are provided on the bottom of the foot board 25 and the foot deck 206 to sense pressure adjacent the bottom of the foot board 25 and foot deck 206, so that if pressure is sensed the bed will stop further movement of the footboard 25 and/or foot deck 206, especially when the bed is moving to the chair and stand positions.

Additionally, it is understood that the tilting mechanism 16 may be stopped at any desired angle between the generally horizontal position and the generally vertical position to allow for various therapeutic loads to be applied to the load supporting portions of the patient's body.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying claims.

The invention claimed is:

1. A patient support tilt bed, comprising;

a base frame;

a patient support assembly connected to the base frame, the patient support assembly having a separate moveable head section and foot section, wherein the head section is adjacent a head of the bed, and the foot section is adjacent a foot end of the bed;

the patient support assembly being rotatable to place the patient support assembly in a tilted position with the entire patient support assembly generally in-line in an orientation greater than 30 degrees; and a rotational mattress, the rotational mattress includes a plurality of air bladders that provide rotational capabilities to the rotational mattress.

2. The patient support tilt bed of claim 1, wherein the plurality of air bladders includes two independent turning bladders for the head section.

3. The patient support tilt bed of claim 2, wherein the two independent turning bladders for the head section include a first side head rotation bladder and a second side head rotation bladder.

4. The patient support tilt bed of claim 3, wherein the patient support assembly includes a seat section, the plurality of air bladders includes two independent bladders for the seat section.

5. The patient support tilt bed of claim 4, wherein the two independent turning bladders for the seat section include a first side seat rotation bladder and a second side seat rotation bladder.

6. The patient support tilt bed of claim 1, wherein the rotational mattress is a low air loss mattress.

7. The patient support tilt bed of claim 1, wherein the rotational mattress provides alternating pressure capabilities.

8. The patient support tilt bed of claim 1, wherein a cross-sectional geometry of the plurality of air bladders is generally triangular.

9. The patient support tilt bed of claim 1, further including a tilt frame connected to the base frame and connected to and supporting the patient support assembly, the tilt frame being rotatable to place the patient support assembly in a tilted position.

10. The patient support tilt bed of claim 9, further including a tilt actuator, the tilt actuator rotates the tilt frame.

11. The patient support tilt bed of claim 9, wherein the tilt frame is hingedly connected to the base frame.

12. The patient support tilt bed of claim 1, further including an intermediate frame assembly connected to the base frame, wherein one or more actuators raise and lower each end of the intermediate assembly.

13. The patient support tilt bed of claim 1, further including a first siderail and a second siderail, the siderails have a raised position and a lowered position, the rotational capabilities will not operate when the siderails are not in the raised position.

14. The patient support tilt bed of claim 1, further including a weighing system.

15. The patient support tilt bed of claim 14, wherein the weighing system includes a load cell, the load cell does not contact the floor.

* * * * *